United States Patent
Abe et al.

(10) Patent No.: US 12,221,161 B2
(45) Date of Patent: Feb. 11, 2025

(54) LONG STRUCTURAL MEMBER AND BLANK MATERIAL

(71) Applicant: NIPPON STEEL CORPORATION, Tokyo (JP)

(72) Inventors: Masahiko Abe, Tokyo (JP); Yasuhiro Ito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 89 days.

(21) Appl. No.: 18/031,317

(22) PCT Filed: Oct. 4, 2021

(86) PCT No.: PCT/JP2021/036708
§ 371 (c)(1),
(2) Date: Apr. 11, 2023

(87) PCT Pub. No.: WO2022/080172
PCT Pub. Date: Apr. 21, 2022

(65) Prior Publication Data
US 2023/0382463 A1    Nov. 30, 2023

(30) Foreign Application Priority Data

Oct. 12, 2020 (JP) .................................. 2020-171684
Mar. 29, 2021 (JP) .................................. 2021-054471

(51) Int. Cl.
*E04C 3/07*        (2006.01)
*B62D 25/04*    (2006.01)
(Continued)

(52) U.S. Cl.
CPC .............. *B62D 25/04* (2013.01); *B32B 3/085* (2013.01); *E04C 2003/0473* (2013.01); *E04C 3/07* (2013.01)

(58) Field of Classification Search
None
See application file for complete search history.

(56) References Cited

U.S. PATENT DOCUMENTS 2,085,829 A      7/1937  Rogers
2014/0147693 A1  5/2014  Yasuyama et al.
(Continued)

FOREIGN PATENT DOCUMENTS

GB    2 017 541 A     10/1979
JP    2014-15206 A    1/2014
(Continued)

*Primary Examiner* — Alexander S Thomas
(74) *Attorney, Agent, or Firm* — Birch, Stewart, Kolasch & Birch, LLP

(57) ABSTRACT

A long structural member that, in a transverse section of one part or all of the long structural member in a longitudinal direction, includes the following configuration. A top plate part, a first flange part, and a second flange part are flat. A first side plate part, a first upper corner part, and a first lower corner part constitute a first thick-wall part. A thickness of the first thick-wall part is greater than a thickness of the top plate part and is greater than a thickness of the first flange part. A second side plate part, a second upper corner part, and a second lower corner part constitute a second thick-wall part. A thickness of the second thick-wall part is greater than the thickness of the top plate part and is greater than a thickness of the second flange part.

12 Claims, 29 Drawing Sheets

(51) Int. Cl.
 *B32B 3/08* (2006.01)
 *E04C 3/04* (2006.01)

(56) References Cited

U.S. PATENT DOCUMENTS

| | | |
|---|---|---|
| 2016/0083016 A1 | 3/2016 | Imada et al. |
| 2021/0276126 A1 | 9/2021 | Chen et al. |
| 2022/0081038 A1 | 3/2022 | Higai et al. |

FOREIGN PATENT DOCUMENTS

| | | |
|---|---|---|
| JP | 2016-64725 A | 4/2016 |
| JP | 2019-166855 A | 10/2019 |
| JP | 2020-1076 A | 1/2020 |
| JP | 2020-117039 A | 8/2020 |

LONG STRUCTURAL MEMBER AND BLANK MATERIAL

TECHNICAL FIELD

The present disclosure relates to a long structural member. The present disclosure also relates to a planar blank material that is suitable for producing the long structural member by press forming.

BACKGROUND ART

For example, the vehicle body of an automobile includes long structural members such as a center pillar, a front pillar, and a rear pillar as members that constitute the framework. The transverse sectional shapes of such long structural members include a hat shape and a C-shape, and in some cases the transverse sectional shape is a closed sectional shape. In general, such kinds of long structural members are produced by press forming, roll forming or the like. From the viewpoint of improving the fuel consumption of an automobile, there is a need to reduce the weight of such long structural members. On the other hand, when the occurrence of an automobile collision is assumed, a collision load will be applied to a long structural member from a direction perpendicular to the longitudinal direction of the long structural member. Therefore, from the viewpoint of collision safety, there is a need for long structural members to have excellent three-point bending characteristics (for example, characteristics such as maximum value of load, and energy absorption amount).

In a long structural member, for example, if the overall sheet thickness is increased, the flexural rigidity will increase. By this means, the three-point bending characteristics will improve. However, the weight of the long structural member will markedly increase. Accordingly, with regard to long structural members, there is a need to both improve the three-point bending characteristics and also suppress an increase in weight in a compatible manner.

Prior art for obtaining both an improvement in three-point bending characteristics and suppression of a weight increase in a compatible manner is disclosed, for example, in Japanese Patent Application Publication No. 2020-001076 (Patent Literature 1) and Japanese Patent Application Publication No. 2016-064725 (Patent Literature 2). The long structural members disclosed in Patent Literatures 1 and 2 each have a hat-shaped transverse sectional shape. That is, each long structural member includes a top plate part, two side plate parts, two flange parts, two upper corner parts, and two lower corner parts. The two side plate parts are connected to the top plate part through upper corner parts that correspond to the two side plate parts, respectively. The two flange parts are connected through a corresponding lower corner part to a corresponding side plate part, respectively.

In the long structural member disclosed in Patent Literature 1, a reinforcing sheet part is joined to the top plate part, and a reinforcing sheet part is joined to each of the two upper corner parts. In the long structural member of Patent Literature 2, a reinforcing sheet part is joined to the top plate part and the two upper corner parts, respectively. In short, in the long structural members disclosed in Patent Literatures 1 and 2, the thickness of the top plate part increases by an amount corresponding to the thickness of the reinforcing sheet part, and the thickness of each of the two upper corner parts increases by an amount corresponding to the thickness of the reinforcing sheet part. The three-point bending characteristics are improved by increasing the thickness of each part. Further, because the increase in thickness is partial, an increase in weight is suppressed.

The long structural members disclosed in Patent Literatures 1 and 2 are produced by pressing a planar blank material. The blank material is formed from a main steel sheet extending across all of the blank material, and reinforcing steel sheets corresponding to the reinforcing sheet parts of the long structural member. The reinforcing steel sheets are superimposed at suitable places on the main steel sheet, and joined to the main steel sheet.

CITATION LIST

Patent Literature

Patent Literature 1: Japanese Patent Application Publication No. 2020-001076
Patent Literature 2: Japanese Patent Application Publication No. 2016-064725

SUMMARY OF INVENTION

Technical Problem

However, according to the prior art disclosed in Patent Literatures 1 and 2, sufficient investigation has not been carried out with regard to the positions and sizes of the regions occupied by the reinforcing sheet parts in each long structural member, and it is difficult to say that both an improvement in the three-point bending characteristics and suppression of an increase in weight can be effectively obtained.

An objective of the present disclosure is to provide a long structural member that is excellent in both improving three-point bending characteristics and suppressing an increase in weight. Another objective of the present disclosure is to provide a planar blank material suitable for producing the long structural member by press forming.

Solution to Problem

A long structural member according to the present disclosure includes a top plate part, a first side plate part, a second side plate part, a first flange part, a second flange part, a first upper corner part, a second upper corner part, a first lower corner part, and a second lower corner part. The top plate part extends in a longitudinal direction of the long structural member. The top plate part includes a first lateral edge and a second lateral edge. The first side plate part extends along the first lateral edge of the top plate part. The first side plate part includes a first upper edge and a first lower edge. The second side plate part extends along the second lateral edge of the top plate part. The second side plate part includes a second upper edge and a second lower edge. The first flange part extends along the first lower edge of the first side plate part. The first flange part includes a first connecting lateral edge and a first open lateral edge. The second flange part extends along the second lower edge of the second side plate part. The second flange part includes a second connecting lateral edge and a second open lateral edge. The first upper corner part connects the first lateral edge of the top plate part and the first upper edge of the first side plate part. The second upper corner part connects the second lateral edge of the top plate part and the second upper edge of the second side plate part. The first lower corner part connects the first lower edge of the first side plate part and the first connecting lateral edge of the first flange part. The second lower corner part connects the second lower edge of the second side plate part and the second connecting lateral edge of the second flange part.

In a transverse section of one part or all of the long structural member in the longitudinal direction of the long structural member, the long structural member includes the following configuration. The top plate part, the first flange part, and the second flange part are flat. The first side plate part, the first upper corner part, and the first lower corner part constitute a first thick-wall part. A thickness of the first thick-wall part is greater than a thickness of the top plate part and is greater than a thickness of the first flange part. The second side plate part, the second upper corner part, and the second lower corner part constitute a second thick-wall part. A thickness of the second thick-wall part is greater than a thickness of the top plate part and is greater than a thickness of the second flange part.

A planar blank material according to the present disclosure is suitable for producing the aforementioned long structural member by press forming. The blank material includes a top plate corresponding part, a first upper corner corresponding part, a second upper corner corresponding part, a first side plate corresponding part, a second side plate corresponding part, a first lower corner corresponding part, a second lower corner corresponding part, a first flange corresponding part, and a second flange corresponding part. The top plate corresponding part corresponds to the top plate part. The top plate corresponding part extends in a longitudinal direction of the blank material. The first upper corner corresponding part corresponds to the first upper corner part. The first upper corner corresponding part is connected to one lateral edge of the top plate corresponding part. The second upper corner corresponding part corresponds to the second upper corner part. The second upper corner corresponding part is connected to the other lateral edge of the top plate corresponding part. The first side plate corresponding part corresponds to the first side plate part. The first side plate corresponding part is connected to a lateral edge of the first upper corner corresponding part. The second side plate corresponding part corresponds to the second side plate part. The second side plate corresponding part is connected to a lateral edge of the second upper corner corresponding part. The first lower corner corresponding part corresponds to the first lower corner part. The first lower corner corresponding part is connected to a lateral edge of the first side plate corresponding part. The second lower corner corresponding part corresponds to the second lower corner part. The second lower corner corresponding part is connected to a lateral edge of the second side plate corresponding part. The first flange corresponding part corresponds to the first flange part. The first flange corresponding part is connected to a lateral edge of the first lower corner corresponding part. The second flange corresponding part corresponds to the second flange part. The second flange corresponding part is connected to a lateral edge of the second lower corner corresponding part.

In one part or all of the blank material in the longitudinal direction of the blank material, the blank material includes the following configuration. The first side plate corresponding part, the first upper corner corresponding part, and the first lower corner corresponding part constitute a first thick-wall corresponding part that corresponds to the first thick-wall part. A thickness of the first thick-wall corresponding part is greater than a thickness of the top plate corresponding part, and is greater than a thickness of the first flange corresponding part. The second side plate corresponding part, the second upper corner corresponding part, and the second lower corner corresponding part constitute a second thick-wall corresponding part that corresponds to the second thick-wall part. A thickness of the second thick-wall corresponding part is greater than a thickness of the top plate corresponding part, and is greater than a thickness of the second flange corresponding part.

Advantageous Effects of Invention

The long structural member according to the present disclosure is excellent in both improving three-point bending characteristics and suppressing an increase in weight in a compatible manner. The blank material according to the present disclosure can be produced into the long structural member described above by press forming.

DESCRIPTION OF EMBODIMENTS

Figure 1:
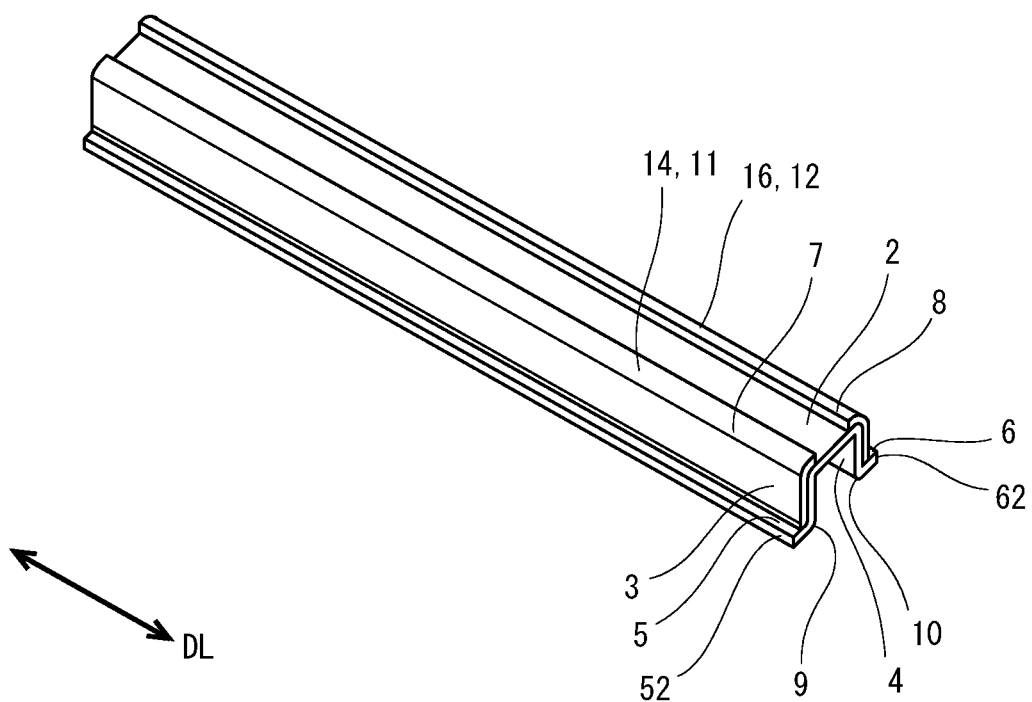
FIG. 1 is a perspective view that schematically illustrates the overall structure of a long structural member of a first embodiment.

Embodiments of the present disclosure are described hereunder. Note that, although embodiments of the present disclosure are described by way of examples in the following description, the present disclosure is not limited to the examples described hereunder. Although in the following description specific numerical values and specific materials may be described as examples, the present disclosure is not limited to those examples of numerical values and materials.

A long structural member according to an embodiment of the present disclosure includes a top plate part, a first side plate part, a second side plate part, a first flange part, a second flange part, a first upper corner part, a second upper corner part, a first lower corner part, and a second lower corner part. The top plate part extends in the longitudinal direction of the long structural member. The top plate part includes a first lateral edge and a second lateral edge. The first side plate part extends along the first lateral edge of the top plate part. The first side plate part includes a first upper edge and a first lower edge. The second side plate part extends along the second lateral edge of the top plate part. The second side plate part includes a second upper edge and a second lower edge. The first flange part extends along the first lower edge of the first side plate part. The first flange part includes a first connecting lateral edge and a first open lateral edge. The second flange part extends along the second lower edge of the second side plate part. The second flange part includes a second connecting lateral edge and a second open lateral edge. The first upper corner part connects the first lateral edge of the top plate part and the first upper edge of the first side plate part. The second upper corner part connects the second lateral edge of the top plate part and the second upper edge of the second side plate part. The first lower corner part connects the first lower edge of the first side plate part and the first connecting lateral edge of the first flange part. The second lower corner part connects the second lower edge of the second side plate part and the second connecting lateral edge of the second flange part.

In a transverse section of one part or all of the long structural member in the longitudinal direction of the long structural member, the long structural member includes the following configuration. The top plate part, the first flange part, and the second flange part are flat. The first side plate part, the first upper corner part, and the first lower corner part constitute a first thick-wall part. A thickness of the first thick-wall part is greater than a thickness of the top plate part and is greater than a thickness of the first flange part. The second side plate part, the second upper corner part, and the second lower corner part constitute a second thick-wall part. A thickness of the second thick-wall part is greater than a thickness of the top plate part and is greater than a thickness of the second flange part (first configuration).

The term "transverse section of the long structural member" means a cross section that is perpendicular to the longitudinal direction of the long structural member. The term "longitudinal direction of the long structural member" means the direction along which the long structural member extends, in other words, the direction along which the top plate part extends. From another viewpoint, the term "longitudinal direction of the long structural member" means the direction along which a base part to be described later extends.

The term "thickness of the top plate part" means the average of thicknesses which are measured at an arbitrary plurality of points of the top plate part in a transverse section that includes the first thick-wall part and the second thick-wall part. Similarly, the term "thickness of the first flange part" means the average of thicknesses which are measured at an arbitrary plurality of points of the first flange part in a transverse section that includes the first thick-wall part and the second thick-wall part. Similarly, the term "thickness of the second flange part" means the average of thicknesses which are measured at an arbitrary plurality of points of the second flange part in a transverse section that includes the first thick-wall part and the second thick-wall part. The number of thickness measurement points in the respective parts is not particularly limited. For example, the number of thickness measurement points is five.

When a collision load is applied to the long structural member, a bending load is introduced to the top plate part, and the top plate part buckles with both end portions in the longitudinal direction acting as fulcrums. Accompanying this, compressive stress acts on the top plate part, the first upper corner part, the first side plate part, the second upper corner part, and the second side plate part, and each of these parts bends so as to be crushed. In the long structural member according to the first configuration, in a transverse section which includes the first thick-wall part and the second thick-wall part, the first side plate part, the first upper corner part and the first lower corner part are thicker than the top plate part and the first flange part, and the second side plate part, the second upper corner part and the second lower corner part are thicker than the top plate part and the second flange part.

With regard to the first thick-wall part, if the first side plate part is thick, the flexural rigidity in the thickness direction of the first side plate part itself will increase. This is because the flexural rigidity is proportional to the cube of the sheet thickness. In addition, if the first upper corner part is thick, even if the top plate part is bent by a bending load, it will be difficult for bending displacement of the top plate part to be transmitted to the first side plate part. Moreover, since the force of constraint between the first side plate part and the top plate part increases, rotational displacement of the first side plate part with respect to the top plate part in the transverse section is suppressed. In addition, if the first lower corner part is thick, the force of constraint between the first side plate part and the first flange part will increase. Therefore, rotational displacement of the first side plate part with respect to the first flange part in the transverse section will be suppressed. Because of these synergetic effects, the first side plate part is difficult to bend. In short, in a transverse section of the long structural member, if the first side plate part, the first upper corner part, and the first lower corner part are formed to be thick-walled, even if the top plate part and the first flange part are thin, the first side plate part will be difficult to bend.

The above situation applies to the second thick-wall part also. That is, with regard to the second thick-wall part, if the second side plate part is thick, the flexural rigidity in the thickness direction of the second side plate part itself will increase. In addition, if the second upper corner part is thick, even if the top plate part is bent by a bending load, it will be difficult for bending displacement of the top plate part to be transmitted to the second side plate part. Moreover, since the force of constraint between the second side plate part and the top plate part increases, rotational displacement of the second side plate part with respect to the top plate part in the transverse section is suppressed. In addition, if the second lower corner part is thick, the force of constraint between the second side plate part and the second flange part will increase. Therefore, rotational displacement of the second side plate part with respect to the second flange part in the transverse section will be suppressed. Because of these synergetic effects, the second side plate part is difficult to bend. In short, in a transverse section of the long structural member, if the second side plate part, the second upper corner part and the second lower corner part are formed to be thick-walled, even if the top plate part and the second flange part are thin, the second side plate part will be difficult to bend.

Thus, according to the long structural member of the first configuration, in a case where a bending load is introduced to the top plate part, the first side plate part and the second side plate part are difficult to bend. Therefore, the three-point bending characteristics of the long structural member improve. Moreover, because the top plate part, the first flange part, and the second flange part are thin, an increase in the weight of the long structural member can be suppressed. Therefore, the long structural member of the first configuration is excellent in both improving three-point bending characteristics and suppressing an increase in weight in a compatible manner.

Even if the first side plate part were thick-walled, if the first upper corner part remained thin similarly to the top plate part, and the first lower corner part remained thin similarly to the first flange part, the first side plate part would be easy to bend. Likewise, even if the second side plate part were thick-walled, if the second upper corner part remained thin similarly to the top plate part, and the second lower corner part remained thin similarly to the second flange part, the second side plate part would be easy to bend. In this case, an improvement in the three-point bending characteristics could not be expected.

Further, even if the top plate part and the first upper corner part were thick-walled, and the first lower corner part and the first flange part were also thick-walled, if the first side plate part remained thin, the first side plate part would be easy to bend. Likewise, even if the top plate part and the second upper corner part were thick-walled, and the second lower corner part and the second flange part were also thick-walled, if the second side plate part remained thin, the second side plate part would be easy to bend. In this case, an improvement in the three-point bending characteristics could not be expected.

In a typical example, the first thick-wall part and the second thick-wall part are present over the entire range in the longitudinal direction of the long structural member. However, the first thick-wall part and the second thick-wall part may be present at only one part of the long structural member in the longitudinal direction thereof. At a minimum, it suffices that the first thick-wall part and the second thick-wall part are present at a portion where a bending load will be introduced. Further, the first thick-wall part and the second thick-wall part may be present at a plurality of places in the longitudinal direction of the long structural member.

The long structural member is a long member that constitutes a frame of a movable body which it is assumed will be subjected to a collision. The movable body is, for example, an automobile. In the case of an automobile, the long structural member is a member that constitutes the framework of the vehicle body, for example, a center pillar. In this case, the long structural member may be a front pillar, a rear pillar, a bumper beam, or the like. Further, the movable body may be a ship (particularly a small ship), an airplane (particularly a small airplane), a wheelchair, a vehicle in an amusement park, or the like.

In a typical example, the transverse sectional shape of the long structural member is a hat shape or a C-shape. In the case of a hat shape, in a transverse section, the first flange part and the second flange part extend in the opposite direction to the direction in which the top plate part extends with respect to the first side plate part and the second side plate part to which the first flange part and the second flange part correspond, respectively. That is, in a transverse section, the first flange part and the second flange part extend outwardly with respect to each other. In the case of a C-shape, in a transverse section, the first flange part and the second flange part extend in the same direction as the direction in which the top plate part extends with respect to the first side plate part and the second side plate part to which the first flange part and the second flange part correspond, respectively. That is, in a transverse section, the first flange part and the second flange part extend inwardly with respect to each other.

In a typical example, the long structural member is straight in the longitudinal direction. The long structural member may curve in the longitudinal direction. The long structural member may curve over the whole area thereof in the longitudinal direction, or may curve at one portion thereof in the longitudinal direction. Further, the transverse sectional shape of the long structural member may be constant in the longitudinal direction, or may change in the longitudinal direction.

As described above, in a transverse section of the long structural member, the top plate part, the first flange part, and the second flange part are flat. However, these respective parts are not limited to only strictly flat members, and include members having a shape that rises and falls slightly. In a typical example, the first flange part and the second flange part are each parallel with the top plate part.

In a transverse section of the long structural member, the first side plate part and the second side plate part are flat. In a typical example, an angle formed by the first side plate part and the top plate part is a right angle. Similarly, an angle formed by the second side plate part and the top plate part is a right angle. However, these angles may be obtuse angles.

The shape and size of each of the first upper corner part, the first side plate part, the first lower corner part, and the first flange part may be the same as or different to the shape and size of the second upper corner part, the second side plate part, the second lower corner part, and the second flange part, respectively.

However, the first open lateral edge of the first flange part is open. That is, nothing is connected to the first open lateral edge. Similarly, the second open lateral edge of the second flange part is open. That is, nothing is connected to the second open lateral edge. If one side plate part were connected to each open lateral edge through a corner part, the corner part and side plate part connected to each open lateral edge would be weak with respect to a bending load introduced to the top plate part. In such case, an improvement in the three-point bending characteristics could not be expected.

Note that, the terms "upper" and "lower" added to names of respective parts of the long structural member refer to directions in a state where the top plate part is disposed on the upper side. That is, the terms "upper" and "lower" added to names of respective parts of the long structural member are terms that are attached for convenience of description, and do not indicate directions in a state in which the long structural member has been assembled in a movable body (for example, an automobile).

The long structural member of the first configuration may include the following configuration. The long structural member includes a base part, a first reinforcing sheet part, and a second reinforcing sheet part. The base part is formed from a single-material member extending in the longitudinal direction of the long structural member. The first reinforcing sheet part and the second reinforcing sheet part are joined to the base part. The first thick-wall part is formed by a first main sheet part in the base part and the first reinforcing sheet part being joined in a superimposed state. The second thick-wall part is formed by a second main sheet part in the base part and the second reinforcing sheet part being joined in a superimposed state (second configuration).

From another viewpoint, as a second configuration, the long structural member of the first configuration may include the following configuration. The first thick-wall part is formed from the first main sheet part and the first reinforcing sheet part which are superimposed on each other and joined to each other. The second thick-wall part is formed from the second main sheet part and the second reinforcing sheet part which are superimposed on each other and joined to each other. The first flange part, the first main sheet part, the top plate part, the second main sheet part, and the second flange part are of a single-material member, which are continuous with each other.

The long structural member of the second configuration can be produced by press forming, roll forming or the like using a so-called "patchwork blank" (hereunder, also referred to as "PWB") as a blank material. A PWB is a blank formed by superimposing planar reinforcing steel sheets at appropriate places on a planar main steel sheet and joining the reinforcing steel sheets to the main steel sheet.

In the long structural member of the second configuration, the first reinforcing sheet part is superimposed on the first main sheet part at the base part. The first reinforcing sheet part is joined to the first main sheet part of the base part. By this means, the first reinforcing sheet part is integrated with the base part. To ensure that a space is not formed between the integrated first reinforcing sheet part and first main sheet part, preferably the first reinforcing sheet part has a shape conforming to the shape of the sheet surface of the first main sheet part across the whole area of the sheet surface.

Further, in the long structural member of the second configuration, the second reinforcing sheet part is superimposed on the second main sheet part at the base part. The second reinforcing sheet part is joined to the second main sheet part of the base part. By this means, the second reinforcing sheet part is integrated with the base part. To ensure that a space is not formed between the integrated second reinforcing sheet part and second main sheet part, preferably the second reinforcing sheet part has a shape conforming to the shape of the sheet surface of the second main sheet part across the whole area of the sheet surface.

The long structural member of the second configuration may include the following configuration. The long structural member has a hat-shaped transverse sectional shape. The first reinforcing sheet part is welded to the base part at a first position that is further on the top plate part side than a center in a circumferential direction of the first upper corner part. In addition, the first reinforcing sheet part is welded to the base part at a second position that is further on the first flange part side than a center in a circumferential direction of first lower corner part. Further, the first reinforcing sheet part is not welded to the base part between the first position and the second position. The second reinforcing sheet part is welded to the base part at a third position that is further on the top plate part side than a center in a circumferential direction of the second upper corner part. In addition, the second reinforcing sheet part is welded to the base part at a fourth position that is further on the second flange part side than a center in a circumferential direction of the second lower corner part. Further, the second reinforcing sheet part is not welded to the base part between the third position and the fourth position (third configuration).

In the long structural member of the third configuration, the first reinforcing sheet part and the second reinforcing sheet part are integrated with the base part by welding. The welding positions are very unique.

Specifically, at one part or all of the long structural member in the longitudinal direction of the long structural member, the first reinforcing sheet part is superimposed on at least a portion constituting the first side plate part, the first upper corner part, and the first lower corner part of the base part. The first reinforcing sheet part constituting the first thick-wall part is welded to the base part at a first position that is further on the top plate part side than the center in the circumferential direction of the first upper corner part, and is welded to the base part at a second position that is further on the first flange part side than the center in the circumferential direction of the first lower corner part. However, the first reinforcing sheet part is not welded to the base part between the first position and the second position. In this case, there is a weld zone at the first position and at the second position, and there is no weld zone at the first side plate part. In the first upper corner part, there is also no weld zone at a location that is further on the first side plate part side than the center of the first upper corner part. In the first lower corner part, there is also no weld zone at a location that is further on the first side plate part side than the center of the first lower corner part.

The first position at which a weld zone is provided is not particularly limited as long as it is a position that is further on the top plate part side than the center in the circumferential direction of the first upper corner part. For example, the first position is at a boundary between the first upper corner part and the top plate part (the boundary corresponds to the first lateral edge of the top plate part). In the first upper corner part, the first position may be in the vicinity of the boundary between the first upper corner part and the top plate part. In the top plate part, the first position may be in the vicinity of the boundary between the first upper corner part and the top plate part. In this case, if there is one weld zone, there will be no weld zone in the first upper corner part. However, a plurality of weld zones may be provided at positions that are further on the top plate part side than the center in the circumferential direction of the first upper corner part. In this case, the term "first position" refers to the position of a weld zone that is nearest to the center in the circumferential direction of the first upper corner part among the plurality of weld zones.

The second position at which a weld zone is provided is not particularly limited as long as it is a position that is further on the first flange part side than the center in the circumferential direction of the first lower corner part. For example, the second position is at a boundary between the first lower corner part and the first flange part (the boundary corresponds to the first connecting lateral edge of the first flange part). In the first lower corner part, the second position may be in the vicinity of the boundary between the first lower corner part and the first flange part. In the first flange part, the second position may be in the vicinity of the boundary between the first lower corner part and the first flange part. In this case, if there is one weld zone, there will be no weld zone in the first lower corner part. However, a plurality of weld zones may be provided at positions that are further on the first flange part side than the center in the circumferential direction of the first lower corner part. In this case, the term "second position" refers to the position of a weld zone that is nearest to the center in the circumferential direction of the first lower corner part among the plurality of weld zones.

Further, at one part or all of the long structural member in the longitudinal direction of the long structural member, the second reinforcing sheet part is superimposed on at least a portion constituting the second side plate part, the second upper corner part, and the second lower corner part of the base part. The second reinforcing sheet part constituting the second thick-wall part is welded to the base part at a third position that is further on the top plate part side than the center in the circumferential direction of the second upper corner part, and is welded to the base part at a fourth position that is further on the second flange part side than the center in the circumferential direction of the second lower corner part. However, the second reinforcing sheet part is not welded to the base part between the third position and the fourth position. In this case, there is a weld zone at the third position and the fourth position, and there is no weld zone at the second side plate part. In the second upper corner part, there is also no weld zone at a location that is further on the second side plate part side than the center of the second upper corner part. In the second lower corner part, there is also no weld zone at a location that is further on the second side plate part side than the center of the second lower corner part.

The third position at which a weld zone is provided is not particularly limited as long as it is a position that is further on the top plate part side than the center in the circumferential direction of the second upper corner part. For example, the third position is at a boundary between the second upper corner part and the top plate part (the boundary corresponds to the second lateral edge of the top plate part). In the second upper corner part, the third position may be in the vicinity of the boundary between the second upper corner part and the top plate part. In the top plate part, the third position may be in the vicinity of the boundary between the second upper corner part and the top plate part. In this case, if there is one weld zone, there will be no weld zone in the second upper corner part. However, a plurality of weld zones may be provided at positions that are further on the top plate part side than the center in the circumferential direction of the second upper corner part. In this case, the term "third position" refers to the position of a weld zone that is nearest to the center in the circumferential direction of the second upper corner part among the plurality of weld zones.

The fourth position at which a weld zone is provided is not particularly limited as long as it is a position that is further on the second flange part side than the center in the circumferential direction of the second lower corner part. For example, the fourth position is at a boundary between the second lower corner part and the second flange part (the boundary corresponds to the second connecting lateral edge of the second flange part). In the second lower corner part, the fourth position may be in the vicinity of the boundary between the second lower corner part and the second flange part. In the second flange part, the fourth position may be in the vicinity of the boundary between the second lower corner part and the second flange part. In this case, if there is one weld zone, there will be no weld zone in the second lower corner part. However, a plurality of weld zones may be provided at positions that are further on the second flange part side than the center in the circumferential direction of the second lower corner part. In this case, the term "fourth position" refers to the position of a weld zone that is nearest to the center in the circumferential direction of the second lower corner part among the plurality of weld zones.

According to the long structural member of the third configuration having the welding positions described above, the following characteristic advantageous effects are obtained.

The long structural member of the third configuration formed from the base part, the first reinforcing sheet part, and the second reinforcing sheet part is produced by press forming. For example, the blank material used for press forming includes a main steel sheet that corresponds to the base part, a first reinforcing steel sheet that corresponds to the first reinforcing sheet part, and a second reinforcing steel sheet that corresponds to the second reinforcing sheet part. The first reinforcing steel sheet is welded to the main steel sheet at positions corresponding to the first position and the second position, respectively. The second reinforcing steel sheet is welded to the main steel sheet at positions corresponding to the third position and the fourth position, respectively. When performing press forming, in the blank material, a portion that will become the first upper corner part, and a portion that will become the second upper corner part are bent so as to become a shape that is convex toward the outside of the long structural member. A portion that will become the first lower corner part, and a portion that will become the second lower corner part are bent so as to become a shape that is concave toward the outside of the long structural member.

Here, a case of forming the long structural member in which the first reinforcing sheet part and the second reinforcing sheet part are arranged on the outer surface of the base part will be considered. In this case, in the blank material, the first reinforcing steel sheet that corresponds to the first reinforcing sheet part, and the second reinforcing steel sheet that corresponds to the second reinforcing sheet part are arranged on the outer surface of the main steel sheet that corresponds to the base part.

When performing press forming, at a portion that will become the first upper corner part, the first reinforcing steel sheet deforms such that the circumferential length of the cross section thereof becomes longer. Therefore, at the first upper corner part that is formed, tensile stress occurs in the first reinforcing sheet part. Due to this tensile stress, tensile strain occurs in the first reinforcing sheet part at the first upper corner part. As a result, shear stress occurs in the weld zone at the first position.

On the other hand, at a portion that will become the first lower corner part, the first reinforcing steel sheet deforms such that the circumferential length of the cross section thereof becomes shorter. Therefore, at the first lower corner part that is formed, compressive stress occurs in the first reinforcing sheet part. Due to this compressive stress, compressive strain occurs in the first reinforcing sheet part at the first lower corner part. As a result, shear stress occurs in the weld zone at the second position.

When performing such press forming, because there is no weld zone between the first position and the second position, the first reinforcing sheet part is not constrained by the base part at the first side plate part between the first position and the second position. Hence, the tensile stress that occurs in the first reinforcing sheet part at the first upper corner part, and the compressive stress that occurs in the first reinforcing sheet part at the first lower corner part are transmitted to each other through the first side plate part. Thus, the strain of the first upper corner part and the strain of the first lower corner part cancel each other out. Therefore, shear stress occurring in the respective weld zones at the first position and the second position is suppressed.

Similarly to the situation described above, when performing press forming, at a portion that will become the second upper corner part, the second reinforcing steel sheet deforms such that the circumferential length of a cross section thereof becomes longer. Therefore, at the second upper corner part that is formed, tensile stress occurs in the second reinforcing sheet part. Due to this tensile stress, tensile strain occurs in the second reinforcing sheet part at the second upper corner part. As a result, shear stress occurs in the weld zone at the third position.

On the other hand, at a portion that will become the second lower corner part, the second reinforcing steel sheet deforms such that the circumferential length of the cross section thereof becomes shorter. Therefore, at the second lower corner part that is formed, compressive stress occurs in the second reinforcing sheet part. Due to this compressive stress, compressive strain occurs in the second reinforcing sheet part at the second lower corner part. As a result, shear stress occurs in the weld zone at the fourth position.

When performing such press forming, because there is no weld zone between the third position and the fourth position, the second reinforcing sheet part is not constrained by the base part at the second side plate part between the third position and the fourth position. Hence, the tensile stress that occurs in the second reinforcing sheet part at the second upper corner part, and the compressive stress that occurs in the second reinforcing sheet part at the second lower corner part are transmitted to each other through the second side plate part. Thus, the strain of the second upper corner part and the strain of the second lower corner part cancel each other out. Therefore, shear stress occurring in the respective weld zones at the third position and the fourth position is suppressed.

Further, a case of forming the long structural member in which the first reinforcing sheet part and the second reinforcing sheet part are arranged on the inner surface of the base part will be considered. In this case, in the blank material, the first reinforcing steel sheet that corresponds to the first reinforcing sheet part, and the second reinforcing steel sheet that corresponds to the second reinforcing sheet part are arranged on the inner surface of the main steel sheet that corresponds to the base part.

When performing press forming, at a portion that will become the first upper corner part, the first reinforcing steel sheet deforms such that the circumferential length of a cross section thereof becomes shorter. Therefore, at the first upper corner part that is formed, compressive stress occurs in the first reinforcing sheet part. Due to this compressive stress, compressive strain occurs in the first reinforcing sheet part at the first upper corner part. As a result, shear stress occurs in the weld zone at the first position.

On the other hand, at a portion that will become the first lower corner part, the first reinforcing steel sheet deforms such that the circumferential length of the cross section thereof becomes longer. Therefore, at the first lower corner part that is formed, tensile stress occurs in the first reinforcing sheet part. Due to this tensile stress, tensile strain occurs in the first reinforcing sheet part at the first lower corner part. As a result, shear stress occurs in the weld zone at the second position.

When performing such press forming, because there is no weld zone between the first position and the second position, the first reinforcing sheet part is not constrained by the base part at the first side plate part between the first position and the second position. Hence, the compressive stress that occurs in the first reinforcing sheet part at the first upper corner part, and the tensile stress that occurs in the first reinforcing sheet part at the first lower corner part are transmitted to each other through the first side plate part. By this means, the strain of the first upper corner part and the strain of the first lower corner part cancel each other out. Therefore, shear stress occurring in the respective weld zones at the first position and the second position is suppressed.

Similarly to the situation described above, when performing press forming, at a portion that will become the second upper corner part, the second reinforcing steel sheet deforms such that the circumferential length of a cross section thereof becomes shorter. Therefore, at the second upper corner part that is formed, compressive stress occurs in the second reinforcing sheet part. Due to this compressive stress, compressive strain occurs in the second reinforcing sheet part at the second upper corner part. As a result, shear stress occurs in the weld zone at the third position.

On the other hand, at a portion that will become the second lower corner part, the second reinforcing steel sheet deforms such that the circumferential length of the cross section thereof becomes longer. Therefore, at the second lower corner part that is formed, tensile stress occurs in the second reinforcing sheet part. Due to this tensile stress, tensile strain occurs in the second reinforcing sheet part at the second lower corner part. As a result, shear stress occurs in the weld zone at the fourth position.

When performing such press forming, because there is no weld zone between the third position and the fourth position, the second reinforcing sheet part is not constrained by the base part at the second side plate part between the third position and the fourth position. Hence, the compressive stress that occurs in the second reinforcing sheet part at the second upper corner part, and the tensile stress that occurs in the second reinforcing sheet part at the second lower corner part are transmitted to each other through the second side plate part. Thus, the strain of the second upper corner part and the strain of the second lower corner part cancel each other out. Therefore, shear stress occurring in the respective weld zones at the third position and the fourth position is suppressed.

If the shear stress occurring in the weld zones during press forming is suppressed in this way, it is possible to suppress deformation of the weld zones. By suppressing deformation of the weld zones, the cross-sectional shape of the weld zones is stabilized. By this means, in the long structural member, the width of the weld zones is sufficiently secured and the strength of the weld zones is also sufficiently secured.

Therefore, according to the long structural member of the third configuration, when a collision load is applied to the long structural member, it is difficult for rupturing of the weld zones to occur, and it is also difficult for peeling of the weld zones to occur. Therefore, the three-point bending characteristics are further improved.

If a weld zone were added between the first position and the second position, the improvement in the three-point bending characteristics would be limited. The reason is described hereunder.

When performing press forming, although the stress that occurs in the first reinforcing sheet part at the first upper corner part and the stress that occurs in the first reinforcing sheet part at the first lower corner part are transmitted to each other through the first side plate part, if a weld zone is added at the first side plate part, such transmission of stress will be inhibited by the added weld zone. In this case, the strain of the first upper corner part and the strain of the first lower corner part will not cancel each other out, and will remain. Therefore, a large amount of shear stress will remain in the respective weld zones at the first position and the second position. Consequently, in the long structural member, the width of the weld zones will be narrow, and the strength of the weld zones will tend to be insufficient. A similar situation will also occur in a case where a weld zone is added at a position that is further on the first side plate part side than the center of the first upper corner part, and in a case where a weld zone is added at a position that is further on the first side plate part side than the center of the first lower corner part.

Further, if a weld zone were added between the third position and the fourth position, the improvement in the three-point bending characteristics would be limited. The reason is described hereunder.

When performing press forming, although the stress that occurs in the second reinforcing sheet part at the second upper corner part and the stress that occurs in the second reinforcing sheet part at the second lower corner part are transmitted to each other through the second side plate part, if a weld zone is added at the second side plate part, such transmission of stress will be inhibited by the added weld zone. In this case, the strain of the second upper corner part and the strain of the second lower corner part will not cancel each other out, and will remain. Therefore, a large amount of shear stress will remain in the respective weld zones at the third position and the fourth position. Consequently, in the long structural member, the width of the weld zones will be narrow, and the strength of the weld zones will tend to be insufficient. A similar situation will also occur in a case where a weld zone is added at a position that is further on the second side plate part side than the center of the second upper corner part, and in a case where a weld zone is added at a position that is further on the second side plate part side than the center of the second lower corner part.

The shape and size of the first reinforcing sheet part may be the same as or different to the shape and size of the second reinforcing sheet part.

In the long structural member of the third configuration, the first reinforcing sheet part and the second reinforcing sheet part may be arranged on an outer surface of the base part (fourth configuration). In other words, the first reinforcing sheet part is superimposed on the outer surface of the first main sheet part, and the second reinforcing sheet part is superimposed on the outer surface of the second main sheet part. The first reinforcing sheet part and the second reinforcing sheet part are each visible from the outer surface side of the top plate part. According to the fourth configuration, in the case of joining the first flange part and the second flange part to a closing plate as will be described later, it is easy to perform the joining.

The long structural member of the fourth configuration preferably includes the following configuration. A distance from the center in the circumferential direction of the first upper corner part to the first position is greater than a distance from the center in the circumferential direction of the first lower corner part to the second position. A distance from the center in the circumferential direction of the second upper corner part to the third position is greater than a distance from the center in the circumferential direction of the second lower corner part to the fourth position (fifth configuration).

Generally, when a collision load is applied to the long structural member, a larger force acts on the weld zone at the first position compared to the weld zone at the second position. Further, a larger force acts on the weld zone at the third position compared to the weld zone at the fourth position. Therefore, the smaller the tensile residual stress is at the weld zones at each of the first position and the third position, the better it is with respect to the collision load.

When performing press forming, tensile stress that occurs in the first reinforcing sheet part at the first upper corner part acts on the weld zone at the first position, and compressive stress that occurs in the first reinforcing sheet part at the first lower corner part acts on the weld zone at the second position, and in this regard, in the fifth configuration, the influence of the tensile stress on the weld zone at the first position is smaller in comparison to the influence of the compressive stress on the weld zone at the second position. Therefore, the tensile residual stress at the weld zone at the first position decreases. Thus, the three-point bending characteristics are further improved.

Further, when performing press forming, tensile stress that occurs in the second reinforcing sheet part at the second upper corner part acts on the weld zone at the third position, and compressive stress that occurs in the second reinforcing sheet part at the second lower corner part acts on the weld zone at the fourth position, and in this regard, in the fifth configuration, the influence of the tensile stress on the weld zone at the third position is smaller in comparison to the influence of the compressive stress on the weld zone at the fourth position. Therefore, the tensile residual stress at the weld zone at the third position decreases. Thus, the three-point bending characteristics are further improved.

The long structural member according to any one of the third to fifth configurations preferably includes the following configuration. The first reinforcing sheet part is linearly welded at the first position and the second position to the base part. The second reinforcing sheet part is linearly welded at the third position and the fourth position to the base part (sixth configuration).

In the case of the sixth configuration, the first reinforcing sheet part and the second reinforcing sheet part are firmly joined to the base part by linear welding. Linear welding is welding in which a weld zone appears in a linear shape, and in a typical example is laser welding.

The long structural member of any one of the third to sixth configurations may include the following configuration. The first reinforcing sheet part is point welded at the first position and the second position to the base part. The second reinforcing sheet part is point welded at the third position and the fourth position to the base part (seventh configuration).

In the case of the seventh configuration, the first reinforcing sheet part and the second reinforcing sheet part are firmly joined to the base part by point welding. The point welding is welding in which the weld zone appears in a spot shape, and in a typical example is spot welding. Naturally, the first reinforcing sheet part and the second reinforcing sheet part may also be joined to the base part by a combination of linear welding and point welding. That is, laser welding and spot welding may be used in combination.

In the long structural member of the second or third configuration, the first reinforcing sheet part and the second reinforcing sheet part may be arranged on an inner surface of the base part (eighth configuration). In other words, the first reinforcing sheet part is superimposed on the inner surface of the first main sheet part, and the second reinforcing sheet part is superimposed on the inner surface of the second main sheet part. In the case of the eighth configuration, neither the first reinforcing sheet part nor the second reinforcing sheet part is visible from the outer surface side of the top plate part. That is, neither the first reinforcing sheet part nor the second reinforcing sheet part appears in the exterior of the long structural member. Therefore, the outward appearance is good.

The long structural member of the first configuration may include the following configuration. The first thick-wall part is a single-material member, and is joined to the top plate part and the first flange part. The second thick-wall part is a single-material member, and is joined to the top plate part and the second flange part (ninth configuration).

The long structural member of the ninth configuration can be produced by press forming, roll forming or the like using a so-called "tailored welded blank" (hereunder, also referred to as "TWB") as a blank material. A TWB is a blank obtained by arranging, at appropriate positions, a main steel sheet and reinforcing steel sheets which are thicker than the main steel sheet, and butt welding the steel sheets to each other. The welding in this case is laser welding.

The long structural member of the first configuration may include the following configuration. The first flange part, the first thick-wall part, the top plate part, the second thick-wall part, and the second flange part are of a single-material member, which are continuous with each other (tenth configuration).

The long structural member of the tenth configuration can be produced by extrusion forming or injection forming or the like. In this case, the material of the long structural member is aluminum or engineering plastic or the like.

The long structural member of any one of the first, second, and eighth to tenth configurations preferably includes the following configuration. In a transverse section of the long structural member, the first flange part extends in an opposite direction to a direction in which the top plate part extends with respect to the first side plate part. The second flange part extends in an opposite direction to a direction in which the top plate part extends with respect to the second side plate part (eleventh configuration).

The transverse sectional shape of the long structural member of the eleventh configuration is a hat shape. In this case, in a transverse section, the first flange part and the second flange part extend outward with respect to each other. The hat-shaped long structural member is easy to form. Further, the hat-shaped long structural member is easy to attach to other members of a movable body (for example, an automobile body) at each flange part.

The long structural member of any one of the third to seventh configurations and eleventh configuration can include a closing plate that is joined to the first flange part and the second flange part (twelfth configuration). In this case, the transverse sectional shape of the long structural member is a closed sectional shape. Therefore, the three-point bending characteristics further improve.

Further, a planar blank material according to an embodiment of the present disclosure is suitable for producing the long structural member of the first configuration by press forming. The blank material includes a top plate corresponding part, a first upper corner corresponding part, a second upper corner corresponding part, a first side plate corresponding part, a second side plate corresponding part, a first lower corner corresponding part, a second lower corner corresponding part, a first flange corresponding part, and a second flange corresponding part. The top plate corresponding part corresponds to the top plate part. The top plate corresponding part extends in a longitudinal direction of the blank material. The first upper corner corresponding part corresponds to the first upper corner part. The first upper corner corresponding part is connected to one lateral edge of the top plate corresponding part. The second upper corner corresponding part corresponds to the second upper corner part. The second upper corner corresponding part is connected to the other lateral edge of the top plate corresponding part. The first side plate corresponding part corresponds to the first side plate part. The first side plate corresponding part is connected to a lateral edge of the first upper corner corresponding part. The second side plate corresponding part corresponds to the second side plate part. The second side plate corresponding part is connected to a lateral edge of the second upper corner corresponding part. The first lower corner corresponding part corresponds to the first lower corner part. The first lower corner corresponding part is connected to a lateral edge of the first side plate corresponding part. The second lower corner corresponding part corresponds to the second lower corner part. The second lower corner corresponding part is connected to a lateral edge of the second side plate corresponding part. The first flange corresponding part corresponds to the first flange part. The first flange corresponding part is connected to a lateral edge of the first lower corner corresponding part. The second flange corresponding part corresponds to a second flange part. The second flange corresponding part is connected to a lateral edge of the second lower corner corresponding part.

In a part or all of the blank material in the longitudinal direction of the blank material, the blank material includes the following configuration. The first side plate corresponding part, the first upper corner corresponding part, and the first lower corner corresponding part constitute a first thick-wall corresponding part that corresponds to the first thick-wall part. A thickness of the first thick-wall corresponding part is greater than a thickness of the top plate corresponding part, and is greater than a thickness of the first flange corresponding part. The second side plate corresponding part, the second upper corner corresponding part, and the second lower corner corresponding part constitute a second thick-wall corresponding part that corresponds to the second thick-wall part. A thickness of the second thick-wall corresponding part is greater than a thickness of the top plate corresponding part, and is greater than a thickness of the second flange corresponding part (thirteenth configuration).

The blank material of the thirteenth configuration is a PWB or a TWB. By subjecting the blank material of the thirteenth configuration to press forming, the long structural member of the first configuration can be produced.

In the blank material, the first thick-wall corresponding part is arranged at a position corresponding to the first thick-wall part. The second thick-wall corresponding part is arranged at a position corresponding to the second thick-wall part. Therefore, in the case of producing the long structural member in which each thick-wall part is present over the entire range in the longitudinal direction of the long structural member, each thick-wall corresponding part is present over the entire range in the longitudinal direction of the blank material. In the case of producing the long structural member in which each thick-wall part is present at one part in the longitudinal direction of the long structural member, each thick-wall corresponding part is present at one part in the longitudinal direction of the blank material.

The blank material of the thirteenth configuration may include the following configuration. The long structural member includes a base part formed from a single-material member extending in the longitudinal direction of the long structural member. In this case, the blank material is formed from a main steel sheet corresponding to the base part, a first reinforcing steel sheet, and a second reinforcing steel sheet. The main steel sheet extends over all of the blank material. The first reinforcing steel sheet is superimposed at a position of the first thick-wall corresponding part of the main steel sheet, and joined to the main steel sheet. The second reinforcing steel sheet is superimposed at a position of the second thick-wall corresponding part of the main steel sheet, and joined to the main steel sheet (fourteenth configuration).

The blank material of the fourteenth configuration is a PWB. The method used for joining the main steel sheet and each reinforcing steel sheet is welding. In a typical example, the welding is laser welding. The welding may be spot welding, or may be welding that combines the use of laser welding and spot welding.

The blank material of the fourteenth configuration may include the following configuration. The first reinforcing steel sheet is welded to the main steel sheet at a first position that is further on the top plate corresponding part side than a center in a width direction of the first upper corner corresponding part. In addition, the first reinforcing steel sheet is welded to the main steel sheet at a second position that is further on the first flange corresponding part side than a center in a width direction of the first lower corner corresponding part. The first reinforcing steel sheet is not welded to the main steel sheet between the first position and the second position. The second reinforcing steel sheet is welded to the main steel sheet at a third position that is further on the top plate corresponding part side than a center in a width direction of the second upper corner corresponding part. In addition, the second reinforcing steel sheet is welded to the main steel sheet at a fourth position that is further on the second flange corresponding part side than a center in a width direction of the second lower corner corresponding part. The second reinforcing steel sheet is not welded to the main steel sheet between the third position and the fourth position (fifteenth configuration).

Hereunder, specific examples of the long structural member according to the present embodiment are described while referring to the attached drawings. The same reference symbols will be used throughout the drawings to refer to the same or like parts, and description thereof will not be repeated.

First Embodiment

A long structural member 1 of a first embodiment, and a blank material 101 that is suitable for producing the long structural member 1 will be described referring to FIG. 1 to FIG. 3.

[Long Structural Member 1]

FIG. 1 is a perspective view that schematically illustrates the overall structure of the long structural member 1 of the first embodiment. FIG. 2 is a schematic diagram illustrating one example of the transverse sectional shape of the long structural member 1 of the first embodiment. The long structural member 1 of the present embodiment has a hat-shaped transverse sectional shape.

Figure 2:
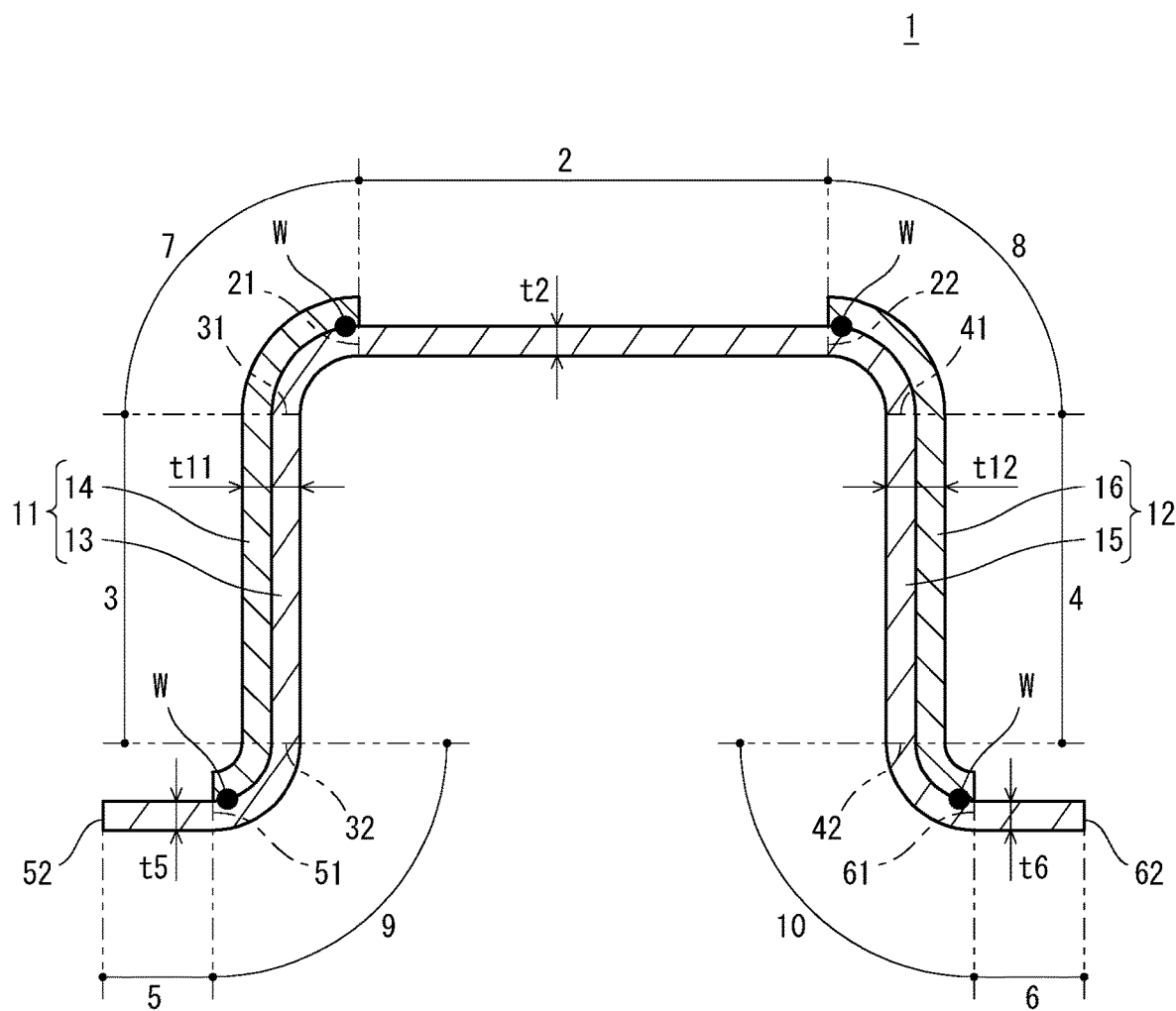
FIG. 2 is a schematic diagram illustrating an example of the transverse sectional shape of the long structural member of the first embodiment.

Referring to FIG. 1 and FIG. 2, the long structural member 1 includes a top plate part 2, a first side plate part 3, a second side plate part 4, a first flange part 5, a second flange part 6, a first upper corner part 7, a second upper corner part 8, a first lower corner part 9, and a second lower corner part 10. The top plate part 2 extends in a longitudinal direction DL of the long structural member 1 (see FIG. 1). The top plate part 2 includes a first lateral edge 21 and a second lateral edge 22. The first lateral edge 21 and the second lateral edge 22 correspond to both ends in the width direction of the top plate part 2, and extend in the longitudinal direction DL of the long structural member 1.

The first side plate part 3 extends along the first lateral edge 21 of the top plate part 2. The first side plate part 3 is arranged perpendicularly to the top plate part 2. The first side plate part 3 includes a first upper edge 31 and a first lower edge 32. The first upper corner part 7 connects the first lateral edge 21 of the top plate part 2 and the first upper edge 31 of the first side plate part 3. That is, the first side plate part 3 is connected to the top plate part 2 through the first upper corner part 7. The transverse sectional shape of the first upper corner part 7 is an arc shape (see FIG. 2).

The second side plate part 4 extends along the second lateral edge 22 of the top plate part 2. The second side plate part 4 is arranged perpendicularly to the top plate part 2. Therefore, the second side plate part 4 corresponds to the first side plate part 3. The second side plate part 4 includes a second upper edge 41 and a second lower edge 42. The second upper corner part 8 connects the second lateral edge 22 of the top plate part 2 and the second upper edge 41 of the second side plate part 4. That is, the second side plate part 4 is connected to the top plate part 2 through the second upper corner part 8. The transverse sectional shape of the second upper corner part 8 is an arc shape (see FIG. 2).

The first flange part 5 extends along the first lower edge 32 of the first side plate part 3. In a transverse section, with respect to the first side plate part 3, the first flange part 5 extends in the opposite direction to the extending direction of the top plate part 2 (see FIG. 2). The first flange part 5 includes a first connecting lateral edge 51 and a first open lateral edge 52. The first connecting lateral edge 51 is located at a position close to the first lower edge 32 of the first side plate part 3. The first lower corner part 9 connects the first lower edge 32 of the first side plate part 3 and the first connecting lateral edge 51 of the first flange part 5. That is, the first flange part 5 is connected to the first side plate part 3 through the first lower corner part 9. The transverse sectional shape of the first lower corner part 9 is an arc shape (see FIG. 2). Nothing is connected to the first open lateral edge 52 of the first flange part 5.

The second flange part 6 extends along the second lower edge 42 of the second side plate part 4. In a transverse section, with respect to the second side plate part 4, the second flange part 6 extends in the opposite direction to the extending direction of the top plate part 2 (see FIG. 2). Therefore, in a transverse section, the first flange part 5 and the second flange part 6 extend outward with respect to each other. The second flange part 6 includes a second connecting lateral edge 61 and a second open lateral edge 62. The second connecting lateral edge 61 is located at a position close to the second lower edge 42 of the second side plate part 4. The second lower corner part 10 connects the second lower edge 42 of the second side plate part 4 and the second connecting lateral edge 61 of the second flange part 6. That is, the second flange part 6 is connected to the second side plate part 4 through the second lower corner part 10. The transverse sectional shape of the second lower corner part 10 is an arc shape (see FIG. 2). Nothing is connected to the second open lateral edge 62 of the second flange part 6.

Referring to FIG. 2, in a transverse section of the long structural member 1, the top plate part 2 is flat. The first flange part 5 and the second flange part 6 are also flat. The first flange part 5 and the second flange part 6 are each parallel with the top plate part 2.

In a transverse section of the entire long structural member 1 in the longitudinal direction DL, the first side plate part 3, the first upper corner part 7, and the first lower corner part 9 constitute a first thick-wall part 11. A thickness t11 of the first thick-wall part 11 is greater than a thickness t2 of the top plate part 2. In addition, the thickness t11 of the first thick-wall part 11 is greater than a thickness t5 of the first flange part 5. That is, the first side plate part 3, the first upper corner part 7, and the first lower corner part 9 are formed to be thick-walled, and are thicker than the top plate part 2 and the first flange part 5. The top plate part 2 and the first flange part 5 remain thin.

Further, in a transverse section of the entire long structural member 1 in the longitudinal direction DL, the second side plate part 4, the second upper corner part 8, and the second lower corner part 10 constitute a second thick-wall part 12. A thickness t12 of the second thick-wall part 12 is greater than the thickness t2 of the top plate part 2. In addition, the thickness t12 of the second thick-wall part 12 is greater than a thickness t6 of the second flange part 6. That is, the second side plate part 4, the second upper corner part 8, and the second lower corner part 10 are formed to be thick-walled, and are thicker than the top plate part 2 and the second flange part 6. The top plate part 2 and the second flange part 6 remain thin.

Here, in the present embodiment, the first thick-wall part 11 (the first side plate part 3, the first upper corner part 7, and the first lower corner part 9) is formed from a first main sheet part 13 and a first reinforcing sheet part 14. The first main sheet part 13 and the first reinforcing sheet part 14 are superimposed on each other and joined to each other. Further, the second thick-wall part 12 (the second side plate part 4, the second upper corner part 8, and the second lower corner part 10) is formed from a second main sheet part 15 and a second reinforcing sheet part 16. The second main sheet part 15 and the second reinforcing sheet part 16 are superimposed on each other and joined to each other. The first main sheet part 13 is continuous with the top plate part 2 and the first flange part 5. The second main sheet part 15 is continuous with the top plate part 2 and the second flange part 6. That is, the first flange part 5, the first main sheet part 13, the top plate part 2, the second main sheet part 15, and the second flange part 6 are of a single-material member, which are continuous with each other.

The first reinforcing sheet part 14 is superimposed on the outer surface of the first main sheet part 13. The second reinforcing sheet part 16 is superimposed on the outer surface of the second main sheet part 15. In this case, the first reinforcing sheet part 14 and the second reinforcing sheet part 16 are both visible from the outer surface side of the top plate part 2.

Referring to FIG. 2, the first reinforcing sheet part 14 is joined at two places to the first main sheet part 13 by laser welding. Specifically, at the first upper corner part 7, there is a weld zone W in the vicinity of the boundary between the first upper corner part 7 and the top plate part 2. In addition, at the first lower corner part 9, there is a weld zone W in the vicinity of the boundary between the first lower corner part 9 and the first flange part 5. Each of these weld zones W extends along the longitudinal direction DL of the long structural member 1.

The second reinforcing sheet part 16 is joined at two places to the second main sheet part 15 by laser welding. Specifically, at the second upper corner part 8, there is a weld zone W in the vicinity of the boundary between the second upper corner part 8 and the top plate part 2. In addition, at the second lower corner part there is a weld zone W in the vicinity of the boundary between the second lower corner part 10 and the second flange part 6. Each of these weld zones W extends along the longitudinal direction DL of the long structural member 1.

Typically, the first reinforcing sheet part 14 and the second reinforcing sheet part 16 are formed from a steel sheet. The first reinforcing sheet part 14 and the second reinforcing sheet part 16 may be formed from a sheet made of resin. The first reinforcing sheet part 14 and the second reinforcing sheet part 16 formed from a sheet made of resin are not particularly limited, and may be joined by face-bonding to the first main sheet part 13.

The long structural member 1 configured as described above is produced by press forming using a PWB (patchwork blank) as a blank material. It is also possible to produce the long structural member 1 by roll forming. Hereunder, a blank material 101 used to produce the long structural member 1 of the present embodiment is described.

[Blank Material 101]

Figure 3:
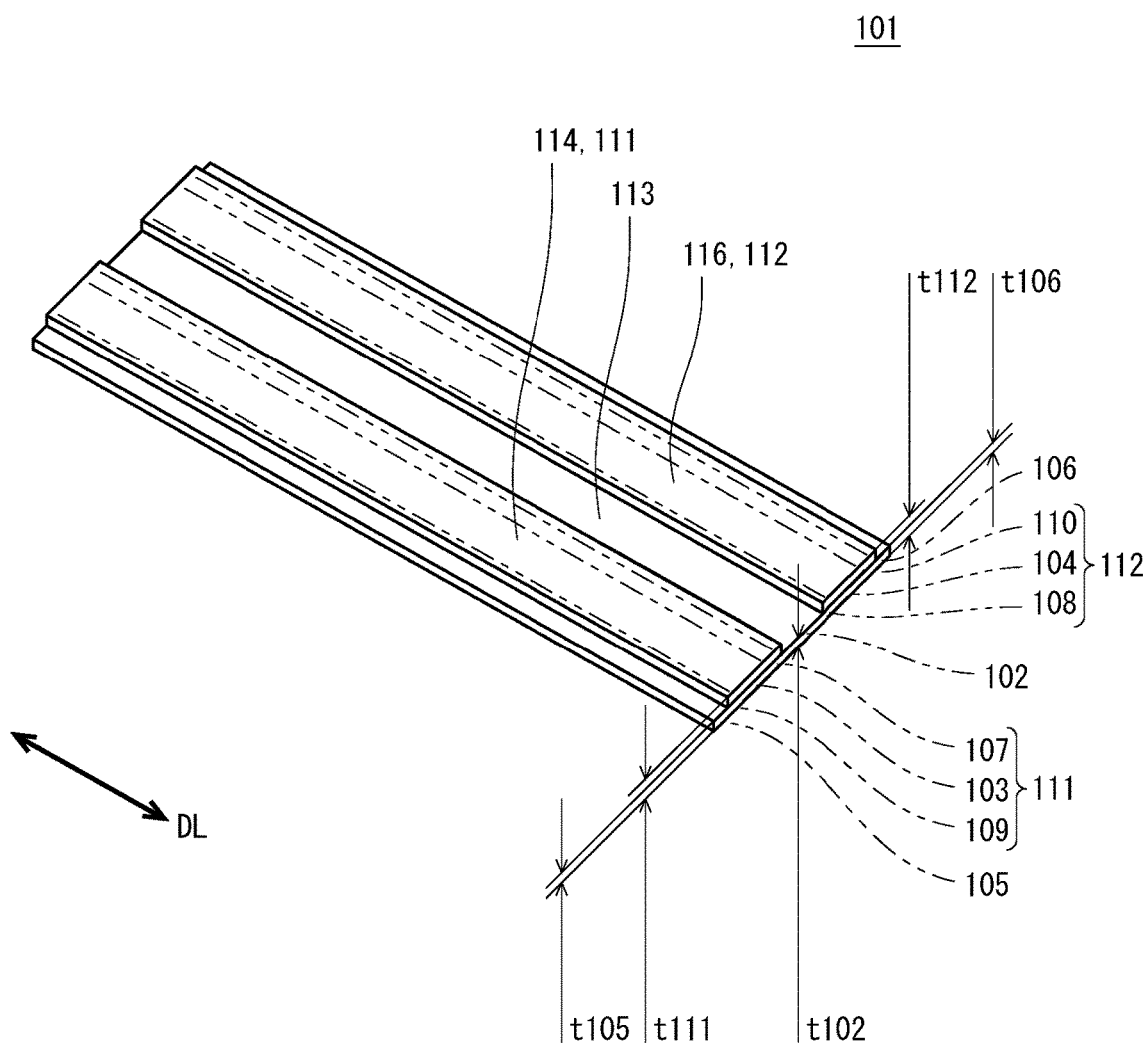
FIG. 3 is a perspective view that schematically illustrates a blank material that is used for producing the long structural member of the first embodiment.

FIG. 3 is a perspective view that schematically illustrates the blank material 101 that is used to produce the long structural member 1 of the first embodiment. Referring to FIG. 3, the blank material 101 is planar in shape. The blank material 101 includes a top plate corresponding part 102, a first upper corner corresponding part 107, a second upper corner corresponding part 108, a first side plate corresponding part 103, a second side plate corresponding part 104, a first lower corner corresponding part 109, a second lower corner corresponding part 110, a first flange corresponding part 105, and a second flange corresponding part 106.

With reference to FIG. 3 while also referring to FIG. 1, the top plate corresponding part 102 corresponds to the top plate part 2. The top plate corresponding part 102 extends in a longitudinal direction DL of the blank material 101. The first upper corner corresponding part 107 corresponds to the first upper corner part 7. The first upper corner corresponding part 107 is connected to one lateral edge of the top plate corresponding part 102. The second upper corner corresponding part 108 corresponds to the second upper corner part 8. The second upper corner corresponding part 108 is connected to the other lateral edge of the top plate corresponding part 102.

The first side plate corresponding part 103 corresponds to the first side plate part 3. The first side plate corresponding part 103 is connected to a lateral edge of the first upper corner corresponding part 107. The second side plate corresponding part 104 corresponds to the second side plate part 4. The second side plate corresponding part 104 is connected to a lateral edge of the second upper corner corresponding part 108. The first lower corner corresponding part 109 corresponds to the first lower corner part 9. The first lower corner corresponding part 109 is connected to a lateral edge of the first side plate corresponding part 103. The second lower corner corresponding part 110 corresponds to the second lower corner part 10. The second lower corner corresponding part 110 is connected to a lateral edge of the second side plate corresponding part 104.

The first flange corresponding part 105 corresponds to the first flange part 5. The first flange corresponding part 105 is connected to a lateral edge of the first lower corner corresponding part 109. The second flange corresponding part 106 corresponds to the second flange part 6. The second flange corresponding part 106 is connected to a lateral edge of the second lower corner corresponding part 110.

That is, in the blank material 101, the top plate corresponding part 102 is arranged at a position that corresponds to the top plate part 2. The first upper corner corresponding part 107 is arranged at a position that corresponds to the first upper corner part 7. The second upper corner corresponding part 108 is arranged at a position that corresponds to the second upper corner part 8. The first side plate corresponding part 103 is arranged at a position that corresponds to the first side plate part 3. The second side plate corresponding part 104 is arranged at a position that corresponds to the second side plate part 4. The first lower corner corresponding part 109 is arranged at a position that corresponds to the first lower corner part 9. The second lower corner corresponding part 110 is arranged at a position that corresponds to the second lower corner part 10. The first flange corresponding part 105 is arranged at a position that corresponds to the first flange part 5. The second flange corresponding part 106 is arranged at a position that corresponds to the second flange part 6.

The first side plate corresponding part 103, the first upper corner corresponding part 107, and the first lower corner corresponding part 109 constitute a first thick-wall corresponding part 111 that corresponds to the first thick-wall part 11 of the long structural member 1. A thickness t111 of the first thick-wall corresponding part 111 is greater than a thickness t102 of the top plate corresponding part 102. In addition, the thickness t111 of the first thick-wall corresponding part 111 is greater than a thickness t105 of the first flange corresponding part 105.

Further, the second side plate corresponding part 104, the second upper corner corresponding part 108, and the second lower corner corresponding part 110 constitute a second thick-wall corresponding part 112 that corresponds to the second thick-wall part 12 of the long structural member 1. A thickness t112 of the second thick-wall corresponding part 112 is greater than the thickness t102 of the top plate corresponding part 102. In addition, the thickness t112 of the second thick-wall corresponding part 112 is greater than a thickness t106 of the second flange corresponding part 106.

Here, in the present embodiment, the blank material 101 is a PWB. The blank material 101 is formed from a main steel sheet 113 that corresponds to a base part 1A to be described later, a first reinforcing steel sheet 114, and a second reinforcing steel sheet 116. The main steel sheet 113 extends over all of the blank material 101. That is, the main steel sheet 113 includes all of the top plate corresponding part 102, the first upper corner corresponding part 107, the second upper corner corresponding part 108, the first side plate corresponding part 103, the second side plate corresponding part 104, the first lower corner corresponding part 109, the second lower corner corresponding part 110, the first flange corresponding part 105, and the second flange corresponding part 106.

The first reinforcing steel sheet 114 is superimposed at the position of the first thick-wall corresponding part 111 (the first side plate corresponding part 103, the first upper corner corresponding part 107, and the first lower corner corresponding part 109) of the main steel sheet 113, and joined to the main steel sheet 113. The second reinforcing steel sheet 116 is superimposed at the position of the second thick-wall corresponding part 112 (the second side plate corresponding part 104, the second upper corner corresponding part 108, and the second lower corner corresponding part 110) of the main steel sheet 113, and joined to the main steel sheet 113.

Each of the reinforcing steel sheets 114 and 116 is joined to the main steel sheet 113 by laser welding. However, the joining method may be spot welding, or may be a method that combines the use of laser welding and spot welding.

In a case where the blank material 101 is a PWB, the thickness t102 of the top plate corresponding part 102, the thickness t105 of the first flange corresponding part 105, and the thickness t106 of the second flange corresponding part 106 are the same as the thickness of the main steel sheet 113. The thickness t111 of the first thick-wall corresponding part 111 is a thickness obtained by adding the thickness of the first reinforcing steel sheet 114 to the thickness of the main steel sheet 113. The thickness t112 of the second thick-wall corresponding part 112 is a thickness obtained by adding the thickness of the second reinforcing steel sheet 116 to the thickness of the main steel sheet 113.

Even when the blank material 101 is subjected to press forming, there is almost no change in the sheet thickness of the blank material 101. Therefore, in a case where the long structural member 1 is produced from the blank material 101 by press forming, the thickness t11 of the first thick-wall part 11 will be approximately the same as the thickness t111 of the first thick-wall corresponding part 111. The thickness t12 of the second thick-wall part 12 will be approximately the same as the thickness t112 of second thick-wall corresponding part 112. Further, the thickness t2 of the top plate part 2 will be approximately the same as the thickness t102 of the top plate corresponding part 102. The thickness t5 of the first flange part 5 will be approximately the same as the thickness t105 of the first flange corresponding part 105. The thickness t6 of the second flange part 6 will be approximately the same as the thickness t106 of the second flange corresponding part 106. Because the thickness t102 of the top plate corresponding part 102, the thickness t105 of the first flange corresponding part 105, and the thickness t106 of the second flange corresponding part 106 are the same, the thickness t2 of the top plate part 2, the thickness t5 of the first flange part 5, and the thickness t6 of the second flange part 6 will also be approximately the same.

In the long structural member 1, the first main sheet part 13 of the first thick-wall part 11 corresponds to the main steel sheet 113. The second main sheet part 15 of the second thick-wall part 12 also corresponds to the main steel sheet 113. The first reinforcing sheet part 14 of the first thick-wall part 11 corresponds to the first reinforcing steel sheet 114. The second reinforcing sheet part 16 of the second thick-wall part 12 corresponds to the second reinforcing steel sheet 116.

Advantageous Effects

According to the present embodiment, in a transverse section including the first thick-wall part 11 and the second thick-wall part 12 of the long structural member 1, the first side plate part 3, the first upper corner part 7, and the first lower corner part 9 are formed to be thick-walled, and the second side plate part 4, the second upper corner part 8, and the second lower corner part 10 are formed to be thick-walled. By this means, in a case where a bending load is introduced to the top plate part 2, the first side plate part 3 and the second side plate part 4 are difficult to bend. Thus, the three-point bending characteristics of the long structural member 1 improve. Further, the top plate part 2, the first flange part 5, and the second flange part 6 remain thin. Hence, an increase in the weight of the long structural member 1 can be suppressed. Therefore, the long structural member 1 of the present embodiment is excellent in both improving the three-point bending characteristics and suppressing an increase in weight in a compatible manner.

Second Embodiment

Figure 4:
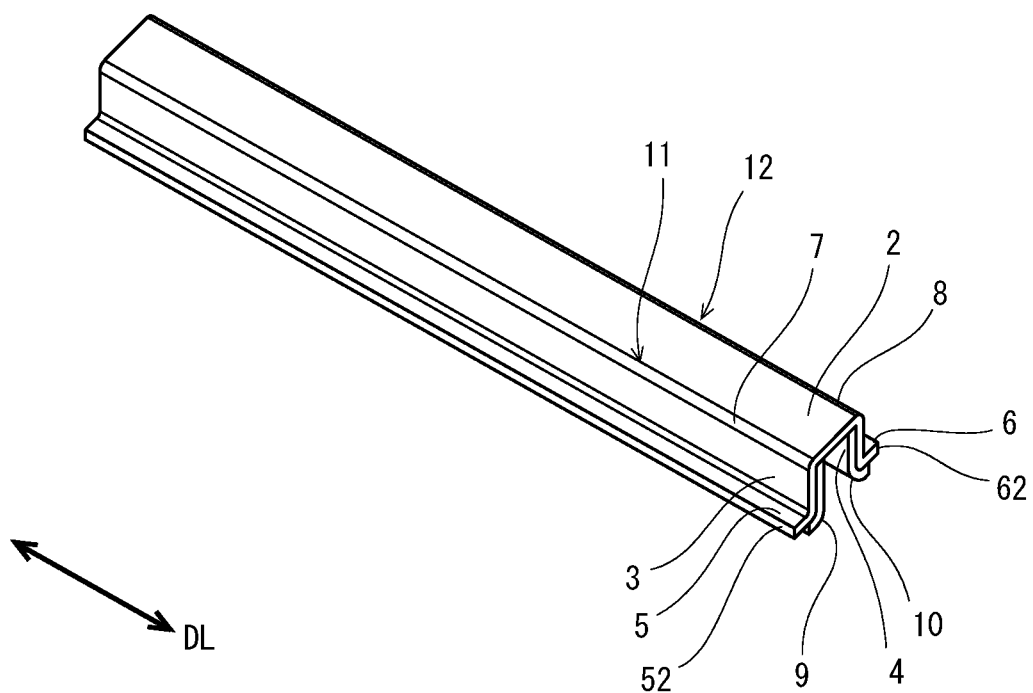
FIG. 4 is a perspective view that schematically illustrates the overall structure of a long structural member of a second embodiment.
Figure 5:
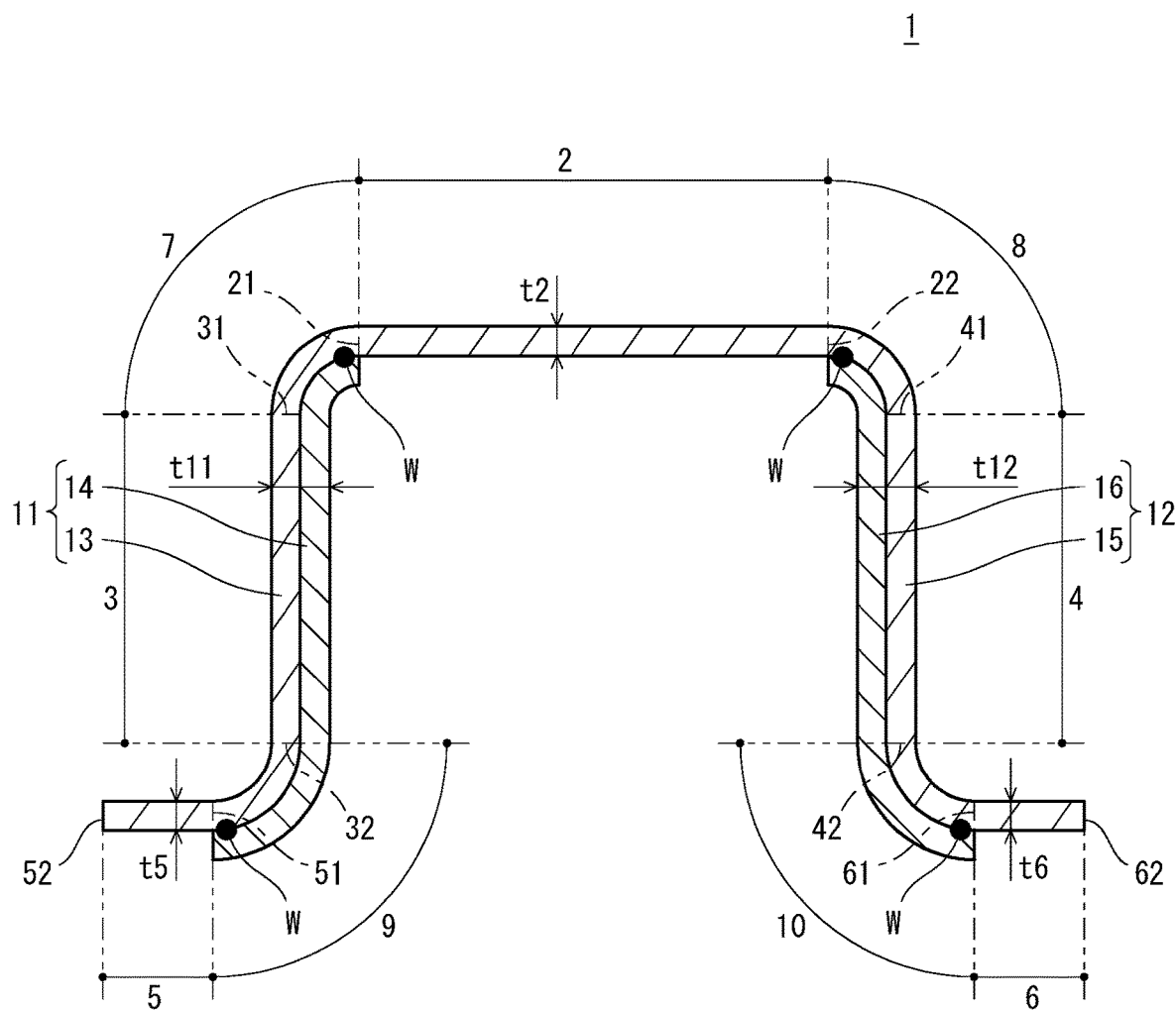
FIG. 5 is a schematic diagram illustrating an example of the transverse sectional shape of the long structural member of the second embodiment.

FIG. 4 is a perspective view that schematically illustrates the overall structure of a long structural member 1 of the second embodiment. FIG. 5 is a schematic diagram illustrating one example of the transverse sectional shape of the long structural member 1 of the second embodiment. The present embodiment is an embodiment obtained by modifying the first embodiment.

Referring to FIG. 4 and FIG. 5, in the case of the present embodiment, in the first thick-wall part 11 (the first side plate part 3, the first upper corner part 7, and the first lower corner part 9), the first reinforcing sheet part 14 is superimposed on the inner surface of the first main sheet part 13. In the second thick-wall part 12 (the second side plate part 4, the second upper corner part 8, and the second lower corner part 10), the second reinforcing sheet part 16 is superimposed on the inner surface of the second main sheet part 15.

In this case, neither the first reinforcing sheet part 14 nor the second reinforcing sheet part 16 is visible from the outer surface side of the top plate part 2. That is, neither the first reinforcing sheet part 14 nor the second reinforcing sheet part 16 appears in the exterior of the long structural member 1. Therefore, the outward appearance is good.

In the long structural member 1 of the present embodiment also, similarly to the first embodiment, in a transverse section of the long structural member 1 including the first thick-wall part 11 and the second thick-wall part 12, the first side plate part 3, the first upper corner part 7, and the first lower corner part 9 are formed to be thick-walled, and the second side plate part 4, the second upper corner part 8, and the second lower corner part 10 are formed to be thick-walled. Furthermore, the top plate part 2, the first flange part 5, and the second flange part 6 remain thin. Therefore, the long structural member 1 of the present embodiment achieves the same advantageous effects as the first embodiment.

Third Embodiment

A long structural member 1 of the third embodiment, as well as a blank material 101 that is suitable for producing the long structural member 1 will be described referring to FIG. 6 to FIG. 8.

[Long Structural Member 1]

Figure 6:
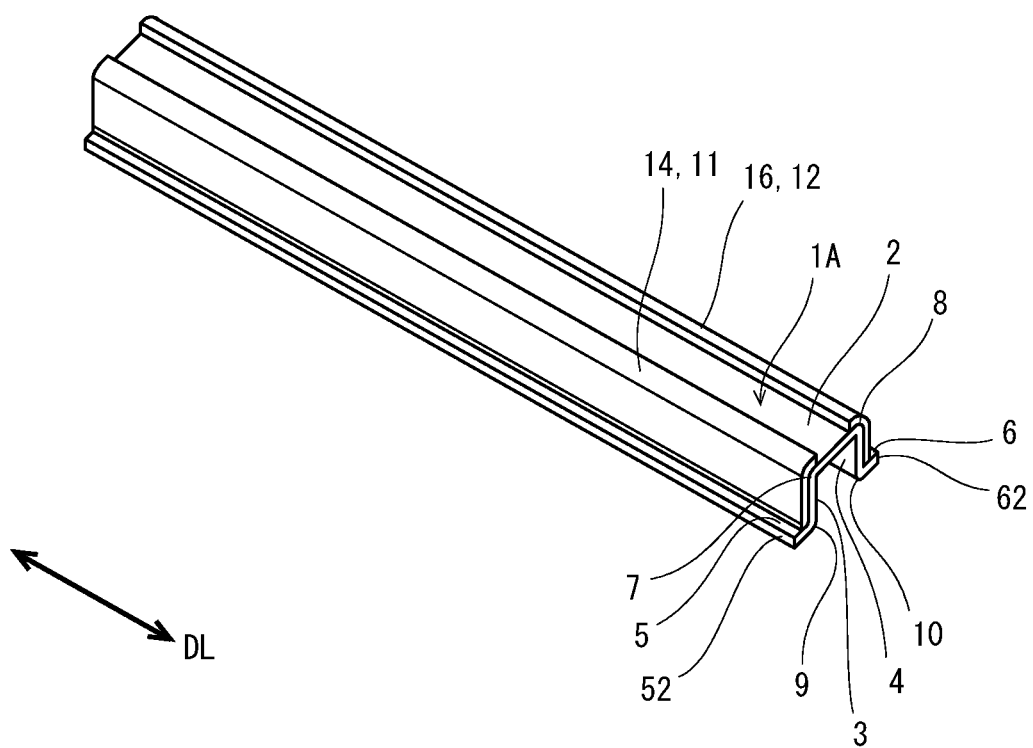
FIG. 6 is a perspective view that schematically illustrates the overall structure of a long structural member of a third embodiment.

FIG. 6 is a perspective view that schematically illustrates the overall structure of the long structural member 1 of the third embodiment. FIG. 7 is a schematic diagram illustrating an example of the transverse sectional shape of the long structural member 1 of the third embodiment. The long structural member 1 of the present embodiment has a hat-shaped transverse sectional shape.

Figure 7:
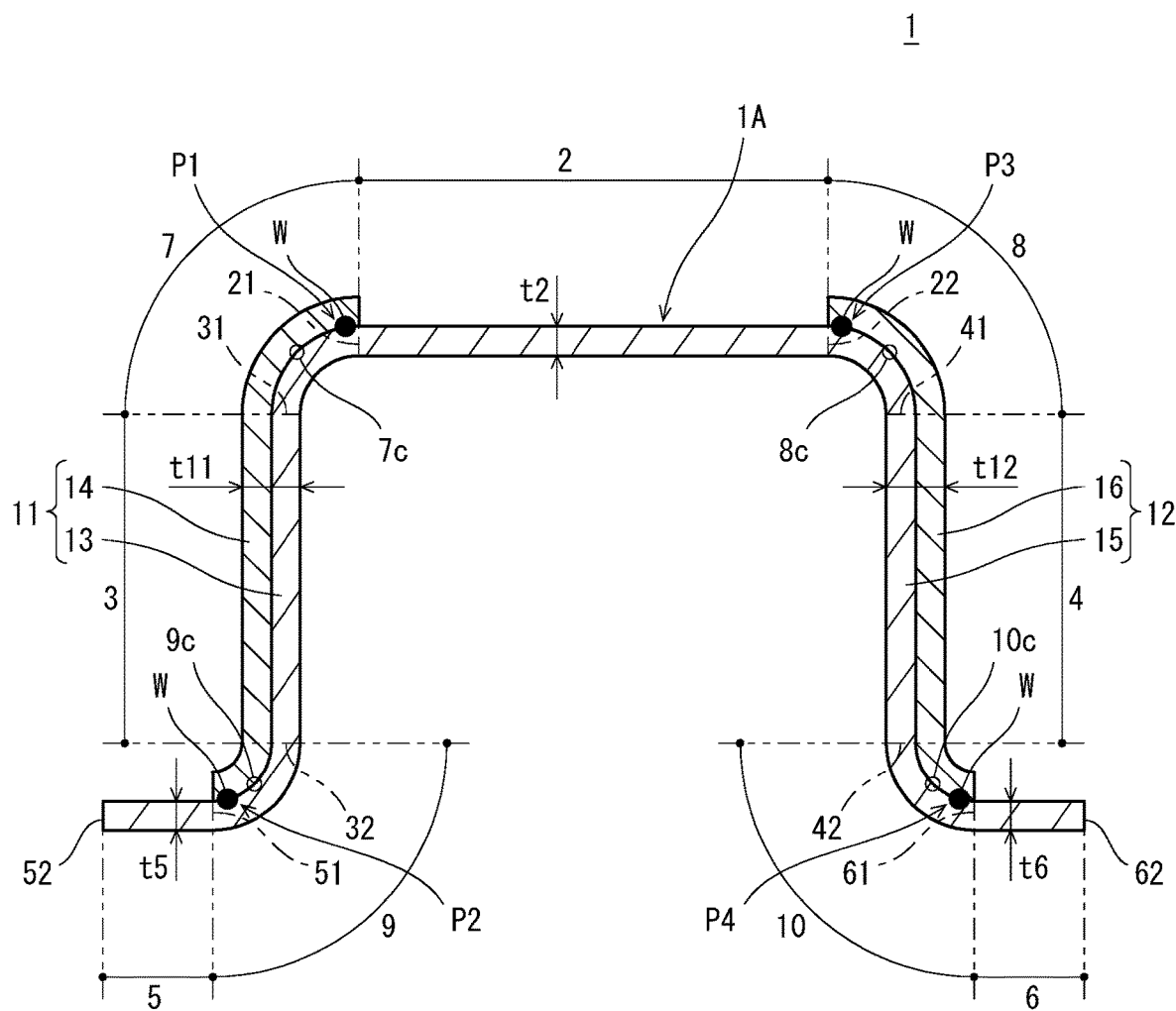
FIG. 7 is a schematic diagram illustrating an example of the transverse sectional shape of the long structural member of the third embodiment.

Referring to FIG. 6 and FIG. 7, the long structural member 1 includes a base part 1A. The base part 1A extends in a longitudinal direction DL of the long structural member 1, and is a single-material member. From another viewpoint, the base part 1A is a single-material member which includes the first main sheet part 13 and the second main sheet part 15. In the example of the present embodiment, the base part 1A is formed from the first flange part 5, the first main sheet part 13, the top plate part 2, the second main sheet part 15, and the second flange part 6.

The first reinforcing sheet part 14 is superimposed on the outer surface of the base part 1A over the entire range in the longitudinal direction DL of the long structural member 1. The first reinforcing sheet part 14 is joined to the first main sheet part 13 in the base part 1A. Further, the second reinforcing sheet part 16 is superimposed on the outer surface of the base part 1A over the entire range in the longitudinal direction DL of the long structural member 1. The second reinforcing sheet part 16 is joined to the second main sheet part 15 in the base part 1A.

Referring to FIG. 7, the first reinforcing sheet part 14 is linearly welded to the base part 1A at a first position P1 and a second position P2. The first position P1 and the second position P2 are located at both side parts of the first reinforcing sheet part 14. The second reinforcing sheet part 16 is linearly welded to the base part 1A at a third position P3 and a fourth position P4. The third position P3 and the fourth position P4 are located at both side parts of the second reinforcing sheet part 16. The linear welding is laser welding.

At the first upper corner part 7, the first position P1 is in the vicinity of the boundary (the first lateral edge 21 of the top plate part 2) between the first upper corner part 7 and the top plate part 2. From another viewpoint, the first position P1 is between a center 7c in the circumferential direction of the first upper corner part 7 and the first lateral edge 21 of the top plate part 2. In short, the first position P1 is further on the top plate part 2 side than the center 7c in the circumferential direction of the first upper corner part 7. A weld zone W is formed at the first position P1. The weld zone W extends along the longitudinal direction DL of the long structural member 1.

At the first lower corner part 9, the second position P2 is in the vicinity of the boundary (the first connecting lateral edge 51 of the first flange part 5) between the first lower corner part 9 and the first flange part 5. From another viewpoint, the second position P2 is between a center 9c in the circumferential direction of the first lower corner part 9 and the first connecting lateral edge 51 of the first flange part 5. In short, the second position P2 is further on the first flange part 5 side than the center 9c in the circumferential direction of the first lower corner part 9. A weld zone W is formed at the second position P2. The weld zone W extends along the longitudinal direction DL of the long structural member 1.

At the second upper corner part 8, the third position P3 is in the vicinity of the boundary (the second lateral edge 22 of the top plate part 2) between the second upper corner part 8 and the top plate part 2. From another viewpoint, the third position P3 is between a center 8c in the circumferential direction of the second upper corner part 8 and the second lateral edge 22 of the top plate part 2. In short, the third position P3 is further on the top plate part 2 side than the center 8c in the circumferential direction of the second upper corner part 8. A weld zone W is formed at the third position P3. The weld zone W extends along the longitudinal direction DL of the long structural member 1.

At the second lower corner part 10, the fourth position P4 is in the vicinity of the boundary (the second connecting lateral edge 61 of the second flange part 6) between the second lower corner part 10 and the second flange part 6. From another viewpoint, the fourth position P4 is between a center 10c in the circumferential direction of the second lower corner part 10 and the second connecting lateral edge 61 of the second flange part 6. In short, the fourth position P4 is further on the second flange part 6 side than the center 10c in the circumferential direction of the second lower corner part 10. A weld zone W is formed at the fourth position P4. The weld zone W extends along the longitudinal direction DL of the long structural member 1.

By the above-described welding, the first reinforcing sheet part 14 is integrated with the base part 1A. However, the first reinforcing sheet part 14 is not welded to the base part 1A between the first position P1 and the second position P2. In this case, there is a weld zone W at the first position P1 and at the second position P2, and there is no weld zone between the first position P1 and the second position P2. That is, there is no weld zone at the first side plate part 3. In the first upper corner part 7, there is also no weld zone at a position that is further on the first side plate part 3 side than the center 7c of the first upper corner part 7. In the first lower corner part 9, there is also no weld zone at a position that is further on the first side plate part 3 side than the center 9c of the first lower corner part 9.

Further, the second reinforcing sheet part 16 is integrated with the base part 1A. However, the second reinforcing sheet part 16 is not welded to the base part 1A between the third position P3 and the fourth position P4. In this case, there is a weld zone W at the third position P3 and at the fourth position P4, and there is no weld zone between the third position P3 and the fourth position P4. That is, there is no weld zone at the second side plate part 4. In the second upper corner part 8, there is also no weld zone at a position that is further on the second side plate part 4 side than the center 8c of the second upper corner part 8. In the second lower corner part 10, there is also no weld zone at a position that is further on the second side plate part 4 side than the center 10c of the second lower corner part 10.

The base part 1A where the first reinforcing sheet part 14 is superimposed (the first side plate part 3, the first upper corner part 7, and the first lower corner part 9) constitutes the first thick-wall part 11. Further, the base part 1A where the second reinforcing sheet part 16 is superimposed (the second side plate part 4, the second upper corner part 8, and the second lower corner part 10) constitutes the second thick-wall part 12.

The long structural member 1 configured as described above is produced by press forming using a PWB (patchwork blank) as a blank material. The pressing may be cold pressing, or may be hot pressing (for example: hot stamping). Hereunder, a blank material 101 that is used to produce the long structural member 1 of the present embodiment is described.

[Blank Material 101]

Figure 8:
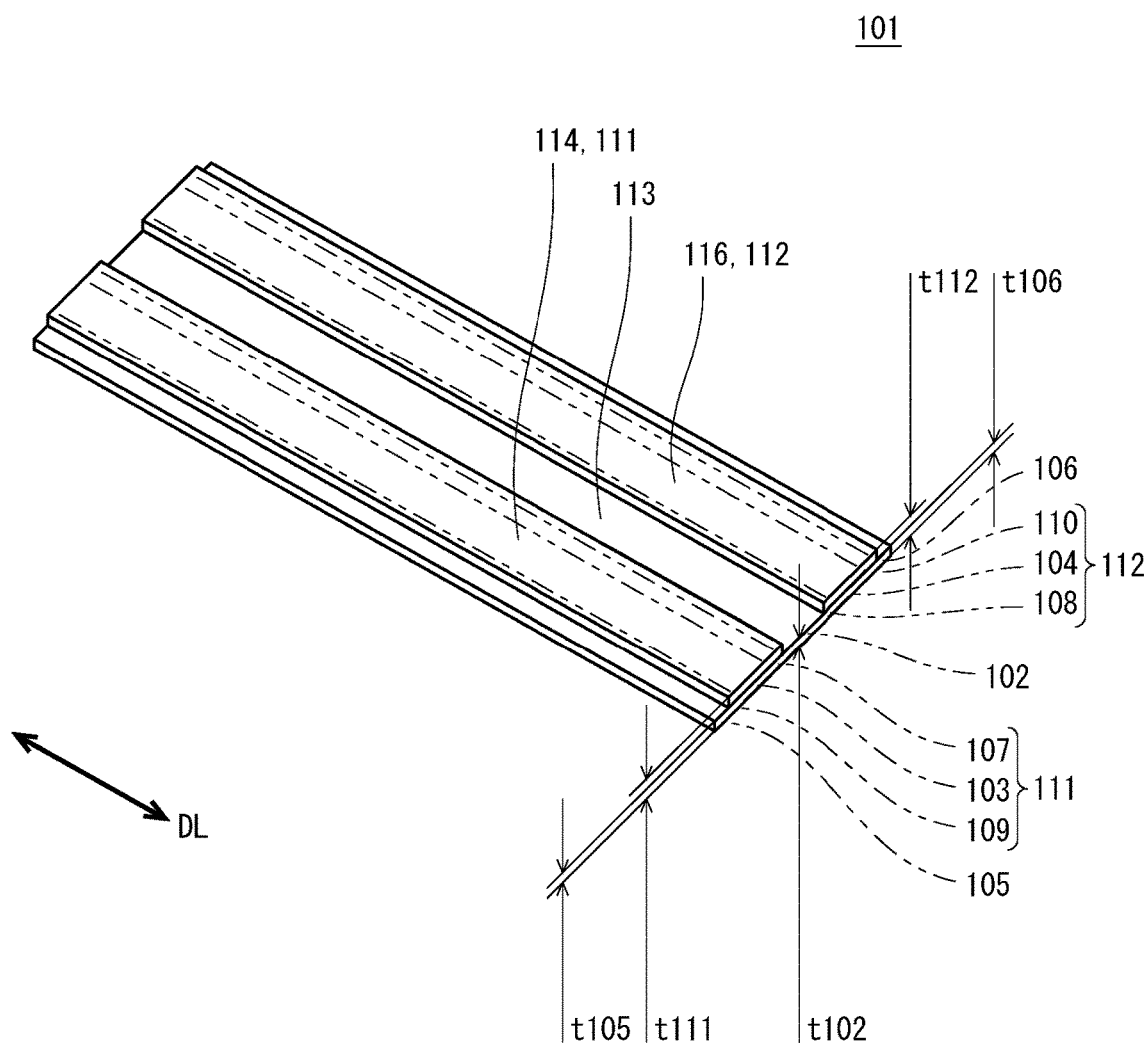
FIG. 8 is a perspective view that schematically illustrates a blank material that is used for producing the long structural member of the third embodiment.
Figure 9:
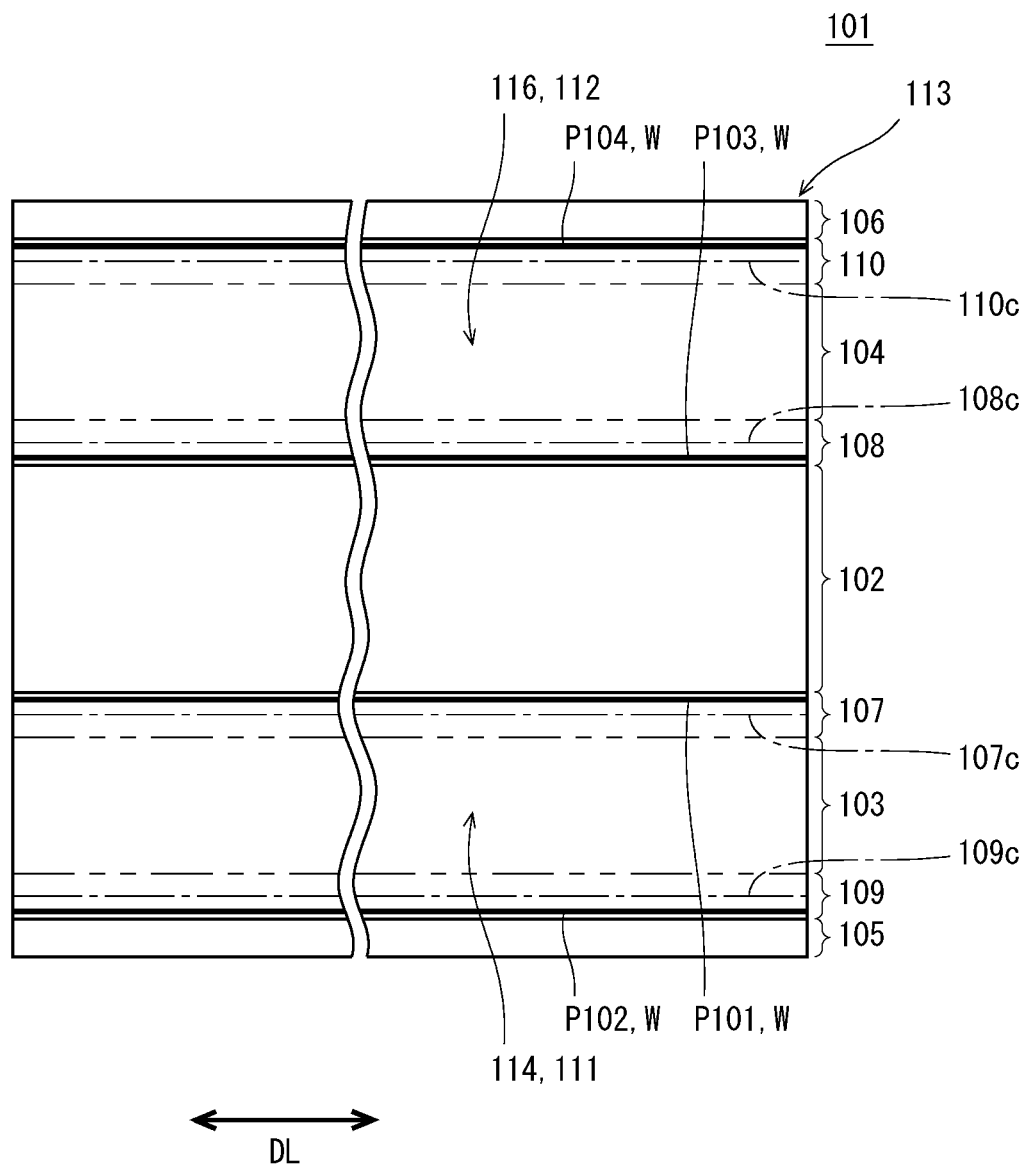
FIG. 9 is a plan view of the blank material illustrated in FIG. 8.

FIG. 8 is a perspective view that schematically illustrates the blank material 101 used to produce the long structural member 1 of the third embodiment. FIG. 9 is a plan view of the blank material 101 illustrated in FIG. 8.

Over the entire range in the longitudinal direction DL of the blank material 101, the first reinforcing steel sheet 114 is superimposed on the outer surface of the main steel sheet 113. Further, over the entire range in the longitudinal direction DL of the blank material 101, the second reinforcing steel sheet 116 is superimposed on the outer surface of the main steel sheet 113.

Referring to FIG. 9, the first reinforcing steel sheet 114 is linearly welded to the main steel sheet 113 at a first position P101 and a second position P102. The first position P101 and the second position P102 are located at both side parts of the first reinforcing steel sheet 114. The second reinforcing steel sheet 116 is linearly welded to the main steel sheet 113 at a third position P103 and a fourth position P104. The third position P103 and the fourth position P104 are located at both side parts of the second reinforcing steel sheet 116. The linear welding is laser welding.

At the first upper corner corresponding part 107, the first position P101 is in the vicinity of the boundary between the first upper corner corresponding part 107 and the top plate corresponding part 102. From another viewpoint, the first position P101 is between a center 107c in the width direction of the first upper corner corresponding part 107 and the top plate corresponding part 102. In short, the first position P101 is further on the top plate corresponding part 102 side than the center 107c in the width direction of the first upper corner corresponding part 107. A weld zone W is formed at the first position P101. The weld zone W extends along the longitudinal direction DL of the blank material 101.

At the first lower corner corresponding part 109, the second position P102 is in the vicinity of the boundary between the first lower corner corresponding part 109 and the first flange corresponding part 105. From another viewpoint, the second position P102 is between a center 109c in the width direction of the first lower corner corresponding part 109 and the first flange corresponding part 105. In short, the second position P102 is further on the first flange corresponding part 105 side than the center 109c in the width direction of the first lower corner corresponding part 109. A weld zone W is formed at the second position P102. The weld zone W extends along the longitudinal direction DL of the blank material 101.

At the second upper corner corresponding part 108, the third position P103 is in the vicinity of the boundary between the second upper corner corresponding part 108 and the top plate corresponding part 102. From another viewpoint, the third position P103 is between a center 108c in the width direction of the second upper corner corresponding part 108 and the top plate corresponding part 102. In short, the third position P103 is further on the top plate corresponding part 102 side than the center 108c in the width direction of the second upper corner corresponding part 108. A weld zone W is formed at the third position P103. The weld zone W extends along the longitudinal direction DL of the blank material 101.

At the second lower corner corresponding part 110, the fourth position P104 is in the vicinity of the boundary between the second lower corner corresponding part 110 and the second flange corresponding part 106. From another viewpoint, the fourth position P104 is between a center 110c in the width direction of the second lower corner corresponding part 110 and the second flange corresponding part 106. In short, the fourth position P104 is further on the second flange corresponding part 106 side than the center 110c in the width direction of the second lower corner corresponding part 110. A weld zone W is formed at the fourth position P104. The weld zone W extends along the longitudinal direction DL of the blank material 101.

By the above-described welding, the first reinforcing steel sheet 114 is integrated with the main steel sheet 113. However, the first reinforcing steel sheet 114 is not welded to the main steel sheet 113 between the first position P101 and the second position P102. In this case, there is a weld zone W at the first position P101 and at the second position P102, and there is no weld zone between the first position P101 and the second position P102. That is, there is no weld zone at the first side plate corresponding part 103. In the first upper corner corresponding part 107, there is also no weld zone at a position that is further on the first side plate corresponding part 103 side than the center 107c of the first upper corner corresponding part 107. In the first lower corner corresponding part 109, there is also no weld zone at a position that is further on the first side plate corresponding part 103 side than the center 109c of the first lower corner corresponding part 109.

Further, the second reinforcing steel sheet 116 is integrated with the main steel sheet 113. However, the second reinforcing steel sheet 116 is not welded to the main steel sheet 113 between the third position P103 and the fourth position P104. In this case, there is a weld zone W at the third position P103 and at the fourth position P104, and there is no weld zone between the third position P103 and the fourth position P104. That is, there is no weld zone at the second side plate corresponding part 104. In the second upper corner corresponding part 108, there is also no weld zone at a position that is further on the second side plate corresponding part 104 side than the center 108c of the second upper corner corresponding part 108. In the second lower corner corresponding part 110, there is also no weld zone at a position that is further on the second side plate corresponding part 104 side than the center 110c of the second lower corner corresponding part 110.

The main steel sheet 113 where the first reinforcing steel sheet 114 is superimposed (the first side plate corresponding part 103, the first upper corner corresponding part 107, and the first lower corner corresponding part 109) constitutes the first thick-wall corresponding part 111 that corresponds to the first thick-wall part 11 of the long structural member 1. Further, the main steel sheet 113 where the second reinforcing steel sheet 116 is superimposed (the second side plate corresponding part 104, the second upper corner corresponding part 108, and the second lower corner corresponding part 110) constitutes the second thick-wall corresponding part 112 that corresponds to the second thick-wall part 12 of the long structural member 1.

In the long structural member 1, the base part 1A of each of the first thick-wall part 11 and the second thick-wall part 12 corresponds to the main steel sheet 113. The weld zone W at the first position P1 corresponds to the weld zone W at the first position P101 of the blank material 101. The weld zone W at the second position P2 corresponds to the weld zone W at the second position P102 of the blank material 101. The weld zone W at the third position P3 corresponds to the weld zone W at the third position P103 of the blank material 101. The weld zone W at the fourth position P4 corresponds to the weld zone W at the fourth position P104 of the blank material 101.

Figure 10:
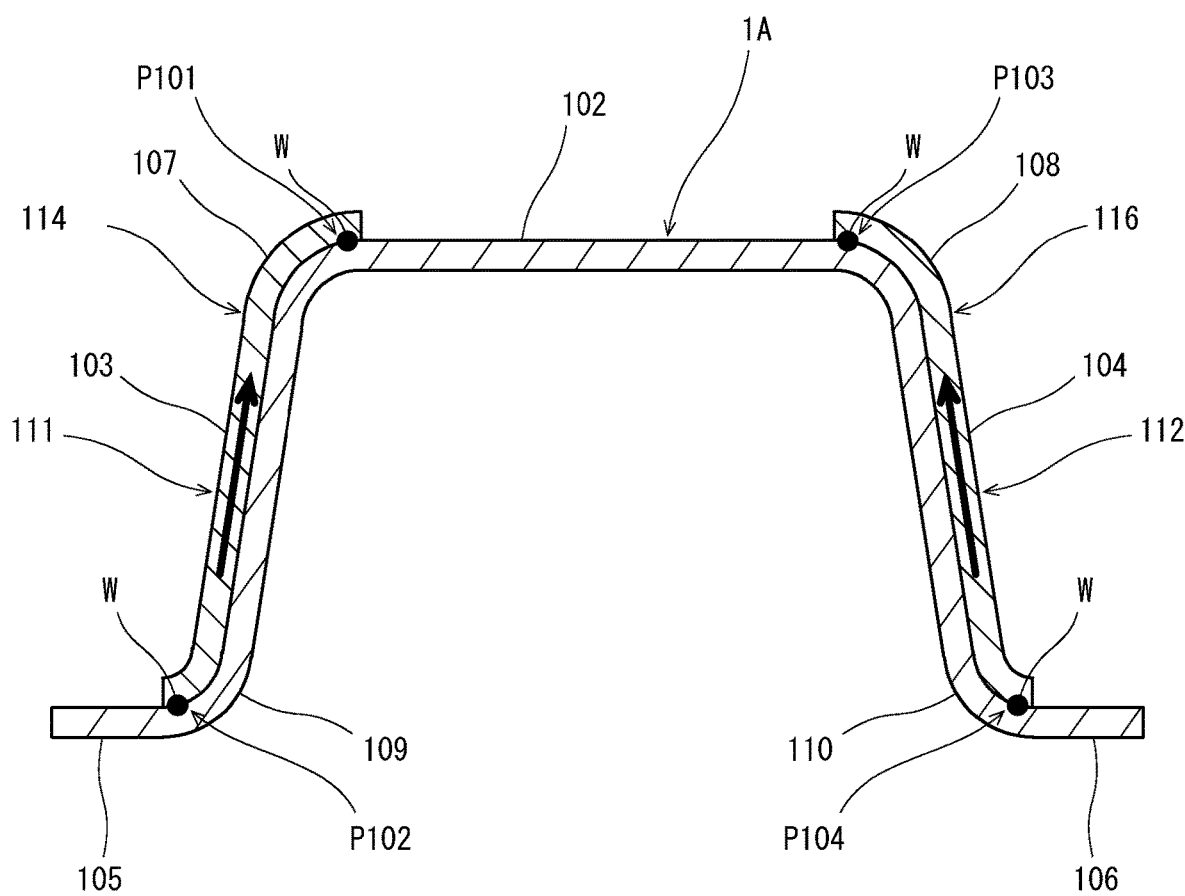
FIG. 10 is a schematic diagram illustrating a state when producing the long structural member of the third embodiment by press forming.

Hereunder, the manner in which press forming is performed is described. FIG. 10 is schematic diagram illustrating the state when producing the long structural member 1 of the third embodiment by press forming.

With reference to FIG. 10 while also referring to FIG. 7, when performing press forming, the first upper corner corresponding part 107 at which the first reinforcing steel sheet 114 is superimposed is bent so as to become a shape that is convex toward the outside of the long structural member 1. Similarly, the second upper corner corresponding part 108 at which the second reinforcing steel sheet 116 is superimposed is bent so as to become a shape that is convex toward the outside of the long structural member 1. On the other hand, the first lower corner corresponding part 109 at which the first reinforcing steel sheet 114 is superimposed is bent so as to become a shape that is concave toward the outside of the long structural member 1. Similarly, the second lower corner corresponding part 110 at which the second reinforcing steel sheet 116 is superimposed is bent so as to become a shape that is concave toward the outside of the long structural member 1.

At such time, at the first upper corner corresponding part 107, the first reinforcing steel sheet 114 deforms such that the circumferential length of a cross section thereof becomes longer. On the other hand, at the first lower corner corresponding part 109, the first reinforcing steel sheet 114 deforms such that the circumferential length of a cross section thereof becomes shorter. Further, at the second upper corner corresponding part 108, the second reinforcing steel sheet 116 deforms such that the circumferential length of a cross section thereof becomes longer. On the other hand, at the second lower corner corresponding part 110, the second reinforcing steel sheet 116 deforms such that the circumferential length of a cross section thereof becomes shorter.

Therefore, the following characteristics occur in the formed long structural member 1.

Referring to FIG. 7, at the first upper corner part 7, tensile stress occurs in the first reinforcing sheet part 14. Due to this tensile stress, tensile strain occurs in the first reinforcing sheet part 14 at the first upper corner part 7. As a result, shear stress occurs in the weld zone W at the first position P1. In contrast, at the first lower corner part 9, compressive stress occurs in the first reinforcing sheet part 14. Due to this compressive stress, compressive strain occurs in the first reinforcing sheet part 14 at the first lower corner part 9. As a result, shear stress occurs in the weld zone W at the second position P2.

When performing such press forming, there is no weld zone between the first position P1 and the second position P2. Therefore, the first reinforcing sheet part 14 is not constrained by the base part 1A at the first side plate part 3 between the first position P1 and the second position P2. Hence, the tensile stress that occurs in the first reinforcing sheet part 14 at the first upper corner part 7, and the compressive stress that occurs in the first reinforcing sheet part 14 at the first lower corner part 9 are transmitted to each other through the first side plate part 3 (see the solid-line arrow in FIG. 10). By this means, the strain of the first upper corner part 7 and the strain of the first lower corner part 9 cancel each other out. Therefore, shear stress occurring in the respective weld zones W at the first position P1 and the second position P2 is suppressed.

Similarly to the situation described above, at the second upper corner part 8, tensile stress occurs in the second reinforcing sheet part 16. Due to this tensile stress, tensile strain occurs in the second reinforcing sheet part 16 at the second upper corner part 8. As a result, shear stress occurs in the weld zone W at the third position P3. In contrast, at the second lower corner part 10, compressive stress occurs in the second reinforcing sheet part 16. Due to this compressive stress, compressive strain occurs in the second reinforcing sheet part 16 at the second lower corner part 10. As a result, shear stress occurs in the weld zone W at the fourth position P4.

When performing such press forming, there is no weld zone between the third position P3 and the fourth position P4. Therefore, the second reinforcing sheet part 16 is not constrained by the base part 1A at the second side plate part 4 between the third position P3 and the fourth position P4. Hence, the tensile stress that occurs in the second reinforcing sheet part 16 at the second upper corner part 8, and the compressive stress that occurs in the second reinforcing sheet part 16 at the second lower corner part 10 are transmitted to each other through the second side plate part 4 (see the solid-line arrow in FIG. 10). By this means, the strain of the second upper corner part 8 and the strain of the second lower corner part 10 cancel each other out. Therefore, shear stress occurring in the respective weld zones W at the third position P3 and the fourth position P4 is suppressed.

Advantageous Effects

In the long structural member 1 of the present embodiment also, similarly to the first embodiment, in a transverse section of the long structural member 1 including the first thick-wall part 11 and the second thick-wall part 12, the base part 1A is formed to be thick-walled by the first reinforcing sheet part 14 and the second reinforcing sheet part 16. Furthermore, the top plate part 2, the first flange part 5, and the second flange part 6 remain thin. Therefore, the long structural member 1 of the present embodiment also achieves the same advantageous effects as the first embodiment.

Further, according to the present embodiment, shear stress occurring in the weld zones W is suppressed, and it is possible to suppress deformation of the weld zones W. By suppressing deformation of the weld zones W, the cross-sectional shape of the respective weld zones W is stable. From another viewpoint, the cross-sectional shape of the weld zones W does not incline. Therefore, in the long structural member 1, the width of the weld zones W is sufficiently secured, and the strength of the weld zones W is also sufficiently secured. Therefore, when a collision load is applied to the long structural member 1 of the present embodiment, it is difficult for rupturing of the weld zones W to occur, and it is also difficult for peeling of the weld zones W to occur. Therefore, the three-point bending characteristics are further improved.

Fourth Embodiment

Figure 11:
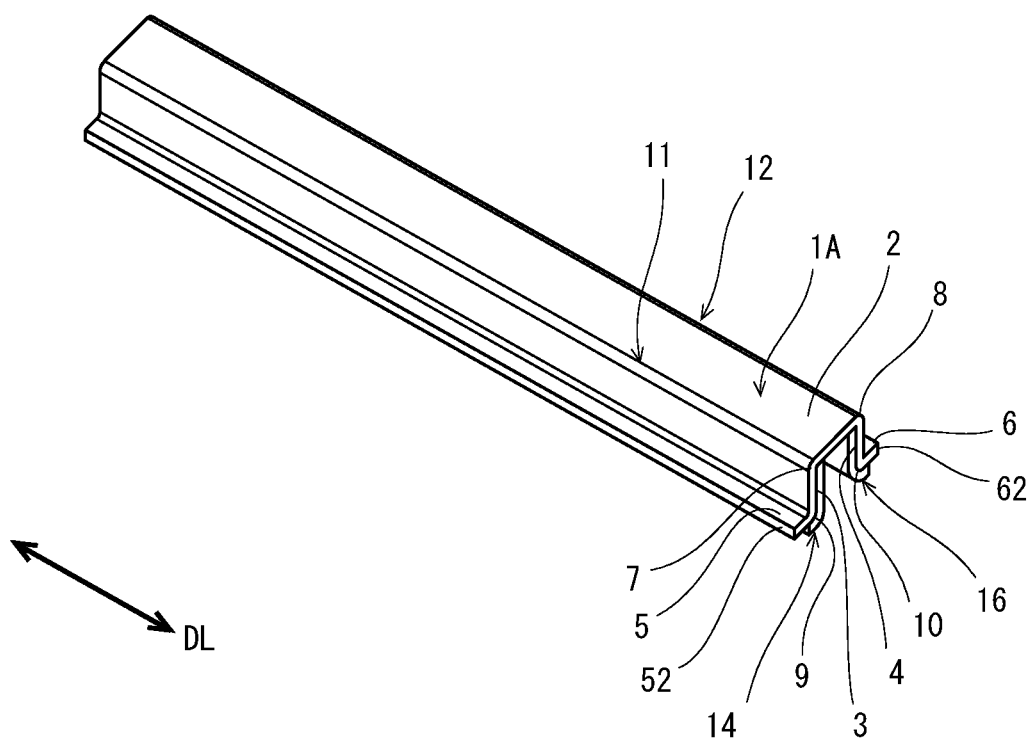
FIG. 11 is a perspective view that schematically illustrates the overall structure of a long structural member of a fourth embodiment.
Figure 12:
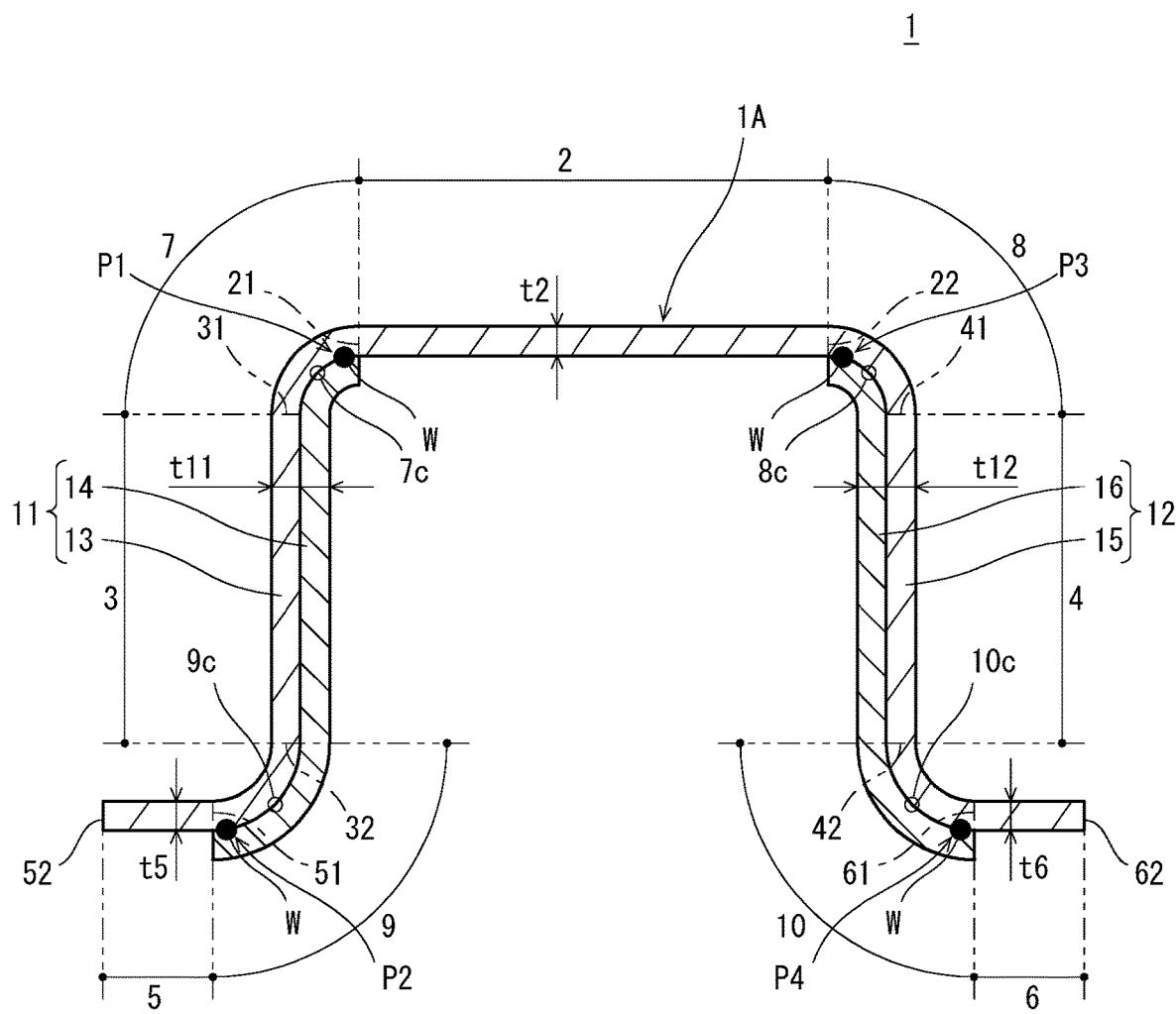
FIG. 12 is a schematic diagram illustrating an example of the transverse sectional shape of the long structural member of the fourth embodiment.

FIG. 11 is a perspective view that schematically illustrates the overall structure of a long structural member 1 of the fourth embodiment. FIG. 12 is a schematic diagram illustrating an example of the transverse sectional shape of the long structural member 1 of the fourth embodiment. The present embodiment is an embodiment obtained by modifying the third embodiment.

Referring to FIG. 11 and FIG. 12, in the case of the present embodiment, at the first thick-wall part 11 (the first side plate part 3, the first upper corner part 7, and the first lower corner part 9), the first reinforcing sheet part 14 is superimposed on the inner surface of the base part 1A. At the second thick-wall part 12 (the second side plate part 4, the second upper corner part 8, and the second lower corner part 10), the second reinforcing sheet part 16 is superimposed on the inner surface of the base part 1A.

In this case, neither the first reinforcing sheet part 14 nor the second reinforcing sheet part 16 is visible from the outer surface side of the top plate part 2. That is, neither the first reinforcing sheet part 14 nor the second reinforcing sheet part 16 appear in the exterior of the long structural member 1. Therefore, the outward appearance is good.

In the long structural member 1 of the present embodiment also, similarly to the third embodiment, in a transverse section of the long structural member 1 including the first thick-wall part 11 and the second thick-wall part 12, the base part 1A is formed to be thick-walled by the first reinforcing sheet part 14 and the second reinforcing sheet part 16. In addition, the top plate part 2, the first flange part 5, and the second flange part 6 remain thin. Furthermore, shear stress occurring in the weld zones W is suppressed, and it is possible to suppress deformation of the weld zones W. Therefore, the long structural member 1 of the present embodiment also achieves the same advantageous effects as the third embodiment.

However, in the case of the present embodiment, when performing press forming, at the first upper corner corresponding part 107, the first reinforcing steel sheet 114 deforms such that the circumferential length of a cross section thereof becomes shorter. On the other hand, at the first lower corner corresponding part 109, the first reinforcing steel sheet 114 deforms such that the circumferential length of a cross section thereof becomes longer. Further, at the second upper corner corresponding part 108, the second reinforcing steel sheet 116 deforms such that the circumferential length of a cross section thereof becomes shorter. On the other hand, at the second lower corner corresponding part 110, the second reinforcing steel sheet 116 deforms such that the circumferential length of a cross section thereof becomes longer.

Therefore, at the first upper corner part 7, compressive stress occurs in the first reinforcing sheet part 14. Due to this compressive stress, compressive strain occurs in the first reinforcing sheet part 14 at the first upper corner part 7. As a result, shear stress occurs in the weld zone W at the first position P1. In contrast, at the first lower corner part 9, tensile stress occurs in the first reinforcing sheet part 14. Due to this tensile stress, tensile strain occurs in the first reinforcing sheet part 14 at the first lower corner part 9. As a result, shear stress occurs in the weld zone W at the second position P2.

In the present embodiment also, there is no weld zone between the first position P1 and the second position P2. Therefore, when performing press forming, the first reinforcing sheet part 14 is not constrained by the base part 1A at the first side plate part 3 between the first position P1 and the second position P2. Hence, the compressive stress that occurs in the first reinforcing sheet part 14 at the first upper corner part 7, and the tensile stress that occurs in the first reinforcing sheet part 14 at the first lower corner part 9 are transmitted to each other through the first side plate part 3. By this means, the strain of the first upper corner part 7 and the strain of the first lower corner part 9 cancel each other out. Therefore, shear stress occurring in the respective weld zones W at the first position P1 and the second position P2 is suppressed.

Similarly to the situation described above, at the second upper corner part 8, compressive stress occurs in the second reinforcing sheet part 16. Due to this compressive stress, compressive strain occurs in the second reinforcing sheet part 16 at the second upper corner part 8. As a result, shear stress occurs in the weld zone W at the third position P3. In contrast, at the second lower corner part 10, tensile stress occurs in the second reinforcing sheet part 16. Due to this tensile stress, tensile strain occurs in the second reinforcing sheet part 16 at the second lower corner part 10. As a result, shear stress occurs in the weld zone W at the fourth position P4.

In the present embodiment also, there is no weld zone between the third position P3 and the fourth position P4. Therefore, when performing press forming, the second reinforcing sheet part 16 is not constrained by the base part 1A at the second side plate part 4 between the third position P3 and the fourth position P4. Hence, the compressive stress that occurs in the second reinforcing sheet part 16 at the second upper corner part 8, and the tensile stress that occurs in the second reinforcing sheet part 16 at the second lower corner part 10 are transmitted to each other through the second side plate part 4. By this means, the strain of the second upper corner part 8 and the strain of the second lower corner part 10 cancel each other out. Therefore, shear stress occurring in the respective weld zones W at the third position P3 and the fourth position P4 is suppressed.

Fifth Embodiment

Figure 13:
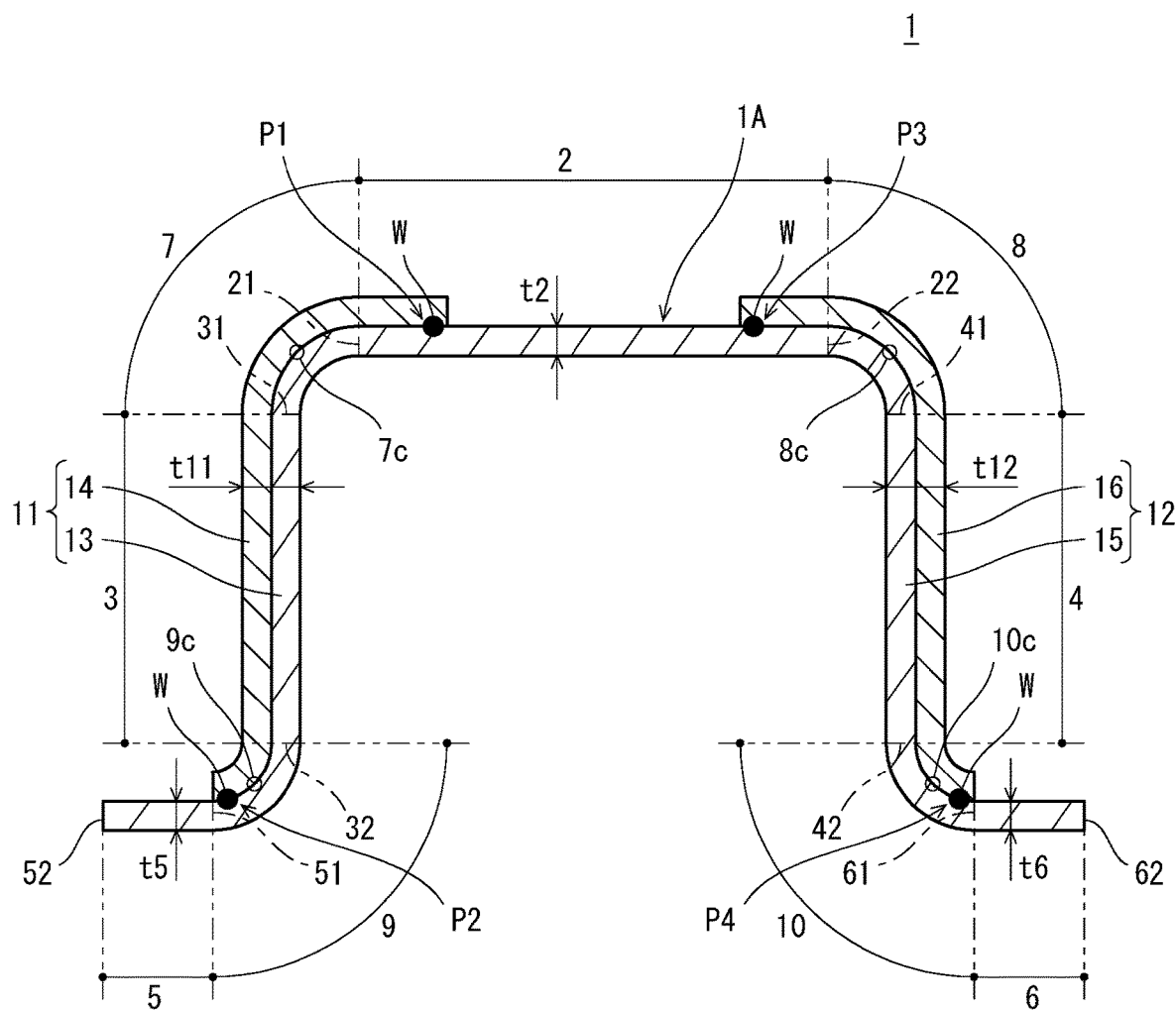
FIG. 13 is a schematic diagram illustrating an example of the transverse sectional shape of a long structural member of a fifth embodiment.

FIG. 13 is a schematic diagram illustrating an example of the transverse sectional shape of a long structural member 1 of a fifth embodiment. The present embodiment is an embodiment obtained by modifying the third embodiment.

Referring to FIG. 13, in the case of the present embodiment, the top plate part 2 includes a part of the first reinforcing sheet part 14. From another viewpoint, a side part that is on the top plate part 2 side of the first reinforcing sheet part 14 extends beyond the first lateral edge 21 of the top plate part 2. In the first reinforcing sheet part 14, a portion that extends beyond the first lateral edge 21 of the top plate part 2 constitutes a part of the top plate part 2. In short, the first thick-wall part 11 is formed from not only the first side plate part 3, the first upper corner part 7, and the first lower corner part 9, but also by one part of the top plate part 2.

The top plate part 2 further includes a part of the second reinforcing sheet part 16. From another viewpoint, a side part that is on the top plate part 2 side of the second reinforcing sheet part 16 extends beyond the second lateral edge 22 of the top plate part 2. In the second reinforcing sheet part 16, a portion that extends beyond the second lateral edge 22 of the top plate part 2 constitutes a part of the top plate part 2. In short, the second thick-wall part 11 is formed from not only the second side plate part 4, the second upper corner part 8, and the second lower corner part 10, but also by one part of the top plate part 2.

The first position P1 at which a weld zone W is formed is located at a side part of the first reinforcing sheet part 14 that extends beyond the first lateral edge 21 of the top plate part 2. Therefore, at the top plate part 2, the first position P1 is in the vicinity of the boundary (the first lateral edge 21 of the top plate part 2) between the first upper corner part 7 and the top plate part 2. From another viewpoint, the first position P1 is at the top plate part 2. In short, the first position P1 is further on the top plate part 2 side than the center $7c$ in the circumferential direction of the first upper corner part 7.

Further, the third position P3 at which a weld zone W is formed is located at a side part of the second reinforcing sheet part 16 that extends beyond the second lateral edge 22 of the top plate part 2. Therefore, at the top plate part 2, the third position P3 is in the vicinity of the boundary (the second lateral edge 22 of the top plate part 2) between the second upper corner part 8 and the top plate part 2. From another viewpoint, the third position P3 is at the top plate part 2. In short, the third position P3 is further on the top plate part 2 side than the center $8c$ in the circumferential direction of the second upper corner part 8.

In the case of this configuration, a distance from the center $7c$ in the circumferential direction of the first upper corner part 7 to the first position P1 is greater than a distance from the center $9c$ in the circumferential direction of the first lower corner part 9 to the second position P2. Further, a distance from the center $8c$ in the circumferential direction of the second upper corner part 8 to the third position P3 is greater than a distance from the center $10c$ in the circumferential direction of the second lower corner part 10 to the fourth position P4.

Generally, when a collision load is applied to the long structural member 1, a larger force acts on the weld zone W at the first position P1 compared to the weld zone W at the second position P2. Further, a larger force acts on the weld zone W at the third position P3 compared to the weld zone W at the fourth position P4. Therefore, the smaller the tensile residual stress is in the respective weld zones W at the first position P1 and the third position P3, the better it is with respect to the collision load.

When performing press forming, tensile stress that occurs in the first reinforcing sheet part 14 at the first upper corner part 7 acts on the weld zone W at the first position P1, and compressive stress that occurs in the first reinforcing sheet part 14 at the first lower corner part 9 acts on the weld zone W at the second position P2. In the present embodiment, the influence of the tensile stress on the weld zone W at the first position P1 is smaller compared to the influence of the compressive stress on the weld zone W at the second position P2. Therefore, the tensile residual stress in the weld zone W at the first position P1 decreases.

Further, when performing press forming, tensile stress that occurs in the second reinforcing sheet part 16 at the second upper corner part 8 acts on the weld zone W at the third position P3, and compressive stress that occurs in the second reinforcing sheet part 16 at the second lower corner part 10 acts on the weld zone W at the fourth position P4. In the present embodiment, the influence of the tensile stress on the weld zone W at the third position P3 is smaller compared to the influence of the compressive stress on the weld zone W at the fourth position P4. Therefore, the tensile residual stress in the weld zone W at the third position P3 decreases.

Thus, in the long structural member 1 of the present embodiment, because the tensile residual stress at the respective weld zones W at the first position P1 and the third position P3 is small, the three-point bending characteristics further improve.

When a collision load is applied to the long structural member 1, strain is likely to concentrate at the first upper corner part 7, the first side plate part 3, the first lower corner part 9, the second upper corner part 8, the second side plate part 4, and the second lower corner part 10. On the other hand, it is difficult for strain to occur in the top plate part 2. When the long structural member 1 deforms due to a collision load, the top plate part 2 maintains the same shape. In the long structural member 1 according to the present embodiment, the respective weld zones W at the first position P1 and the third position P3 are located at the top plate part 2. In short, because the weld zones W are formed at the top plate part 2 where it is difficult for strain to occur, it is difficult for rupturing of the weld zones W to occur. Therefore, the three-point bending characteristics are further improved.

In the case of the present embodiment, the distance from the boundary (the first lateral edge 21 of the top plate part 2) between the first upper corner part 7 and the top plate part 2 to the first position P1 is preferably 10 to 15 mm. The reason is that, if this distance is too large, the proportion which the first reinforcing sheet part 14 occupies in the top plate part 2 will become large, and the advantageous effect of suppressing an increase in weight will be lost. Likewise, the distance from the boundary (the second lateral edge 22 of the top plate part 2) between the second upper corner part 8 and the top plate part 2 to the third position P3 is preferably 10 to 15 mm. The reason is that, if this distance is too large, the proportion which the second reinforcing sheet part 16 occupies in the top plate part 2 will become large, and the advantageous effect of suppressing an increase in weight will be lost.

Note that, it is also possible to apply the configuration of the present embodiment to the fourth embodiment.

Sixth Embodiment

Figure 14:
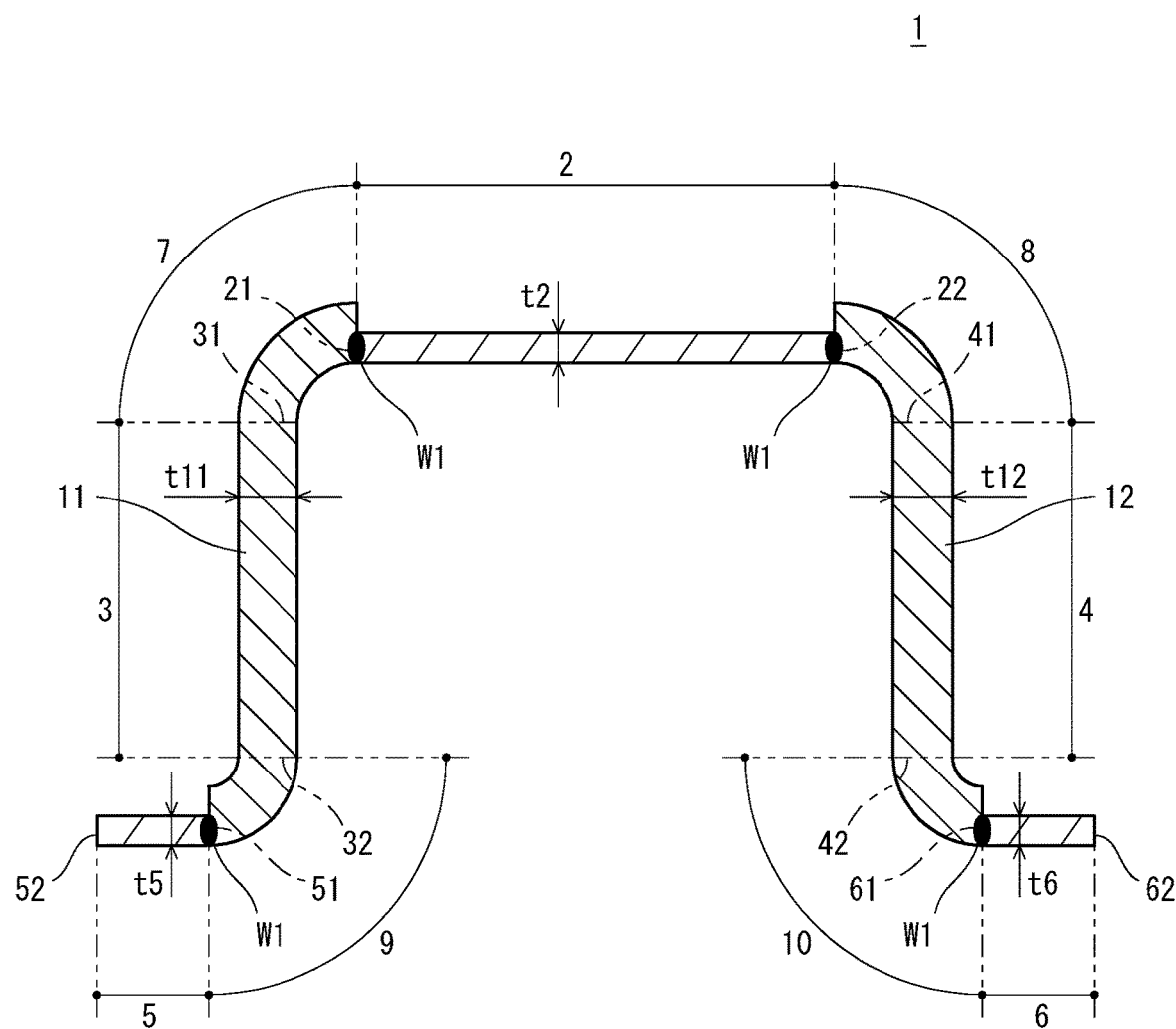
FIG. 14 is a schematic diagram illustrating an example of the transverse sectional shape of a long structural member of a sixth embodiment.

FIG. 14 is a schematic diagram illustrating an example of the transverse sectional shape of a long structural member 1 of a sixth embodiment. The present embodiment is an embodiment obtained by modifying the first embodiment.

Referring to FIG. 14, in the present embodiment, the first thick-wall part 11 (the first side plate part 3, the first upper corner part 7, and the first lower corner part 9) is a single-material member. The first thick-wall part 11 is joined to the top plate part 2 and the first flange part 5. Specifically, by laser welding, the first thick-wall part 11 is joined to the first lateral edge 21 of the top plate part 2 and is joined to the first connecting lateral edge 51 of the first flange part 5. Further, the second thick-wall part 12 (the second side plate part 4, the second upper corner part 8, and the second lower corner part 10) is a single-material member. The second thick-wall part 12 is joined to the top plate part 2 and the second flange part 6. Specifically, by laser welding, the second thick-wall part 12 is joined to the second lateral edge 22 of the top plate part 2 and is joined to the second connecting lateral edge 61 of the second flange part 6. Each weld zone W extends along the longitudinal direction DL of the long structural member 1.

The long structural member 1 of the present embodiment is produced by press forming using a TWB (tailored welded blank) as a blank material. It is also possible to produce the long structural member 1 by roll forming. The TWB used to produce the long structural member 1 of the present embodiment is obtained by arranging, at appropriate positions, a main steel sheet and reinforcing steel sheets which are thicker than the main steel sheet, and butt welding the steel sheets to each other. The welding in this case is laser welding. In this case, the main steel sheet is arranged at positions corresponding to each of the top plate part 2, the first flange part 5, and the second flange part 6. The reinforcing steel sheets are arranged at positions corresponding to the first thick-wall part 11 (the first side plate part 3, the first upper corner part 7, and the first lower corner part 9), and the second thick-wall part 12 (the second side plate part 4, the second upper corner part 8, and the second lower corner part 10), respectively.

In the long structural member 1 of the present embodiment also, similarly to the first embodiment, in a transverse section of the long structural member 1 including the first thick-wall part 11 and the second thick-wall part 12, the first side plate part 3, the first upper corner part 7, and the first lower corner part 9 are formed to be thick-walled, and the second side plate part 4, the second upper corner part 8, and the second lower corner part 10 are formed to be thick-walled. Furthermore, the top plate part 2, the first flange part 5, and the second flange part 6 remain thin. Therefore, the long structural member 1 of the present embodiment also achieves the same advantageous effects as the first embodiment.

Note that, it is also possible to apply the configuration of the present embodiment to the second embodiment.

Seventh Embodiment

Figure 15:
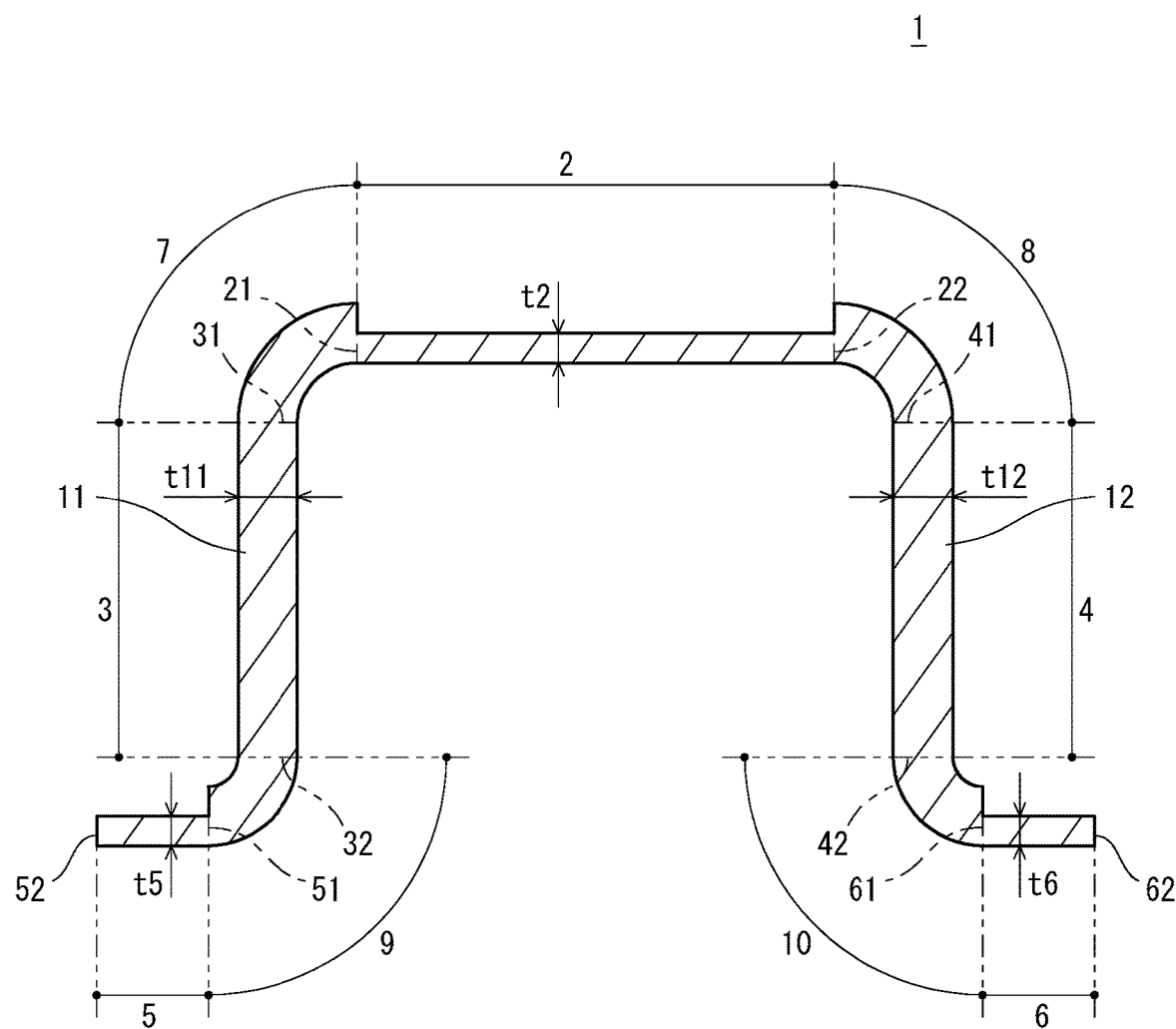
FIG. 15 is a schematic diagram illustrating an example of the transverse sectional shape of a long structural member of a seventh embodiment.

FIG. 15 is a schematic diagram illustrating an example of the transverse sectional shape of a long structural member 1 of the seventh embodiment. The present embodiment is an embodiment obtained by modifying the first embodiment.

Referring to FIG. 15, in the case of the present embodiment, the first flange part 5, the first thick-wall part 11 (the first side plate part 3, the first upper corner part 7, and the first lower corner part 9), the top plate part 2, the second thick-wall part 12 (the second side plate part 4, the second upper corner part 8, and the second lower corner part 10), and the second flange part 6 are of a single-material member, which are continuous with each other. Therefore, there are no weld zones. The long structural member 1 of the present embodiment can be produced by extrusion forming or injection forming or the like.

In the long structural member 1 of the present embodiment also, similarly to the first embodiment, in a transverse section of the long structural member 1 including the first thick-wall part 11 and the second thick-wall part 12, the first side plate part 3, the first upper corner part 7, and the first lower corner part 9 are formed to be thick-walled, and the second side plate part 4, the second upper corner part 8, and the second lower corner part 10 are formed to be thick-walled. Furthermore, the top plate part 2, the first flange part 5, and the second flange part 6 remain thin. Therefore, the long structural member 1 of the present embodiment also achieves the same advantageous effects as the first embodiment.

Note that, it is also possible to apply the configuration of the present embodiment to the second and sixth embodiments.

Eighth Embodiment

Figure 16:
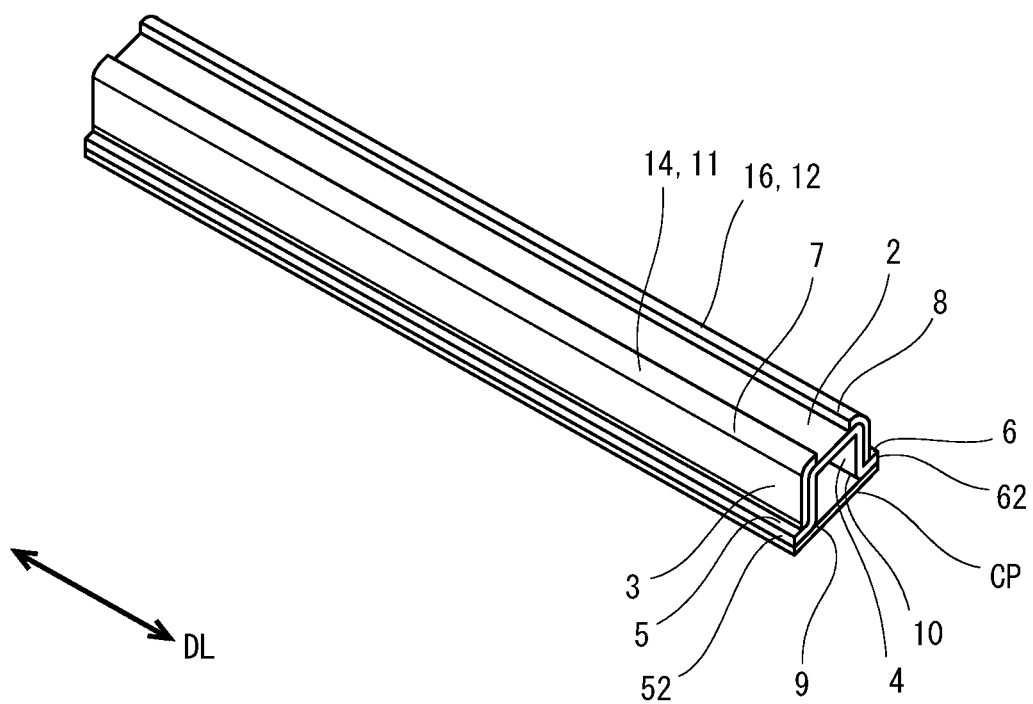
FIG. 16 is a perspective view that schematically illustrates the overall structure of a long structural member of an eighth embodiment.
Figure 17:
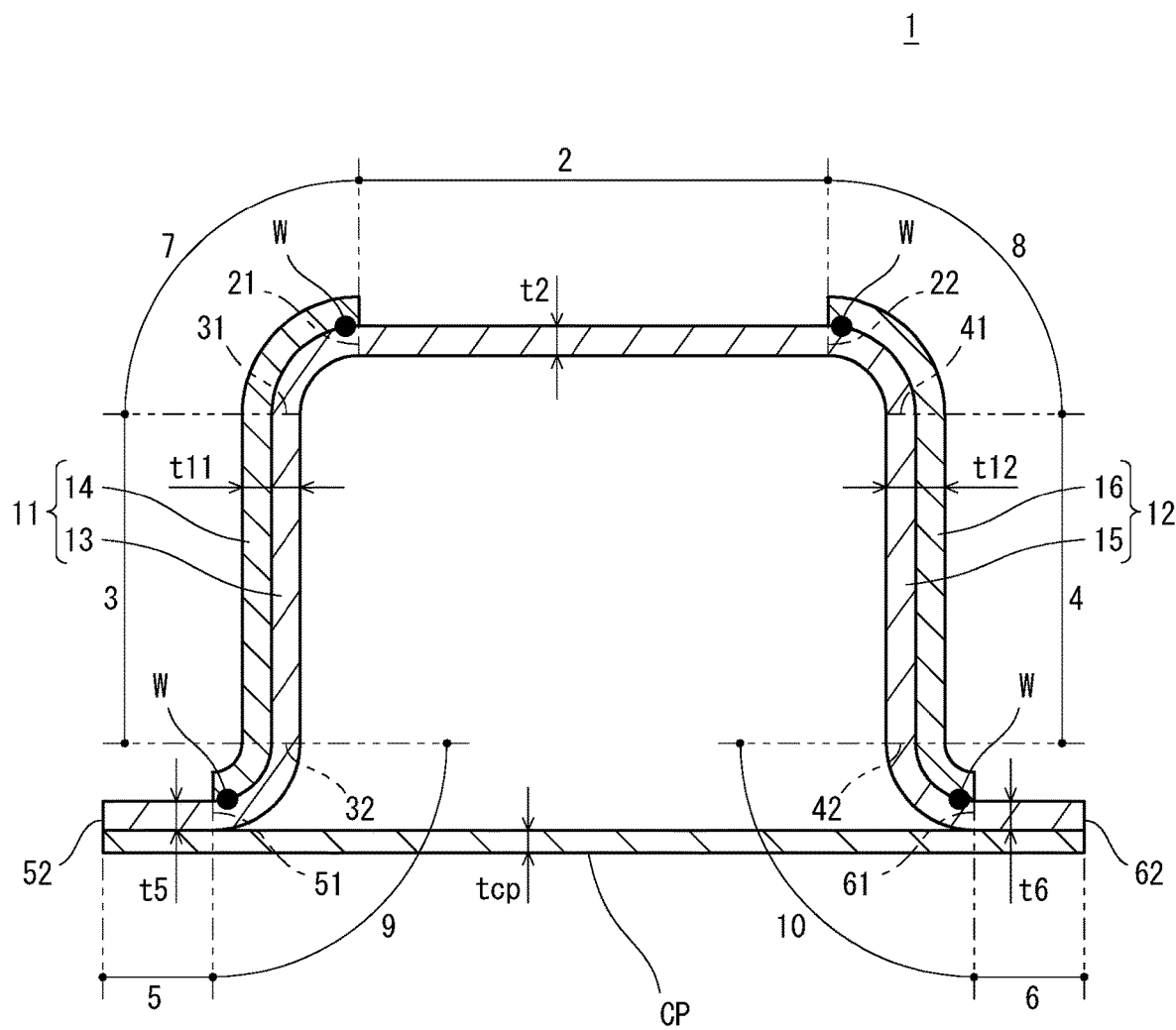
FIG. 17 is a schematic diagram illustrating an example of the transverse sectional shape of the long structural member of the eighth embodiment.

FIG. 16 is a perspective view that schematically illustrates the overall structure of a long structural member 1 of the eighth embodiment. FIG. 17 is a schematic diagram illustrating an example of the transverse sectional shape of the long structural member 1 of the eighth embodiment. The present embodiment is an embodiment obtained by modifying the first embodiment.

Referring to FIG. 16 and FIG. 17, in the case of the present embodiment, a closing plate CP is joined to the first flange part 5 and the second flange part 6. The closing plate CP is arranged over the entire range in the longitudinal direction DL of the long structural member 1. The joining method is, for example, spot welding. However, the joining method may be laser welding, bonding using an adhesive, or fastening with a bolt, or the like, or may be a combination of two or more of these methods.

In this case, the transverse sectional shape of the long structural member 1 is a closed sectional shape. As a result, the flexural rigidity of the long structural member 1 increases. Therefore, the three-point bending characteristics further improve.

Here, in the long structural member 1 of the present embodiment, in a case where a bending load is introduced to the top plate part 2, compressive stress acts on the top plate part 2, the first upper corner part 7, the first side plate part 3, the first lower corner part 9, the second upper corner part 8, the second side plate part 4, and the second lower corner part 10, and each of parts bends so as to be crushed. Among each of these parts, the compressive stress acting on the top plate part 2 is small in comparison to the other parts. Because each of these parts excluding the top plate part 2 is a thick-walled portion formed from the first thick-wall part 11 and the second thick-wall part 12, these parts can resist bending deformation of the long structural member 1 caused by compressive stress.

On the other hand, tensile stress acts on the first flange part 5, the second flange part 6, and the closing plate CP. The tensile stress does not affect the bending deformation of the long structural member 1. Therefore, a thickness tcp of the closing plate CP is not particularly limited. However, from the viewpoint of suppressing an increase in weight, preferably the thickness tcp of the closing plate CP is small. That is, it suffices that the thickness tcp of the closing plate CP is less than the thickness t2 of the top plate part 2, the thickness t5 of the first flange part 5, and the thickness t6 of the second flange part 6.

Note that, it is also possible to apply the configuration of the present embodiment to the second to seventh embodiments.

Ninth Embodiment

Figure 18:
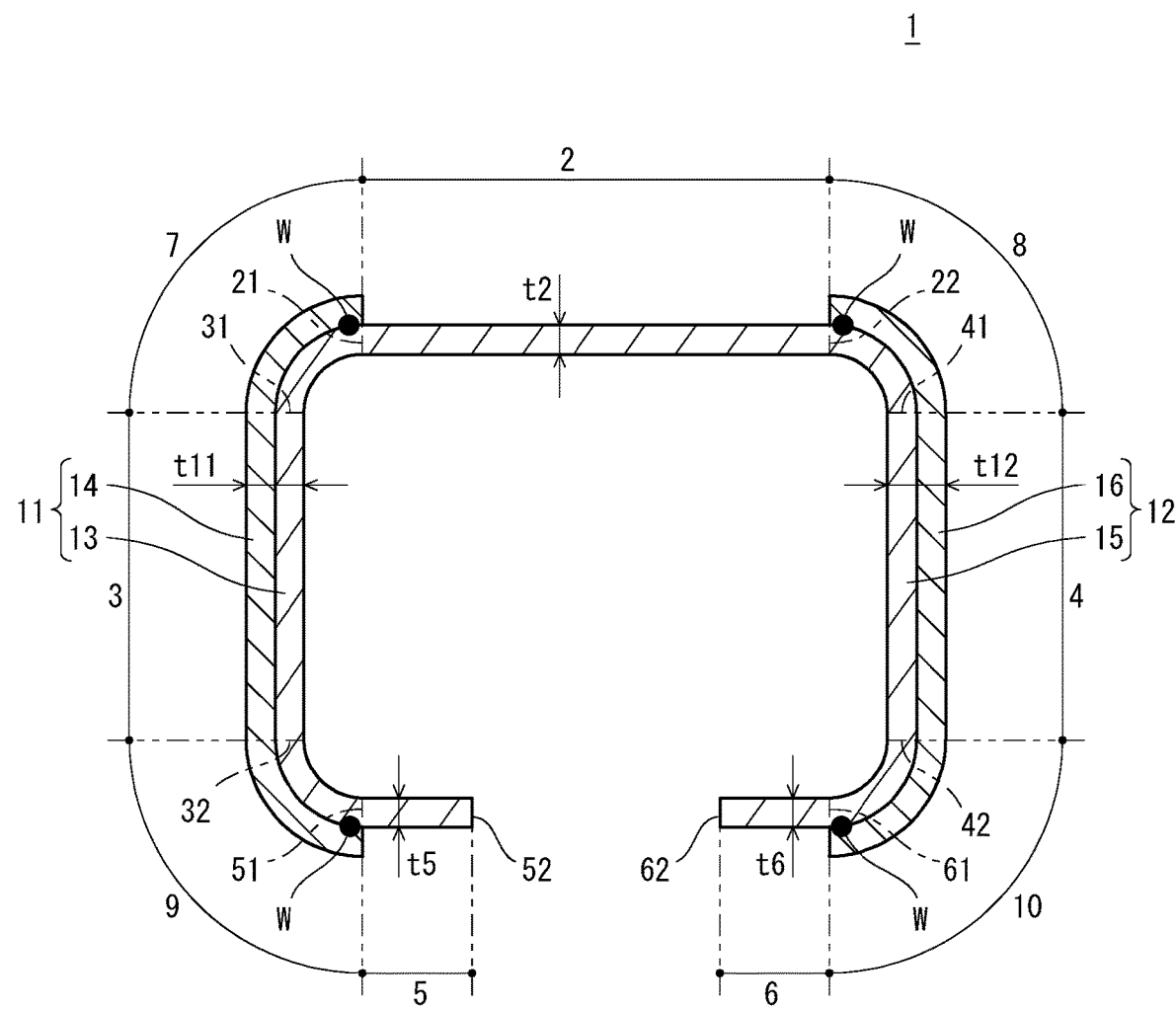
FIG. 18 is a schematic diagram illustrating an example of the transverse sectional shape of a long structural member of a ninth embodiment.

FIG. 18 is a schematic diagram illustrating an example of the transverse sectional shape of a long structural member 1 of the ninth embodiment. The present embodiment is an embodiment obtained by modifying the first embodiment.

Referring to FIG. 18, in the case of the present embodiment, in a transverse section, the first flange part 5 extends in the direction in which the top plate part 2 extends with respect to the first side plate part 3. The second flange part 6 extends in the direction in which the top plate part 2 extends, with respect to the second side plate part 4. Therefore, in the transverse section, the first flange part 5 and the second flange part 6 extend inwardly with respect to each other. In short, the long structural member 1 of the present embodiment has a transverse sectional shape that is C-shaped.

In the long structural member 1 of the present embodiment also, similarly to the first embodiment, in a transverse section of the long structural member 1 including the first thick-wall part 11 and the second thick-wall part 12, the first side plate part 3, the first upper corner part 7, and the first lower corner part 9 are formed to be thick-walled, and the second side plate part 4, the second upper corner part 8, and the second lower corner part 10 are formed to be thick-walled. Furthermore, the top plate part 2, the first flange part 5, and the second flange part 6 remain thin. Therefore, the long structural member 1 of the present embodiment also achieves the same advantageous effects as the first embodiment.

Note that, it is also possible to apply the configuration of the present embodiment to the second, sixth, and seventh embodiments.

Tenth Embodiment

Figure 19:
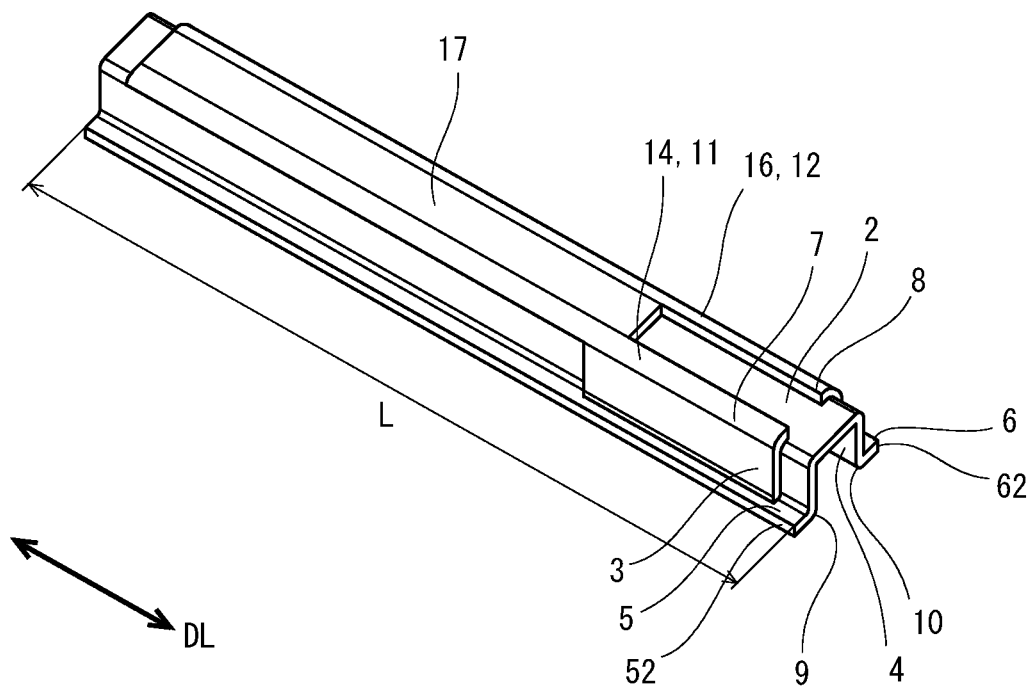
FIG. 19 is a perspective view that schematically illustrates the overall structure of a long structural member of a tenth embodiment.
Figure 20:
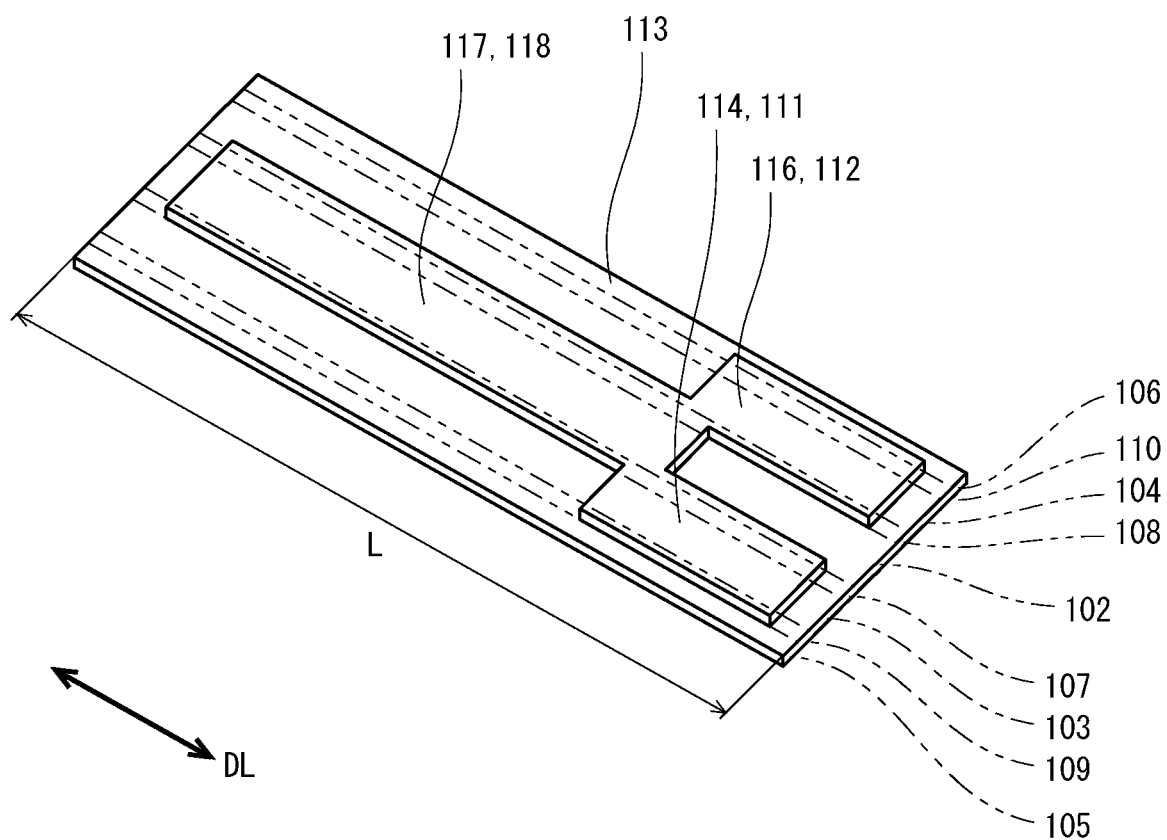
FIG. 20 is a perspective view that schematically illustrates a blank material that is used for producing the long structural member of the tenth embodiment.

FIG. 19 is a perspective view that schematically illustrates the overall structure of a long structural member 1 of the tenth embodiment. FIG. 20 is a perspective view that schematically illustrates a blank material 101 that is used for producing the long structural member 1 of the tenth embodiment. The present embodiment is an embodiment obtained by modifying the first embodiment.

Referring to FIG. 19, in the case of the present embodiment, in a transverse section of one part in the longitudinal direction DL of the long structural member 1, the first side plate part 3, the first upper corner part 7, and the first lower corner part 9 constitute the first thick-wall part 11, and the second side plate part 4, the second upper corner part 8, and the second lower corner part 10 constitute the second thick-wall part 12. That is, the first thick-wall part 11 and the second thick-wall part 12 exist at one part in the longitudinal direction DL of the long structural member 1.

Here, in a case where the long structural member 1 is a center pillar, the long structural member 1 that is incorporated into the body of an automobile is in an upright state, and the longitudinal direction DL of the long structural member 1 is along the vertical direction. Hereunder, the description of the present embodiment is continued on the basis that the longitudinal direction DL of the long structural member 1 is along the vertical direction.

In a case where the long structural member 1 is a center pillar, a collision load will be applied to the lower part of the long structural member 1. In this case, it suffices that the first thick-wall part 11 and the second thick-wall part 12 are provided only at the lower part of the long structural member 1. This is because it suffices that, at a minimum, the first thick-wall part 11 and the second thick-wall part 12 are present at a portion where a bending load is introduced. For example, the first thick-wall part 11 and the second thick-wall part 12 are provided in a range up to approximately 30 percent of the overall length L of the long structural member 1 from the lower end of the long structural member 1. The first thick-wall part 11 and the second thick-wall part 12 are not provided at the bottom end of the long structural member 1. However, the first thick-wall part 11 and the second thick-wall part 12 may be provided at the bottom end of the long structural member 1.

A third thick-wall part 17 is provided at the upper part of the long structural member 1. The third thick-wall part 17 is formed from the first upper corner part 7 and the second upper corner part 8. The third thick-wall part 17 is connected to the first thick-wall part 11 and the second thick-wall part 12. That is, in the first upper corner part 7 of the third thick-wall part 17, a portion that is near to the first thick-wall part 11 is shared with the first upper corner part 7 of the first thick-wall part 11. In the second upper corner part 8 of the third thick-wall part 17, a portion that is near to the second thick-wall part 12 is shared with the second upper corner part 8 of the second thick-wall part 12. The third thick-wall part 17 is not provided at the top end of the long structural member 1. The third thick-wall part 17 may be provided at the top end of the long structural member 1.

The long structural member 1 of the present embodiment is produced by press forming using a PWB (patchwork blank) as a blank material. It is also possible to produce the long structural member 1 by roll forming.

Referring to FIG. 20, the blank material 101 of the present embodiment is a PWB. The blank material 101 is formed from the main steel sheet 113, the first reinforcing steel sheet 114, the second reinforcing steel sheet 116, and a third reinforcing steel sheet 117. The main steel sheet 113 extends over all of the blank material 101. The third reinforcing steel sheet 117 is connected to the first reinforcing steel sheet 114 and the second reinforcing steel sheet 116. Therefore, the overall planar shape of the first reinforcing steel sheet 114, the second reinforcing steel sheet 116, and the third reinforcing steel sheet 117 appears as an inverted Y-shape.

With reference to FIG. 20 while also referring to FIG. 19, the first reinforcing steel sheet 114 is superimposed at the position of the first thick-wall corresponding part 111 of the main steel sheet 113, and joined to the main steel sheet 113. The first thick-wall corresponding part 111 corresponds to the first thick-wall part 11 to be provided at the lower part of the long structural member 1. The second reinforcing steel sheet 116 is superimposed at the position of the second thick-wall corresponding part 112 of the main steel sheet 113, and joined to the main steel sheet 113. The second thick-wall corresponding part 112 corresponds to the second thick-wall part 12 to be provided at the lower part of the long structural member 1. The third reinforcing steel sheet 117 is superimposed at the position of a third thick-wall corresponding part 118 of the main steel sheet 113, and joined to the main steel sheet 113. The third thick-wall corresponding part 118 corresponds to the third thick-wall part 17 to be provided at the upper part of the long structural member 1.

In the case of a PWB, it suffices to merely superimpose the reinforcing steel sheets 114, 116, and 117 that are arranged in an inverted Y-shape in plan view on the main steel sheet 113, and join the reinforcing steel sheets 114, 116, and 117 to the main steel sheet 113 by laser welding. Hence, the blank material 101 that is a PWB which is suitable for producing the long structural member 1 of the present embodiment can be easily produced.

Note that, it is also possible to apply the configuration of the present embodiment to the second to ninth embodiments.

However, it is difficult to produce a blank material that is a TWB which is suitable for producing the long structural member 1 of the present embodiment. The reason is as follows. In the case of a TWB, a reinforcing steel sheet having an inverted Y-shape in plan view that is thicker than the main steel sheet is prepared. A hole having an inverted Y-shape corresponding to the external shape of the reinforcing steel sheet is formed in the main steel sheet. The reinforcing steel sheet is inserted into the hole, and the reinforcing steel sheet is then joined to the main steel sheet by laser welding. At such time, it is easy for a gap to occur between the hole in the main steel sheet and the peripheral edge of the reinforcing steel sheet. Therefore, it is difficult to obtain a suitable TWB. Thus, a TWB may be unsuitable for use as a blank material that is appropriate for the long structural member 1 of the present embodiment.

Other modifications are described hereunder.

[Modification 1]

Figure 21:
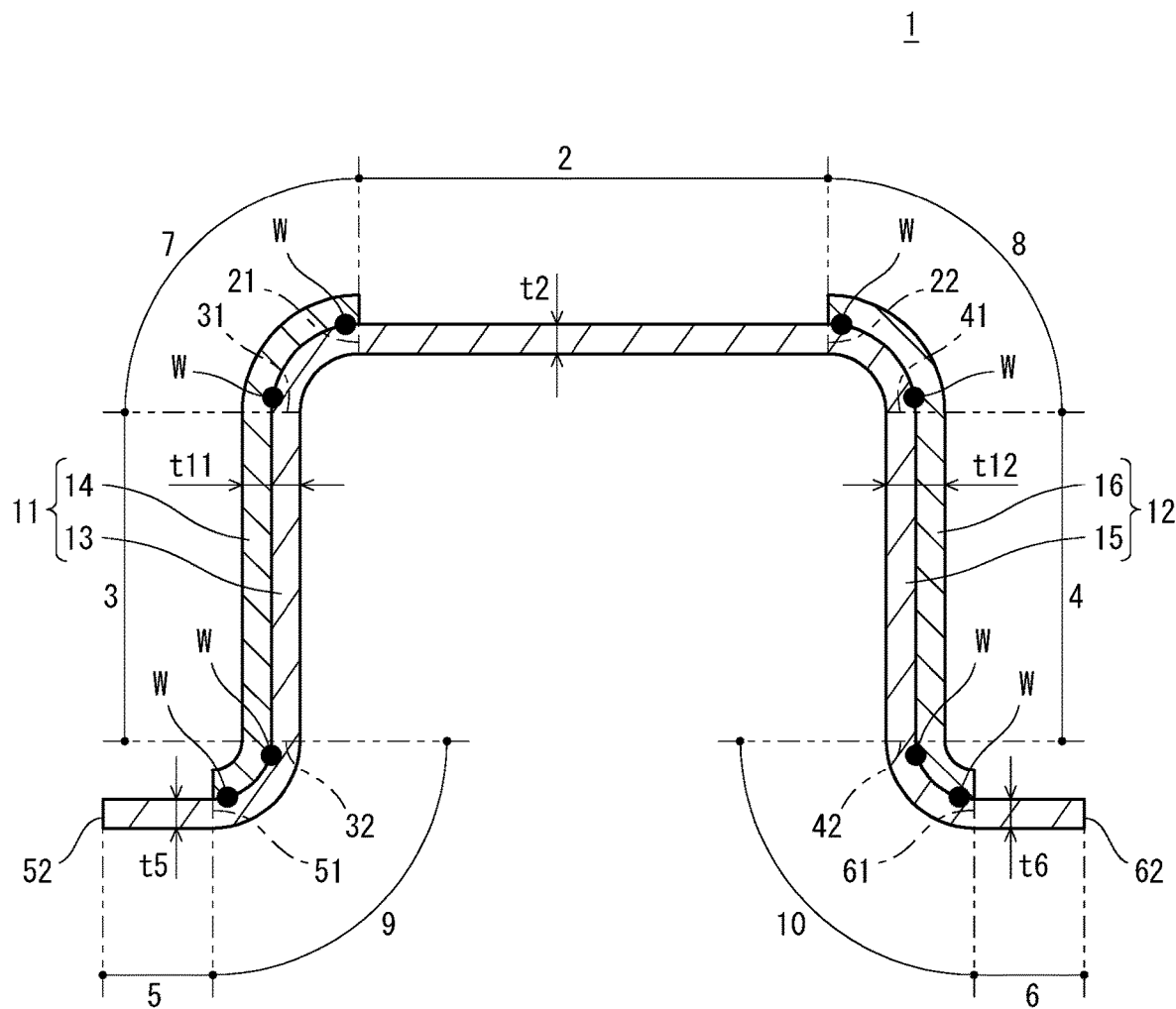
FIG. 21 is a schematic diagram illustrating an example of the transverse sectional shape of a long structural member of Modification 1.

FIG. 21 is a schematic diagram illustrating an example of the transverse sectional shape of a long structural member 1 of Modification 1. The long structural member 1 of Modification 1 is, as one example, obtained by modifying the long structural member 1 of the first embodiment.

Referring to FIG. 21, the first reinforcing sheet part 14 is joined at four places to the first main sheet part 13 by laser welding. Specifically, in addition to the weld zones W of the first embodiment illustrated in FIG. 2, at the first upper corner part 7, there is a weld zone W in the vicinity of the boundary between the first upper corner part 7 and the first side plate part 3. In addition, at the first lower corner part 9, there is a weld zone W in the vicinity of the boundary between the first lower corner part 9 and the first side plate part 3.

The second reinforcing sheet part 16 is joined at four places to the second main sheet part 15 by laser welding. Specifically, in addition to the weld zones W of the first embodiment illustrated in FIG. 2, at the second upper corner part 8, there is a weld zone W in the vicinity of the boundary between the second upper corner part 8 and the second side plate part 4. In addition, at the second lower corner part 10, there is a weld zone W in the vicinity of the boundary between the second lower corner part 10 and the second side plate part 4.

In short, in the long structural member 1 of Modification 1, in comparison to the long structural member 1 of the first embodiment illustrated in FIG. 2, with regard to the first thick-wall part 11, the joining at the first upper corner part 7 and the first lower corner part 9 is strengthened, and with regard to the second thick-wall part 12, the joining at the second upper corner part 8 and the second lower corner part 10 is strengthened.

Figure 22:
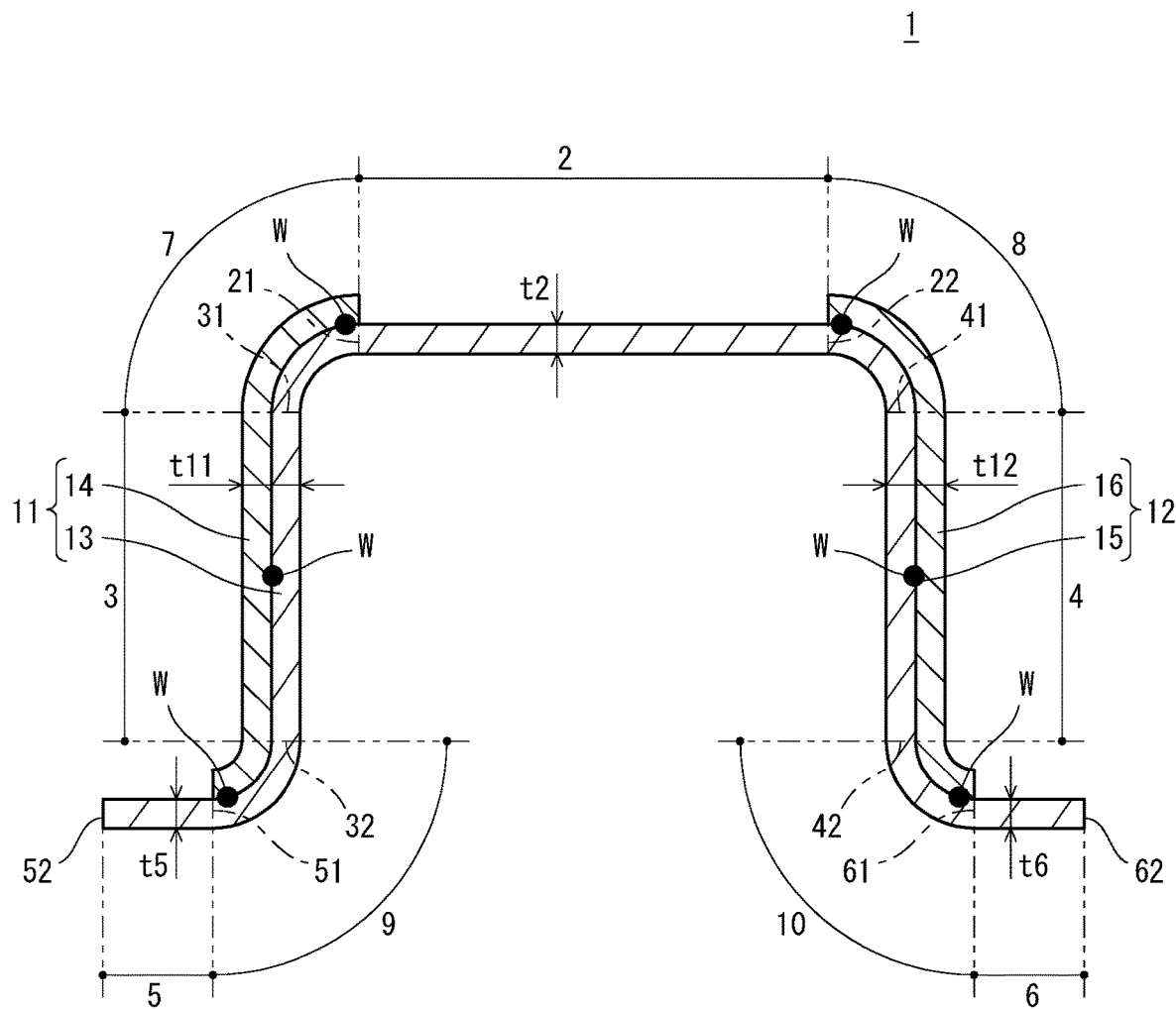
FIG. 22 is a schematic diagram illustrating an example of the transverse sectional shape of a long structural member of Modification 2.

[Modification 2] FIG. 22 is a schematic diagram illustrating an example of the transverse sectional shape of a long structural member 1 of Modification 2. The long structural member 1 of Modification 2 is, as one example, obtained by modifying the long structural member 1 of the first embodiment.

Referring to FIG. 22, the first reinforcing sheet part 14 is joined at three places to the first main sheet part 13 by laser welding. Specifically, in addition to the weld zones W of the first embodiment illustrated in FIG. 2, there is a weld zone W in the vicinity of the center of the first side plate part 3.

The second reinforcing sheet part 16 is joined at three places to the second main sheet part 15 by laser welding. Specifically, in addition to the weld zones W of the first embodiment illustrated in FIG. 2, there is a weld zone W in the vicinity of the center of the second side plate part 4.

In short, in the long structural member 1 of Modification 2, in comparison to the long structural member 1 of the first embodiment illustrated in FIG. 2, with regard to the first thick-wall part 11, the joining at the first side plate part 3 is strengthened, and with regard to the second thick-wall part 12, the joining at the second side plate part 4 is strengthened.

[Modification 3]

Figure 23:
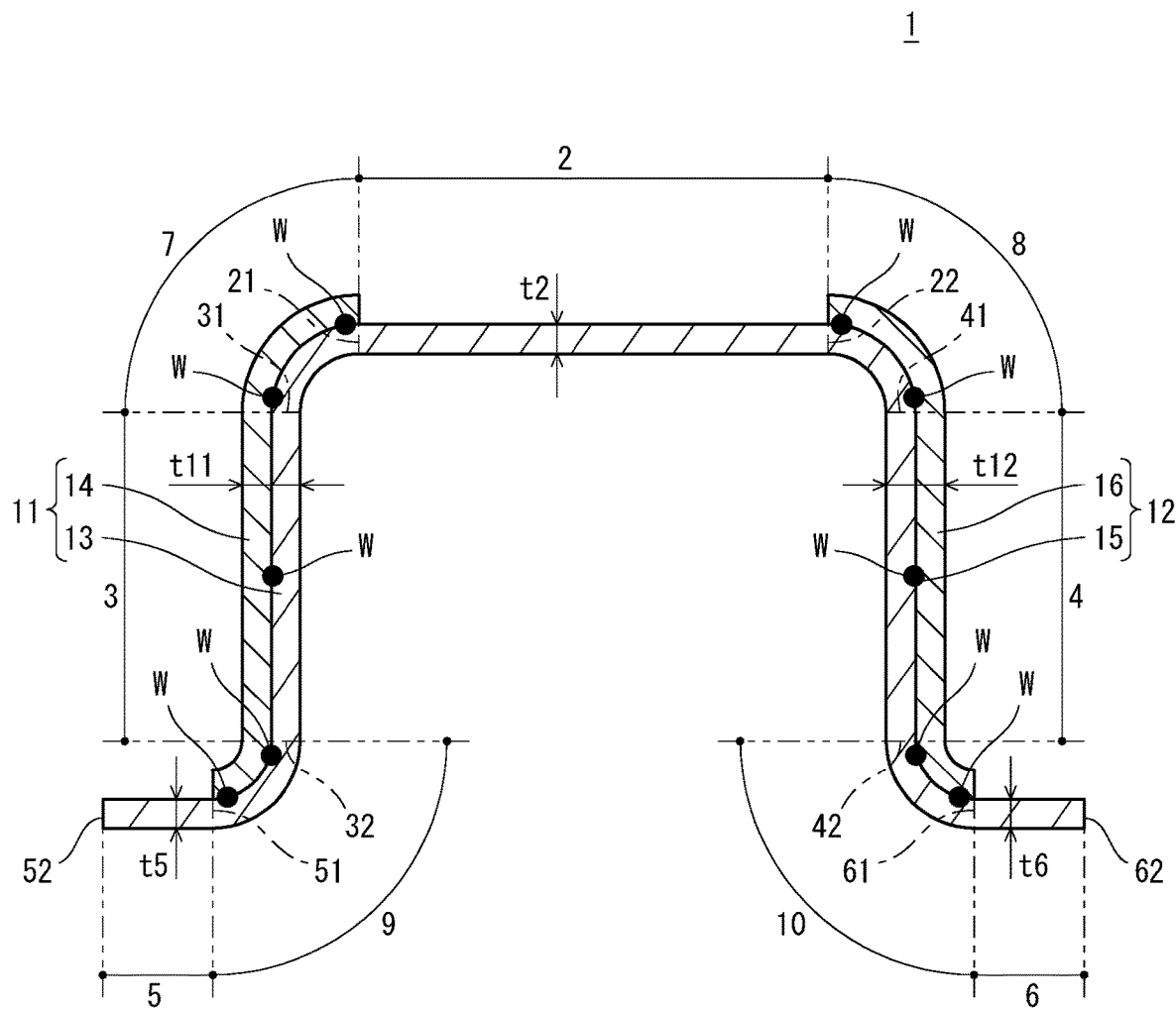
FIG. 23 is a schematic diagram illustrating an example of the transverse sectional shape of a long structural member of Modification 3.

FIG. 23 is a schematic diagram illustrating an example of the transverse sectional shape of a long structural member 1 of Modification 3. The long structural member 1 of Modification 3 is, as one example, obtained by modifying the long structural member 1 of the first embodiment.

Referring to FIG. 23, the first reinforcing sheet part 14 is joined at five places to the first main sheet part 13 by laser welding. Specifically, in addition to the weld zones W of the first embodiment illustrated in FIG. 2, at the first upper corner part 7, there is a weld zone W in the vicinity of the boundary between the first upper corner part 7 and the first side plate part 3. In addition, at the first lower corner part 9, there is a weld zone W in the vicinity of the boundary between the first lower corner part 9 and the first side plate part 3. Furthermore, there is a weld zone W in the vicinity of the center of the first side plate part 3.

The second reinforcing sheet part 16 is joined at five places to the second main sheet part 15 by laser welding. Specifically, in addition to the weld zones W of the first embodiment illustrated in FIG. 2, at the second upper corner part 8, there is a weld zone W in the vicinity of the boundary between the second upper corner part 8 and the second side plate part 4. In addition, at the second lower corner part 10, there is a weld zone W in the vicinity of the boundary between the second lower corner part 10 and the second side plate part 4. Furthermore, there is a weld zone W in the vicinity of the center of the second side plate part 4.

In short, in the long structural member 1 of Modification 3, in comparison to the long structural member 1 of the first embodiment illustrated in FIG. 2, with regard to the first thick-wall part 11, the joining at the first upper corner part 7 and the first lower corner part 9 is strengthened, and with regard to the second thick-wall part 12, the joining at the second upper corner part 8 and the second lower corner part 10 is strengthened. In addition, with regard to the first thick-wall part 11, the joining at the first side plate part 3 is strengthened, and with regard to the second thick-wall part 12, the joining at the second side plate part 4 is strengthened.

EXAMPLES

First Example

In order to investigate the effectiveness of the long structural member of the present embodiment, a three-point bending test was carried out by analysis and experiment. First, as Inventive Example 1 of the present invention, the long structural member 1 illustrated in FIG. 14 was investigated. This long structural member 1 was produced from a TWB. In Inventive Example 1 of the present invention, the thickness t2 of the top plate part 2, the thickness t5 of the first flange part 5, and the thickness t6 of the second flange part 6 were 1.2 mm. The thickness t11 of the first thick-wall part 11 and the thickness t12 of the second thick-wall part 12 were 2.6 mm.

As Comparative Example 1, a long structural member in which the overall sheet thickness was made thick was investigated. In Comparative Example 1, the overall sheet thickness of the long structural member was 2.6 mm. As Comparative Example 2, a long structural member in which the overall sheet thickness was made thin was investigated. In Comparative Example 2, the overall sheet thickness of the long structural member was 1.2 mm. The transverse sectional shape of the long structural member of each of Inventive Example 1 of the present invention, Comparative Example 1, and Comparative Example 2 was a hat shape. Further, a closing plate CP was joined to each of these long structural members. A thickness tcp of the closing plate CP was 1.4 mm.

The conditions of the three-point bending test were as follows: radius of curvature of indenter (impactor): 150 mm; radius of curvature of support points (supporters): 30 mm; distance between support points: 400 mm; length of each long structural member: 600 mm.

Figure 24:
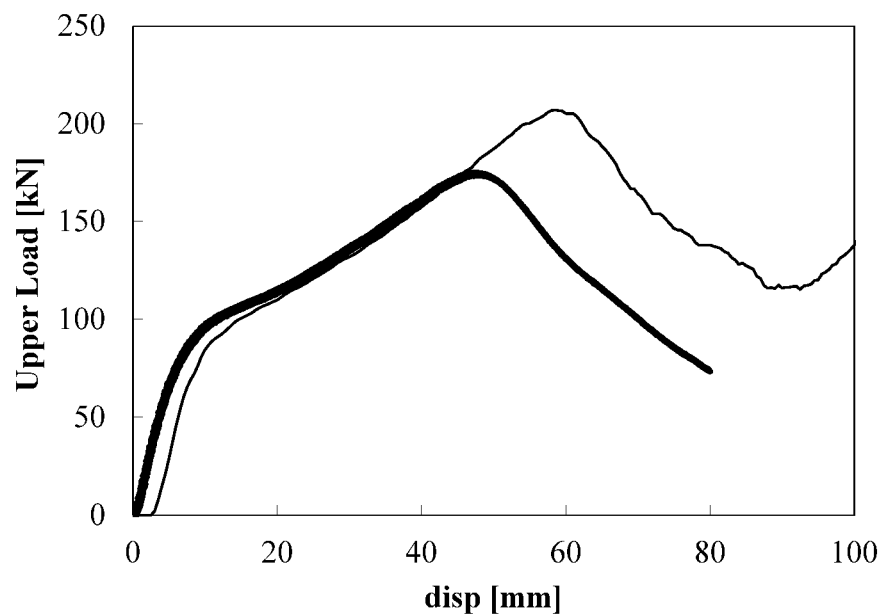
FIG. 24 is a diagram showing test results for Inventive Example 1 of the present invention.
Figure 25:
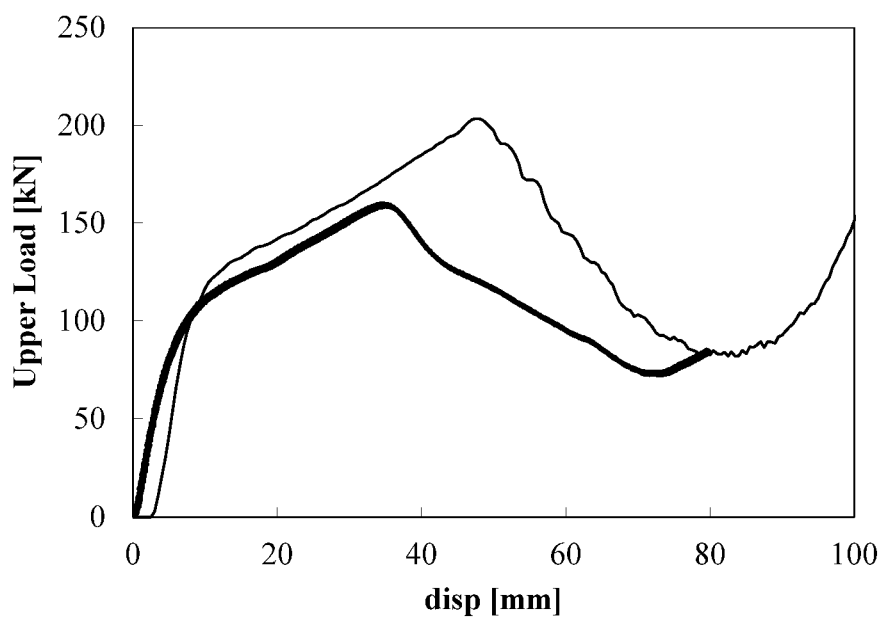
FIG. 25 is a diagram showing test results for Comparative Example 1.
Figure 26:
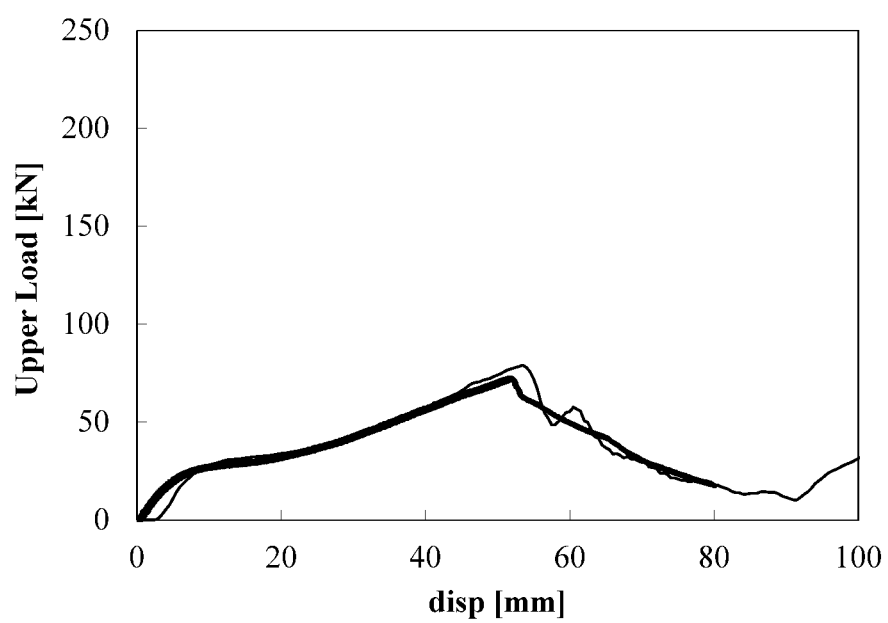
FIG. 26 is a diagram showing test results for Comparative Example 2.

The test results are shown in FIG. 24 to FIG. 26. FIG. 24 is a diagram showing the test results for Inventive Example 1 of the present invention. FIG. 25 is a diagram showing the test results for Comparative Example 1. FIG. 26 is a diagram showing the test results for Comparative Example 2. In these drawings, the abscissa represents the displacement of the impactor applying the bending load, and the ordinate represents the load that the impactor detects. The higher the maximum value of the load is and the larger the integrated value (energy absorption amount) of the load and the impactor displacement is, the more excellent the three-point bending characteristics are. Further, in these diagrams, the solid line shows the analysis result, and the thick line shows the experimental result.

Based on FIG. 25 and FIG. 26, it was found that the three-point bending characteristics of Comparative Example 1 markedly improved compared to Comparative Example 2. Further, based on FIG. 24 and FIG. 25, it was found that the three-point bending characteristics of Inventive Example 1 of the present invention compared favorably with Comparative Example 1. By these results, the usefulness of the long structural member 1 of Inventive Example 1 of the present invention that was produced from a TWB was verified.

Further, as Inventive Example 2 of the present invention, the long structural member 1 illustrated in FIG. 1 and FIG. 2 was investigated. This long structural member 1 was produced from a PWB. In Inventive Example 2 of the present invention, similarly to Inventive Example 1 of the present invention, the thickness t2 of the top plate part 2, the thickness t5 of the first flange part 5, and the thickness t6 of the second flange part 6 were 1.2 mm. The thickness t11 of the first thick-wall part 11 and the thickness t12 of the second thick-wall part 12 were 2.6 mm. That is, the thickness of each of the first main sheet part 13 and the second main sheet part 15 was 1.2 mm, and the thickness of each of the first reinforcing sheet part 14 and the second reinforcing sheet part 16 was 1.4 mm.

As Inventive Example 3 of the present invention, the long structural member 1 of Modification 1 illustrated in FIG. 21 was investigated. As Inventive Example 4 of the present invention, the long structural member 1 of Modification 2 illustrated in FIG. 22 was investigated. As Inventive Example 5 of the present invention, the long structural member 1 of Modification 3 illustrated in FIG. 23 was investigated. In short, Inventive Examples 2 to 5 of the present invention were long structural members 1 in which the number of places where the first main sheet part 13 and the first reinforcing sheet part 14 were joined to each other, and the number of places where the second main sheet part 15 and the second reinforcing sheet part 16 were joined to each other were varied. Further, the closing plate CP was joined to each of these long structural members 1. The thickness tcp of the closing plate CP was 1.4 mm. The test results are shown in FIG. 27 to FIG. 30.

Figure 27:
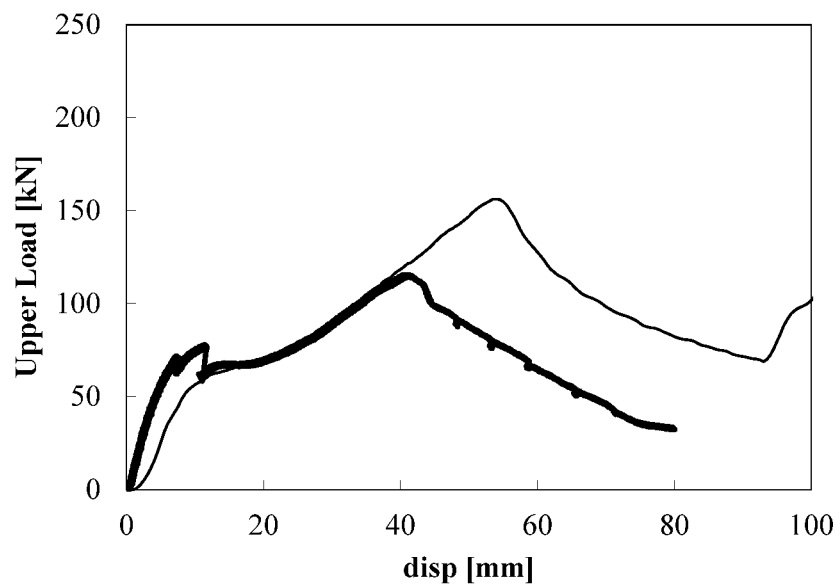
FIG. 27 is a diagram showing test results for Inventive Example 2 of the present invention.
Figure 28:
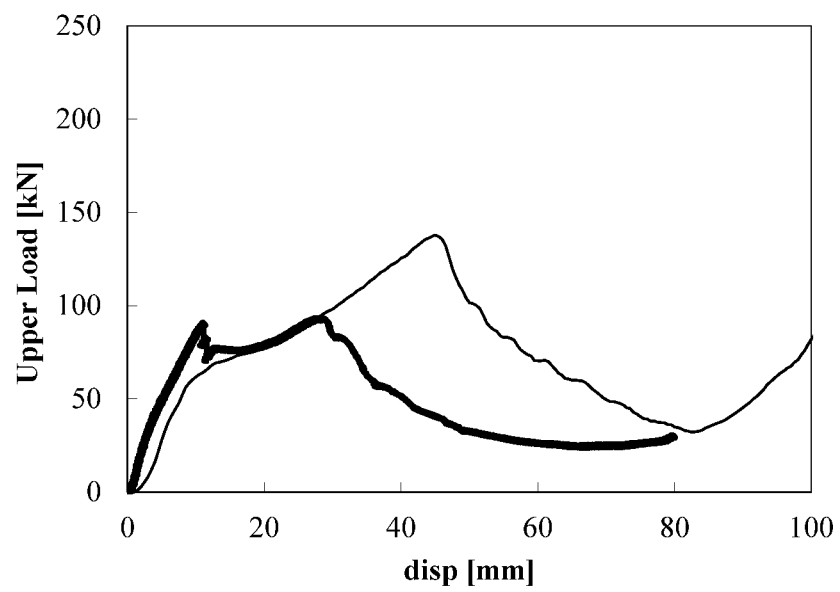
FIG. 28 is a diagram showing test results for Inventive Example 3 of the present invention.
Figure 29:
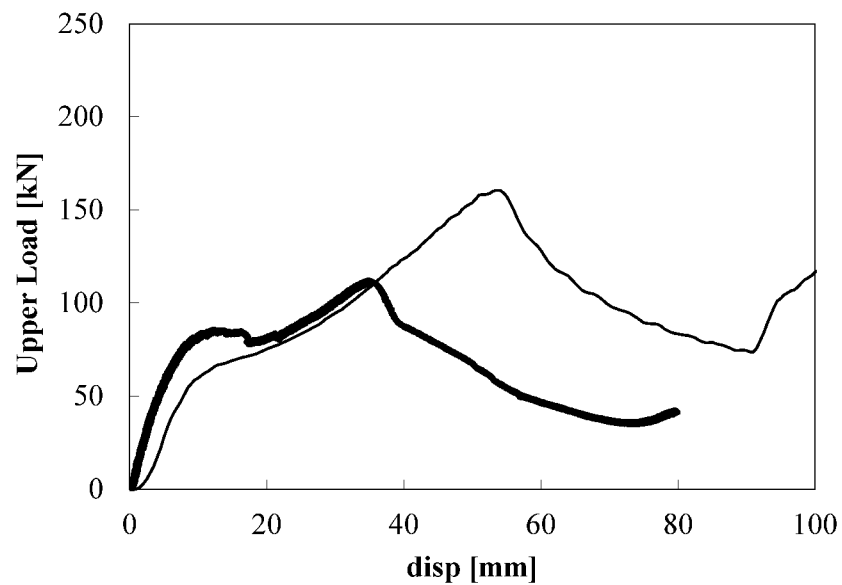
FIG. 29 is a diagram showing test results for Inventive Example 4 of the present invention.
Figure 30:
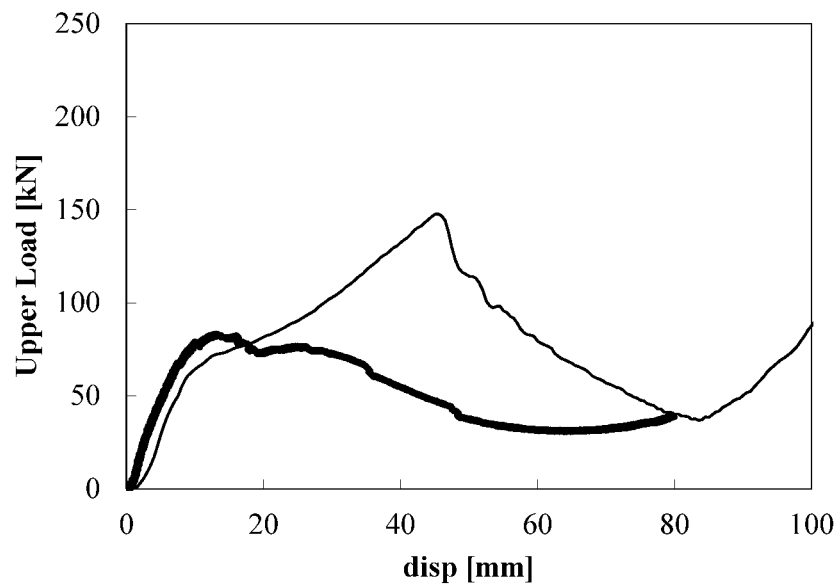
FIG. 30 is a diagram showing test results for Inventive Example 5 of the present invention.

FIG. 27 is a diagram showing the test results for Inventive Example 2 of the present invention. FIG. 28 is a diagram showing the test results for Inventive Example 3 of the present invention. FIG. 29 is a diagram showing the test results for Inventive Example 4 of the present invention. FIG. 30 is a diagram showing the test results for Inventive Example 5 of the present invention. The meaning of the ordinate, abscissa, solid line and thick line shown in each of these drawings is the same as in FIG. 24 to FIG. 26.

Based on FIG. 24 and FIG. 27 to FIG. 30, it was found that the three-point bending characteristics of Inventive Examples 2 to 5 of the present invention compared favorably with Inventive Example 1 of the present invention. From another viewpoint, based on FIG. 25 and FIG. 27 to FIG. 30, it was found that the three-point bending characteristics of Inventive Examples 2 to 5 of the present invention compared favorably with Comparative Example 1. By these results, the usefulness of the long structural member 1 of each of Inventive Examples 2 to 5 of the present invention that were produced from a PWB was verified.

Second Example

In the Second Example, in a long structural member 1 produced by press forming using a PWB as a blank material, the influence of the positions of weld zones W between the base part 1A and the first reinforcing sheet part 14 and the second reinforcing sheet part 16 on the three-point bending characteristics was verified.

As Inventive Example 6 of the present invention and Inventive Example 7 of the present invention, the long structural member 1 of the third embodiment illustrated in FIG. 6 and FIG. 7 was investigated. In Inventive Example 6 of the present invention, the first reinforcing sheet part 14 and the second reinforcing sheet part 16 were each joined to the base part 1A by linear welding (laser welding). In Inventive Example 7 of the present invention, the first reinforcing sheet part 14 and the second reinforcing sheet part 16 were each joined to the base part 1A by using a combination of linear welding (laser welding) and point welding (spot welding).

As Inventive Example 8 of the present invention, the long structural member 1 of the fifth embodiment illustrated in FIG. 13 was investigated. In Inventive Example 8 of the present invention, the first reinforcing sheet part 14 and the second reinforcing sheet part 16 were each joined to the base part 1A by linear welding (laser welding).

As Inventive Example 9 of the present invention, the long structural member 1 of Modification 1 illustrated in FIG. 21 was investigated. As Inventive Example 10 of the present invention, the long structural member 1 of Modification 2 illustrated in FIG. 22 was investigated. Inventive Examples 6 to 8 of the present invention were compared with Inventive Examples 9 and 10 of the present invention. Inventive Examples 9 and 10 of the present invention differed from Inventive Examples 6 to 8 of the present invention in the respect that there was a weld zone W between the first position P1 and the second position P2, and there was also a weld zone W between the third position P3 and the fourth position P4.

In the long structural member 1 of each of Inventive Examples 6 to 8 of the present invention as well as Inventive Examples 9 and 10 of the present invention, the thickness of the base part 1A was 1.2 mm. The thickness of the first reinforcing sheet part 14 and the second reinforcing sheet part 16 was 1.4 mm. That is, the thickness t2 of the top plate part 2, the thickness t5 of the first flange part 5, and the thickness t6 of the second flange part 6 were each 1.2 mm. The thickness t11 of the first thick-wall part 11 and the thickness t12 of the second thick-wall part 12 were each 2.6 mm. The closing plate CP was joined to each of the long structural members 1. The thickness tcp of the closing plate CP was 1.4 mm. The conditions of the three-point bending test were the same as in the First Example.

Figure 31:
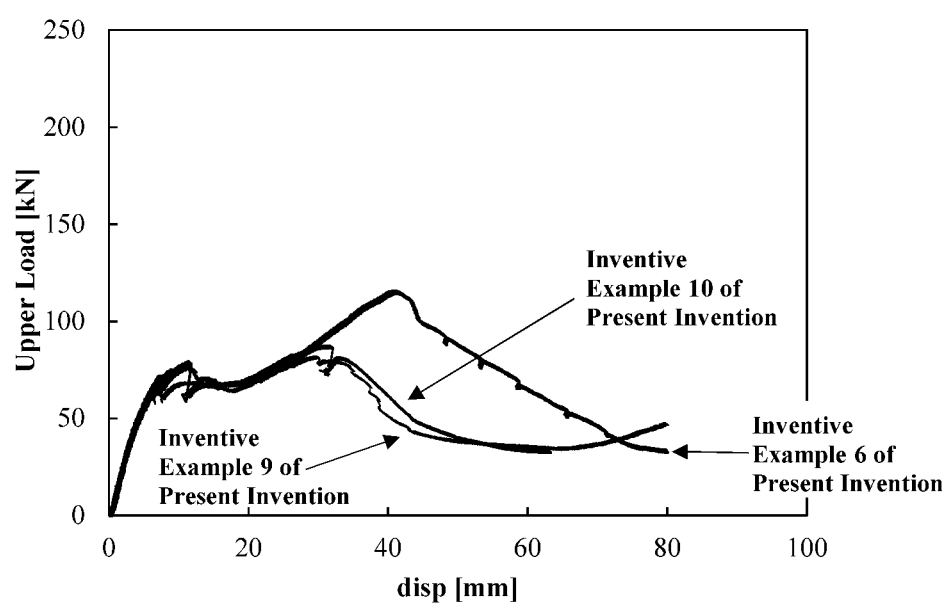
FIG. 31 is a diagram showing test results for Second Example.
Figure 32:
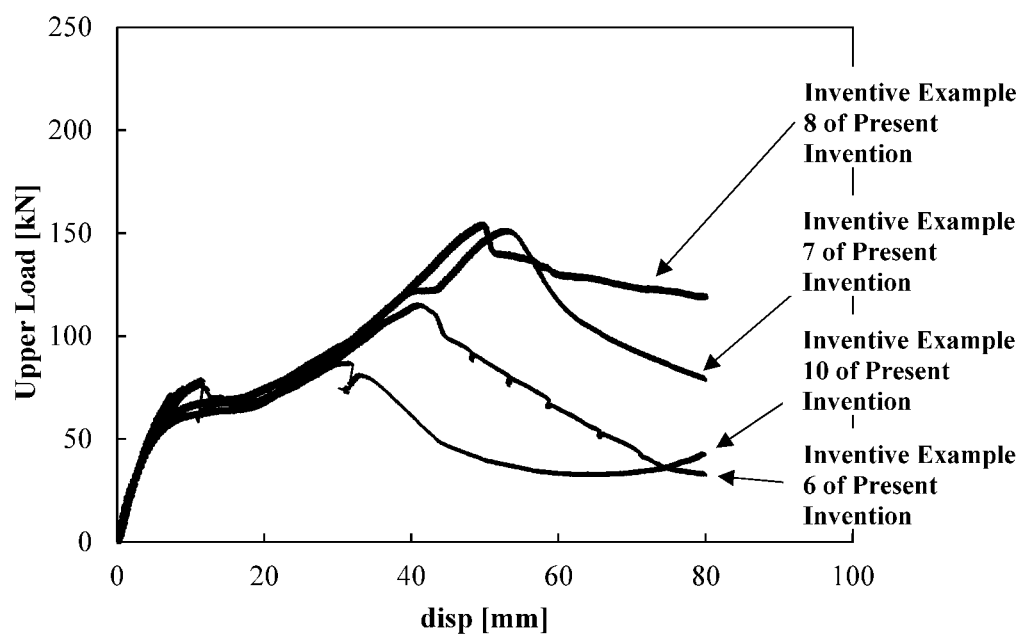
FIG. 32 is a diagram showing test results for the Second Example.

The test results are shown in FIG. 31 and FIG. 32. In FIG. 31, the results for Inventive Example 6 of the present invention as well as Inventive Examples 9 and 10 of the present invention are shown. In FIG. 32 the results for Inventive Examples 6 to 8 of the present invention and Inventive Example 10 of the present invention are shown.

As shown in FIG. 31 and FIG. 32, the three-point bending characteristics of Inventive Examples 6 to 8 of the present invention were markedly improved compared to Inventive Examples 9 and 10 of the present invention. In particular, the three-point bending characteristics of Inventive Examples 7 and 8 of the present invention were markedly improved compared to Inventive Example 6 of the present invention. By these results, the usefulness of the long structural member 1 of each of Inventive Examples 6 to 8 of the present invention was verified.

Embodiments of the present disclosure have been described above. However, the foregoing embodiments are merely examples for implementing the present disclosure. Accordingly, the present disclosure is not limited to the above embodiments, and the above embodiments can be appropriately modified within a range which does not deviate from the gist of the present disclosure.

REFERENCE SIGNS LIST

1: Long structural member
1A: Base part
2: Top plate part
3: First side plate part
4: Second side plate part
5: First flange part
6: Second flange part
7: First upper corner part
8: Second upper corner part
9: First lower corner part
10: Second lower corner part
11: First thick-wall part
12: Second thick-wall part
13: First main sheet part
14: First reinforcing sheet part
Second main sheet part
16: Second reinforcing sheet part
101: Blank material
111: First thick-wall corresponding part
112: Second thick-wall corresponding part
113: Main steel sheet
114: First reinforcing steel sheet
116: Second reinforcing steel sheet
CP: Closing plate

The invention claimed is:

1. A long structural member, comprising:
a top plate part that extends in a longitudinal direction of the long structural member, the top plate part including a first lateral edge and a second lateral edge;
a first side plate part that extends along the first lateral edge of the top plate part, the first side plate part including a first upper edge and a first lower edge;
a second side plate part that extends along the second lateral edge of the top plate part, the second side plate part including a second upper edge and a second lower edge;
a first flange part that extends along the first lower edge of the first side plate part, the first flange part including a first connecting lateral edge and a first open lateral edge;
a second flange part that extends along the second lower edge of the second side plate part, the second flange part including a second connecting lateral edge and a second open lateral edge;
a first upper corner part that connects the first lateral edge of the top plate part and the first upper edge of the first side plate part;
a second upper corner part that connects the second lateral edge of the top plate part and the second upper edge of the second side plate part;
a first lower corner part that connects the first lower edge of the first side plate part and the first connecting lateral edge of the first flange part; and
a second lower corner part that connects the second lower edge of the second side plate part and the second connecting lateral edge of the second flange part;
wherein:
in a transverse section of one part or all of the long structural member in the longitudinal direction, the top plate part, the first flange part, and the second flange part are flat, the first side plate part, the first upper corner part, and the first lower corner part constitute a first thick-wall part, and a thickness of the first thick-wall part is greater than a thickness of the top plate part and is greater than a thickness of the first flange part, and the second side plate part, the second upper corner part, and the second lower corner part constitute a second thick-wall part, and a thickness of the second thick-wall part is greater than a thickness of the top plate part and is greater than a thickness of the second flange part.

2. The long structural member according to claim 1, comprising:

a base part formed from a single-material member extending in the longitudinal direction of the long structural member, and a first reinforcing sheet part and a second reinforcing sheet part that are joined to the base part, wherein:

the first thick-wall part is formed by a first main sheet part in the base part and the first reinforcing sheet part being joined in a superimposed state, and the second thick-wall part is formed by a second main sheet part in the base part and the second reinforcing sheet part being joined in a superimposed state.

3. The long structural member according to claim 2, wherein:

the long structural member has a hat-shaped transverse sectional shape, the first reinforcing sheet part is welded to the base part at a first position that is further on the top plate part side than a center in a circumferential direction of the first upper corner part, is welded to the base part at a second position that is further on the first flange part side than a center in a circumferential direction of the first lower corner part, and is not welded to the base part between the first position and the second position, and the second reinforcing sheet part is welded to the base part at a third position that is further on the top plate part side than a center in a circumferential direction of the second upper corner part, is welded to the base part at a fourth position that is further on the second flange part side than a center in a circumferential direction of the second lower corner part, and is not welded to the base part between the third position and the fourth position.

4. The long structural member according to claim 3, wherein:

the first reinforcing sheet part and the second reinforcing sheet part are arranged on an outer surface of the base part.

5. The long structural member according to claim 4, wherein:

a distance from the center in the circumferential direction of the first upper corner part to the first position is greater than a distance from the center in the circumferential direction of the first lower corner part to the second position, and a distance from the center in the circumferential direction of the second upper corner part to the third position is greater than a distance from the center in the circumferential direction of the second lower corner part to the fourth position.

6. The long structural member according to claim 3, wherein:

the first reinforcing sheet part is linearly welded at the first position and the second position to the base part, and the second reinforcing sheet part is linearly welded at the third position and the fourth position to the base part.

7. The long structural member according to claim 3, wherein:

the first reinforcing sheet part is point welded at the first position and the second position to the base part, and the second reinforcing sheet part is point welded at the third position and the fourth position to the base part.

8. The long structural member according to claim 3, comprising:

a closing plate that is joined to the first flange part and the second flange part.

9. The long structural member according to claim 2, wherein:

the first reinforcing sheet part and the second reinforcing sheet part are arranged on an inner surface of the base part.

10. The long structural member according to claim 1, wherein:

the first thick-wall part is a single-material member, and is joined to the top plate part and the first flange part, and the second thick-wall part is a single-material member, and is joined to the top plate part and the second flange part.

11. The long structural member according to claim 1, wherein:

the first flange part, the first thick-wall part, the top plate part, the second thick-wall part, and the second flange part are of a single-material member, which are continuous with each other.

12. The long structural member according to claim 1, wherein:

in a transverse section of the long structural member, the first flange part extends in an opposite direction to a direction in which the top plate part extends with respect to the first side plate part, and the second flange part extends in an opposite direction to a direction in which the top plate part extends with respect to the second side plate part.

* * * * *